(12) United States Patent
Hood et al.

(10) Patent No.: US 10,118,981 B2
(45) Date of Patent: Nov. 6, 2018

(54) LACTAMIC POLYMER CONTAINING AN ACETOACETATE MOIETY

(71) Applicant: ISP Investments LLC, Wilmington, DE (US)

(72) Inventors: David K. Hood, Basking Ridge, NJ (US); Karyn B. Visscher, Morris Plains, NJ (US); Surya Kamin, Skillman, NJ (US); Sounak Sarkar, Hillsborough, NJ (US)

(73) Assignee: ISP Investments LLC, Wilmington, DE (US)

( * ) Notice: Subject to any disclaimer, the term of this patent is extended or adjusted under 35 U.S.C. 154(b) by 96 days.

(21) Appl. No.: 15/287,919

(22) Filed: Oct. 7, 2016

(65) Prior Publication Data

US 2017/0022313 A1    Jan. 26, 2017

Related U.S. Application Data

(63) Continuation of application No. 14/112,661, filed as application No. PCT/US2012/026267 on Feb. 23, 2012, now Pat. No. 9,464,151.

(60) Provisional application No. 61/480,080, filed on Apr. 28, 2011, provisional application No. 61/480,109, filed on Apr. 28, 2011.

(51) Int. Cl.
| | |
|---|---|
| *C08F 226/10* | (2006.01) |
| *C08L 39/04* | (2006.01) |
| *C08F 226/06* | (2006.01) |
| *C08F 271/02* | (2006.01) |
| *C09D 139/06* | (2006.01) |
| *C08F 220/28* | (2006.01) |

(52) U.S. Cl.
CPC .......... *C08F 226/10* (2013.01); *C08F 226/06* (2013.01); *C08F 271/02* (2013.01); *C08L 39/04* (2013.01); *C09D 139/06* (2013.01); *C08F 2220/283* (2013.01); *C08F 2800/20* (2013.01)

(58) Field of Classification Search
CPC .... C08F 226/10; C08F 222/06; C08F 220/28; C08F 2220/283; C08L 39/04
See application file for complete search history.

(56) References Cited

U.S. PATENT DOCUMENTS

| | | | |
|---|---|---|---|
| 4,328,531 A | 5/1982 | Nagashima et al. | |
| 4,358,524 A | 11/1982 | Sutton et al. | |
| 7,300,022 B2 | 11/2007 | Muller | |
| 2003/0134973 A1* | 7/2003 | Chen ..................... | C08F 220/28 524/804 |
| 2010/0041846 A1 | 2/2010 | Hood | |
| 2010/0112478 A1 | 5/2010 | Furukawa | |
| 2016/0068712 A1* | 3/2016 | Lan ....................... | C09K 3/1436 252/79.1 |

FOREIGN PATENT DOCUMENTS

| | | |
|---|---|---|
| WO | WO2008117738 A1 | 10/2008 |
| WO | WO2009023843 A1 | 2/2009 |
| WO | WO2010111607 A1 | 9/2010 |
| WO | WO2012051153 A2 | 4/2012 |

OTHER PUBLICATIONS

International Search Report, PCT/US2012/026267, dated Nov. 1, 2012.

* cited by examiner

*Primary Examiner* — Mark S Kaucher
(74) *Attorney, Agent, or Firm* — Thompson Hine LLP; William J. Davis

(57) ABSTRACT

The invention provides lactamic polymers comprising an acetoacetate moiety. The lactamic polymers may be readily functionalized and the functionalized lactamic polymers may be further derivatized to provide a wide variety of useful polymers having desirable chemical and physical properties. The lactamic polymers of the invention may be employed in a wide variety of compositions. (A); (B) wherein $R_1$-$R_6$, w, x, y, z, and n are described herein.

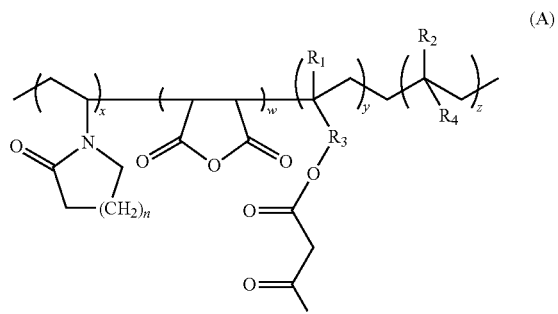

(A)

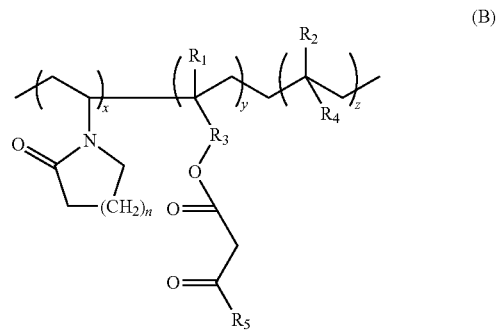

(B)

18 Claims, No Drawings

LACTAMIC POLYMER CONTAINING AN ACETOACETATE MOIETY

CROSS-REFERENCE

This application is a Continuation of U.S. application Ser. No. 14/112,661, now U.S. Pat. No. 9,464,151, filed Feb. 4, 2014, which was a national stage of PCT Application No. PCT/US2012/026267 filed Feb. 23, 2012 which claims priority of the provisional application numbers 61/480,080 and 61/480,109, filed Apr. 28, 2011, each of which are hereby incorporated by reference herein in their entirety.

FIELD OF THE INVENTION

The invention provides lactamic polymers comprising an acetoacetate moiety. The lactamic polymers may be readily functionalized and the functionalized lactamic polymers may be further derivatized to provide a wide variety of useful polymers having desirable chemical and physical properties. The lactamic polymers of the invention may be employed in a wide variety of compositions.

BACKGROUND OF THE INVENTION

Inkjet printers form an image by firing a plurality of discrete drops of ink from one or more nozzles on to the surface of a recording sheet placed adjacent the nozzles. Modern inkjet printers can print on almost any conventional paper or similar medium. The quality of images produced by such printers is greatly affected by the properties of the medium used. More particularly, to produce high quality images reliably, it is necessary that the recording medium, i.e., the inkjet recording sheet, dry rapidly, exhibit good ink adhesion, resist image cracking, not promote excessive spreading of the ink droplet, not promote "wicking", that is spreading of ink by capillary action through fibrous medium such as paper, and, importantly, be such that the contrast of the dried image with moist surfaces does not result in bleeding of ink from the image. Printing technologies are applied to many different surfaces, for example, polyester film, polyolefin films including polyethylene (PE), polypropylene (PP), polycarbonate, polyimide films, metals (i.e., aluminum, steel, copper), glass, vinyl film, Tyvek, canvas, polyvinylidene chloride films, textiles, canvas, leather, rubber, paper, polyurethane, ceramics, wood and the like.

In curable ink systems, the inks can be prepared by a polymerization process initiated by thermal or photo irradiation ($\alpha$, $\gamma$, and x-rays, UV, E-beam, and the like). Desirable properties in polymeric inks include solution viscosity, lubricity, gloss, cure speed, adhesion, impact resistance, toughness, coating hardness, water resistance, tack, surface tension, wetting, foaming, tensile strength, solvency, dispersive properties, flexibility, chemical resistance, abrasion resistance, and penetration.

The functional attributes of acetoacetoxyethyl methacrylate are disclosed in Eastman Chemical's "Acetoacetoxyethyl methacrylate (AAEM) Acetoacetyl Chemistry" Brochure (Publication Number N-319C, December 1999), which disclosure is incorporated by reference herein. The functional and chemical attributes of diketene chemistry are disclosed in "*Diketene*" by R. Clemens (Chemical Reviews, Volume 86, Number 2, April 1986), which disclosure is incorporated by reference herein. The functional and chemical attributes of ketene chemistry are disclosed in "*Ketenes II*" by T Tidwell (J. Wiley and Sons, New Jersey, USA, 2006), which disclosure is incorporated by reference herein.

EP 1578824B1 describes a curable liquid composition containing an acryloyl group containing resin produced by reacting monofunctional vinyl compounds and multifunctional acrylic esters with β-dicarbonyl group containing compound in which the two activated hydrogen atoms are in its methylene position. Self-initiating photocurable resins that UV-cure with little or no photoinitiator are described in Michael L. Gould et al., *Novel Self-Initiating UV-Curable Resins: Generation Three*, 1 PROCEEDINGS FROM RAD TECH EUROPE 05, 245-51 (2005). These disclosures are incorporated by reference herein.

U.S. 2010/0041846 discloses lac tam/vinyl alcohol copolymers, specifically, hydrophobic cross-linkable) acetylated lactam/vinyl alcohol copolymers. U.S. Pat. No. 6,933,024 discloses the use and preparation of poly(vinylpyrrolidone-(PVP) co-vinylalcohol) as an inkjet recording material by hydrolyzing PVP/polyvinylacetate copolymer. U.S. Pat. No. 4,350,788 describes a synthetic resin emulsion containing an acetoacetylated polyvinyl alcohol. U.S. Pat. No. 2,536,980 describes synthetic polyvinyl alcohol-1-butene-1,3-diones. U.S. Pat. No. 5,227,423 describes latex paint comprised of polymers having a non-self-polymerizable monomer, such as maleic acid and itaconic acid, a co-polymerizable monomer, such as a N-vinyl lactam, an acrylate, such as 2-hydroxyethyl acrylate, a wet adhesion promoting monomer, such as acetoacetoxyethyl methacrylate.

Additional examples for lactamic monomers can be found in "A novel route to substituted poly(vinyl pyrrolidone)s via simple functionalization of 1-vinyl-2-pyrrolidone in the 3-position by ring-opening reactions" by H. Reinecke et. al. (*Eur. Poly. J.*, 46 (2010) p 1557-1562. Additional examples for lactamic monomers can be found in "Synthesis and polymerization of new pyrrolidone-containing methacrylate monomers" by T. P. Davis et. al. (*Polymer*, 39, 17, p 4165-4169, 1998).

Lactamic polymers, such as polyvinyl pyrrolidone (PVP), are well known to exhibit a high degree of functional utility; particularly in inks and graphic art coatings. One challenge with lactamic polymers is water solubility and water sensitivity. As printing technology evolves, there is a need for new functional materials that incorporate facile methods for achieving water resistance improvements.

Accordingly, new polymeric inks are desirable having improved properties including solution viscosity, lubricity, gloss, cure speed, adhesion, impact resistance, toughness, coating hardness, water resistance, pigment surface decoration, tack, surface tension, wetting, foaming, tensile strength, solvency, dispersive properties, flexibility, chemical resistance, abrasion resistance, and penetration.

SUMMARY OF THE INVENTION

The invention provides lactamic polymers comprising an acetoacetate moiety having the following structure:

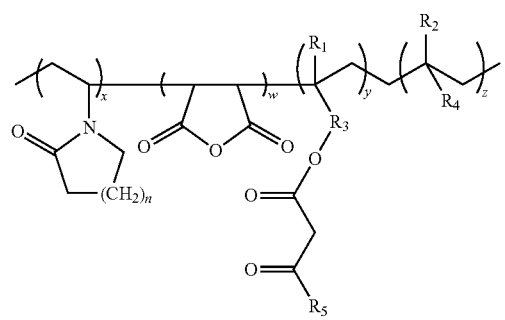

wherein each $R_1$ and $R_2$ are independently selected from the group consisting of hydrogen and $C_1$-$C_{30}$ functionalized and unfunctionalized alkyl groups, wherein any of the before mentioned groups may be with or without heteroatoms, and mixtures thereof; each $R_3$ is independently selected from the group consisting of hydrogen and $C_1$-$C_6$ functionalized and unfunctionalized alkyl, amide, carbonyl, and carboxyl groups, wherein any of the before mentioned groups may be with or without heteroatoms, and mixtures thereof; each $R_4$ is independently selected from the group consisting of functionalized and unfunctionalized alkenyl, alkoxy, alkyl, amide, aryl, carbonyl, carboxyl, cycloalkyl groups, and moieties derived from trialkoxyvinyl silanes, wherein any of the before mentioned groups may be with or without heteroatoms, and mixtures thereof; each $R_5$ is independently selected from the group consisting of $C_1$-$C_{12}$ functionalized and unfunctionalized alkyl and alkenyl groups, wherein any of the before mentioned groups may be with or without heteroatoms, and mixtures thereof; w, x, y, and z are mole percent, the sum of which=100%, with the proviso that z may be 0% mole percent; and each n is an integer independently ranging from 1-4.

The invention further provides lactamic polymers comprising an acetoacetate moiety having the following structure:

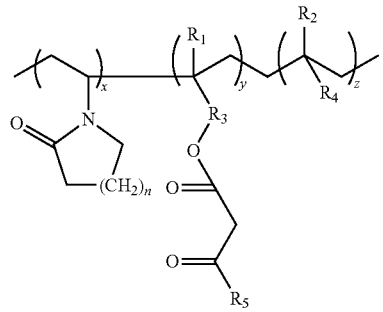

wherein each $R_1$ and $R_2$ are independently selected from the group consisting of hydrogen and $C_1$-$C_{30}$ functionalized and unfunctionalized alkyl groups, wherein any of the before mentioned groups may be with or without heteroatoms, and mixtures thereof; each $R_3$ is independently selected from the group consisting of hydrogen and $C_1$-$C_6$ functionalized and unfunctionalized alkyl, amide, carbonyl, and carboxyl groups, wherein any of the before mentioned groups may be with or without heteroatoms, and mixtures thereof; each $R_4$ is independently selected from the group consisting of functionalized and unfunctionalized alkenyl, alkoxy, alkyl, amide, aryl, carbonyl, carboxyl, cycloalkyl groups, and moieties derived from trialkoxyvinyl silanes, wherein any of the before mentioned groups may be with or without heteroatoms, and mixtures thereof; each $R_5$ is independently selected from the group consisting of $C_1$-$C_{12}$ functionalized and unfunctionalized alkyl and alkenyl groups, wherein any of the before mentioned groups may be with or without heteroatoms, and mixtures thereof; x, y, and z are mole percent, the sum of which=100%, with the proviso that z may be 0% mole percent; and each n is an integer independently ranging from 1-4.

The invention further provides functionalized lactamic polymers having a structure selected from the group consisting of:

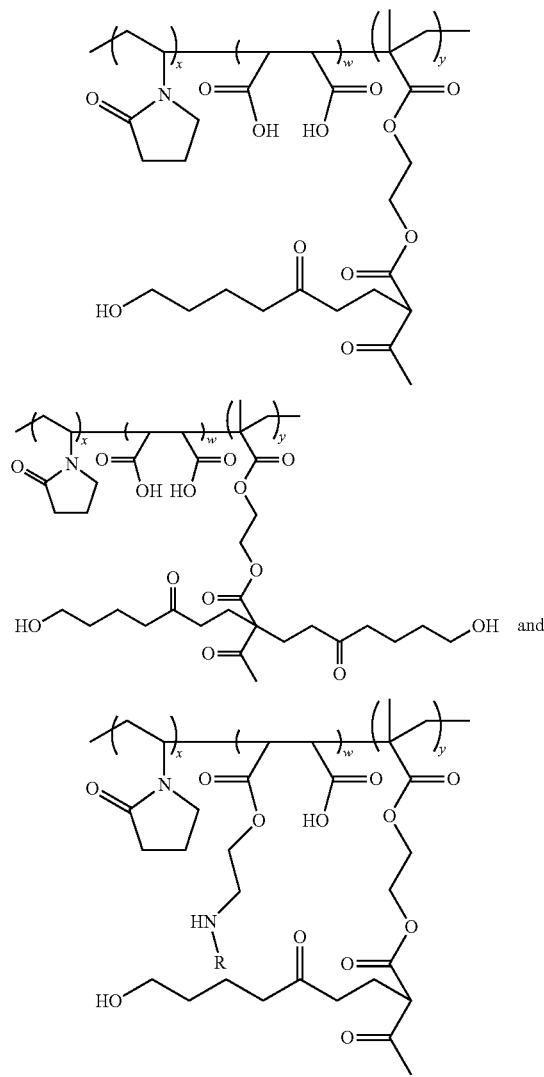

wherein w, x, and y are mole percent, the sum of which=100%.

The invention further provides lactamic polymers having a structure selected from the group consisting of:

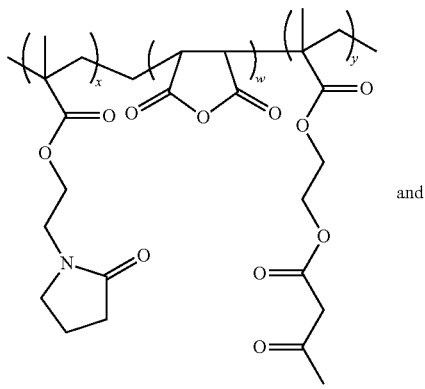

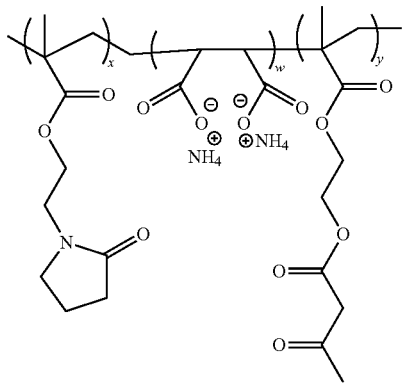

wherein w, x, and y are mole percent, the sum of which=100%.

The invention further provides a functionalized lactamic polymer having a structure selected from the group consisting of:

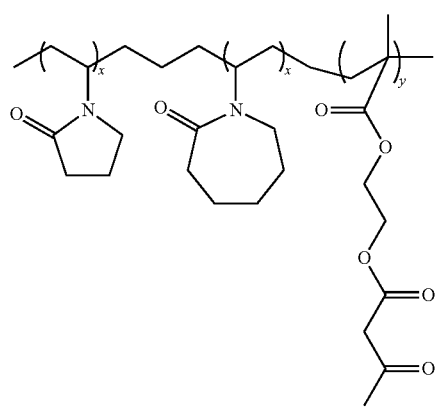

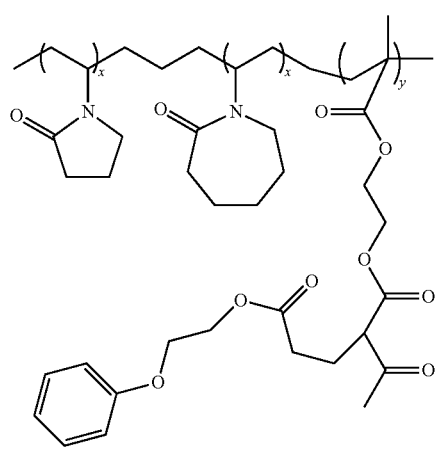

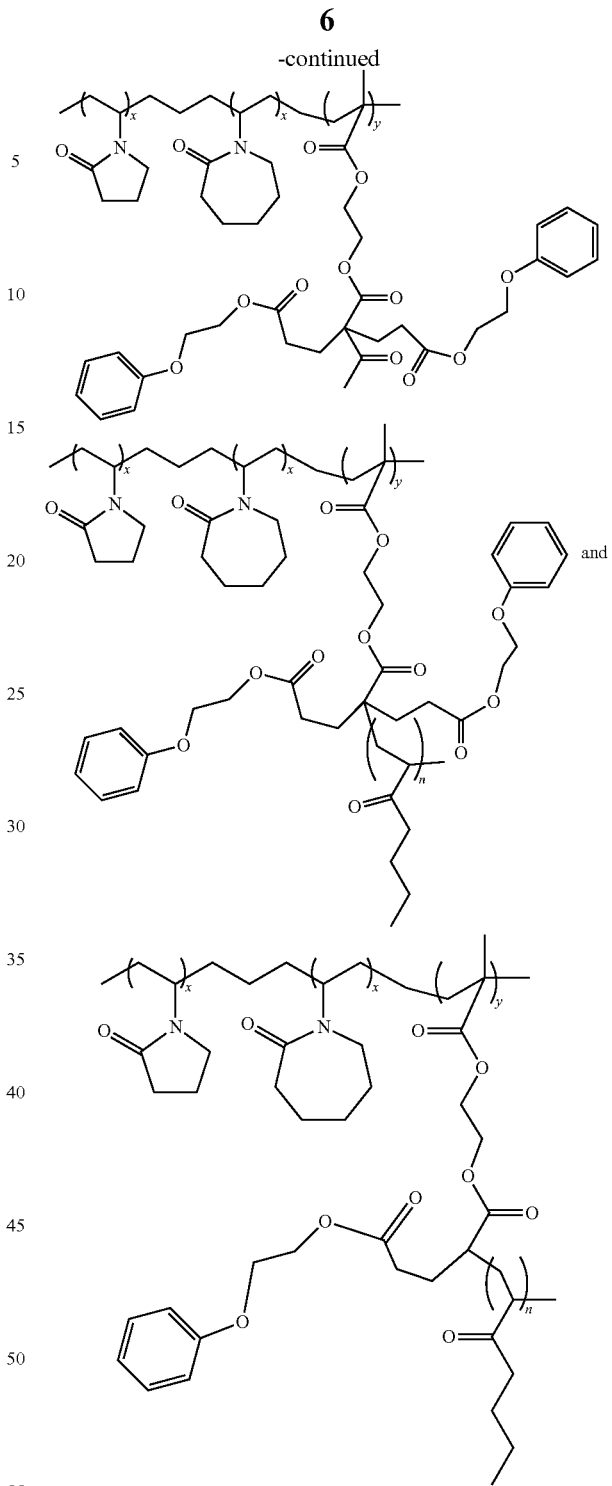

wherein x and y are mole percent, the sum of which=100%; and n is an integer independently ranging from 1-4.

The lactamic polymers of the invention may be employed in a wide variety of compositions.

DETAILED DESCRIPTION

The invention provides lactamic polymers containing an acetoacetate moiety. The lactamic polymers may be readily functionalized and the functionalized lactamic polymers may be further derivatized to provide a wide variety of useful polymers having desirable chemical and physical properties. In one aspect, the lactamic polymers comprise a lactamic monomer, a maleic anhydride derived monomer, a monomer containing an acetoacetate moiety, and optionally a monomer to provide desirable characteristics in the polymer for use in a wide variety of compositions. In another aspect, the lactamic polymers comprise a lactamic monomer, a monomer containing an acetoacetate moiety, and optionally a monomer to provide desirable characteristics in the polymer for use in a wide variety of compositions. The polymers may be random, blocked, or alternating polymers.

Lactams, such as poly(vinylpyrrolidone) (PVP), are water-soluble amphiphilic nontoxic polymers commonly used in a wide range of applications in the pharmaceutical and nutritional areas, as well as in cosmetics, personal hygiene, membranes, paintings, surfactants, dispersions, adhesives, inks, and the like. However, many lactams lack reactive groups that limit the possibility of adding new functional groups to the polymer to modify their physical and chemical properties, and thus their usefulness in compositions.

The maleic anhydride derived monomers may be partially or fully ring-opened to provide amic acids, carboxylic acids, carboxylic acidic salts, imides, esters, and mixtures thereof. The partially or fully ring-opened maleic anhydride derived monomers may be employed to vary the hydrophilic/hydrophobic character of the lactamic polymers. The monomer containing an acetoacetate moiety in the polymer provides a monomer that can be functionalized with a wide variety of groups to change the physical and chemical properties of the polymer. The optional monomer can further provide additional desirable characteristics in the polymer. The invention overcomes many of these problems by providing the ability to add a wide variety of functional groups to lactamic polymers and further to provide the ability to radically polymerize the substituted lactamic polymers. The lactamic polymers may be employed as solids, in solvents, and in reactive solvents.

In another aspect, application of a wide variety of compositions comprising the novel modified polymers are provided, including adhesives, aerosols, agricultural compositions, anti-soil redeposition agents, batteries, beverages, biocides, block copolymers, branched copolymers, cementing compositions, cleaning compositions, coating compositions, conductive materials, comb copolymers, cosmetic compositions, cross-linkers, decorated pigment surfaces, dental compositions, detergents, dispersants, drugs, electronics, encapsulations, foods, graft copolymers, hair sprays, household-industrial-institutional (HI&I), inks and coatings (suitable for use as a moisture resistant inkjet recording medium), interlaminate adhesives, lithographic solutions, membrane additive compositions, metal working fluids, oilfield compositions, paints, paper, personal care compositions, pharmaceuticals, pigment additives, plasters, plastics, printing, reactive biocides, refractive index modifiers, sequestrants, soil release compositions, static control agents, and wood-care compositions.

Personal care compositions refers to such illustrative non-limiting compositions as cosmetics, drug delivery systems, hair, oil, pharmaceuticals, pigment dispersions, preservative compositions, including those to alter the color and appearance of the skin, skin, sun, and tissue regeneration scaffolds. Other personal care compositions include, but are not limited to, modified natural oils for increased flexibility in styling, durable styling, increased humidity resistance for hair, skin, and color cosmetics, sun care water-proof/resistance, wear-resistance, shower gels, shampoos, and thermal protecting/enhancing compositions. Dental personal care compositions include denture adhesives, toothpastes, mouth washes, and the like. Pharmaceutical compositions include tablet coatings, tablet binders, transdermal patches, and the like. The wide variety of compositions are described below in detail.

As used herein, the following terms have the meanings set out below.

The term "acetoacetate moiety" refers to the group

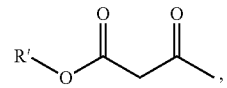

wherein R' is defined herein. The $CH_3$—CO— moiety in the acetoacetate moiety is thermally and photically labile.

The term "acidic conditions" refers to conditions relating to the pH value of an aqueous solution. Pure water is considered to be neutral, with a pH close to 7.0 at 25° C. Solutions with a pH value less than 7 are considered to be acidic solutions.

The term "basic conditions" refers to conditions relating to the pH value. Pure water is considered to be neutral, with a pH close to 7.0 at 25° C. Solutions with a pH value greater than 7 are considered to be basic or alkaline.

The term "branched and unbranched alkyl groups" refers to alkyl groups, which may be straight chained or branched. For example, the alkyl groups have from 1 to about 18 carbon atoms, more particularly, from 1 to about 10 carbon atoms, and yet more particularly from 1 to about 6 carbon atoms. Branched groups include isopropyl, tert-butyl, and the like.

The term "condensation reaction" refers to a chemical reaction in which two molecules or moieties (functional groups) combine to form one single molecule, together with the loss of a small molecule. When this small molecule is water, the reaction is known as a dehydration reaction.

The term "copolymer" refers to chains comprising more than one type of monomer unit.

The term "halogen" refers to chloro, bromo, iodo and fluoro, and in one embodiment is bromo and/or chloro.

The term "heteroatom" refers to atoms such as oxygen, nitrogen, sulfur, and phosphorous. When the heteroatom is a nitrogen atom, the nitrogen atom may be present in the form of a quaternary amine.

The term "hydrolyzing" refers to a hydrolysis reaction (hydrolysis) in which a parent molecule is split into two parts by the addition of a molecule of water. During the hydrolysis reaction, molecules of water are split into hydrogen cations ($H^+$) and hydroxide anions ($OH^-$). One fragment of the parent molecule gains a hydrogen cation from the water molecule; the other fragment gains the hydroxide anion.

The term "imide" refers to an organic compound comprising two carbonyl groups (acyl groups) bound to nitrogen atom. The nitrogen atom in the imide functional group may or may not be substituted with an organic functional group.

The term "inert solvent" refers to a solvent that does not interfere chemically with the reaction.

The term "intermediate compound" refers to a compound, which is produced during the course of a chemical synthesis. An intermediate compound is not itself, the final product, but is used in further reactions, which produce the final product. This is in contrast to the starting material and final product. An intermediate compound is generally not isolated or purified but rather is used "as is" in the synthesis. Many different intermediate compounds may be produced during the course of a synthesis, especially for economical reasons on the industrial level.

The term "lactam" refers to a cyclic amide, which generally can contain from 4-7 ring atoms in total.

The term "maleic anhydride" (cis-butenedioic anhydride, toxilic anhydride, 2,5-dioxofuran) is an organic compound with the formula $C_2H_2(CO)_2O$. Maleic anhydride is the acid anhydride of maleic acid and in its pure state it is a colorless or white solid with an acrid odor. Maleic anhydride has the structure:

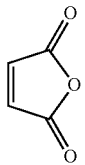

The term "maleimide" is the chemical compound with the formula $H_2C_2(CO)_2NH$. Maleimide is an unsaturated imide, which is an important building block in organic synthesis. The name is a contraction of maleic acid and imide, the —C(O)NHC(O) functional group. Maleimide has the structure:

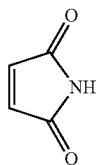

The term "Michael addition" or "Michael reaction" generally refers to the nucleophilic addition of a carbanion or another nucleophile to an alpha, beta unsaturated carbonyl compound (electrophile).

The term "mineral acid" refers to an acid derived from one or more inorganic compounds. Mineral acids release hydrogen ions when dissolved in water. Commonly used mineral acids are sulfuric acid, hydrochloric acid, and nitric acid.

The term "monomer" refers to the repeat units comprising a polymer. A monomer is a small molecule that chemically bonds to other monomers to form a polymer.

The term "non-homopolymer" refers to a polymer formed from two or more monomers and includes essentially all polymers that are not homopolymers. Nonlimiting examples of non-homopolymers include copolymers, terpolymers, tetramers, and the like, wherein the non-homopolymer is a random, blocked, or alternating polymer.

The term "oligomer" refers to a polymer molecule consisting of only a few monomeric units that are connected by covalent bond. For example, dimers, trimers, tetramers, etc. The term "polymer" refers to a large molecule (macromolecule) composed of repeating structural units (monomers) connected by covalent chemical bonds. The terms oligomer and polymer are used interchangeably herein.

The term "pH" refers to a measure of the acidity or basicity of an aqueous solution. Pure water is considered to be neutral, with a pH close to 7.0 at 25° C. Solutions with a pH less than 7 are considered to be acidic and solutions with a pH greater than 7 are considered to be basic or alkaline.

The term "pharmaceutically acceptable," such as pharmaceutically acceptable carrier, excipient, etc., means pharmacologically acceptable and substantially non-toxic to the subject to which the particular compound is administered.

The term "pharmaceutically acceptable salt" refers to conventional acid-addition salts or base-addition salts that retain the biological effectiveness and properties of the compounds and are formed from suitable non-toxic organic or inorganic acids or organic or inorganic bases. Sample acid-addition salts include those derived from inorganic acids such as hydrochloric acid, hydrobromic acid, hydroiodic acid, sulfuric acid, sulfamic acid, phosphoric acid and nitric acid, and those derived from organic acids such as p-toluenesulfonic acid, salicylic acid, methanesulfonic acid, oxalic acid, succinic acid, citric acid, malic acid, lactic acid, fumaric acid, and the like. Sample base-addition salts include those derived from ammonium, potassium, sodium, and quaternary ammonium hydroxides, such as for example, tetramethylammonium hydroxide. Chemical modification of a pharmaceutical compound (i.e., drug) into a salt is a technique well known to pharmaceutical chemists to obtain improved physical and chemical stability, hydroscopicity, and solubility of compounds. See, e.g., H. Ansel et. al., Pharmaceutical Dosage Forms and Drug Delivery Systems (6$^{th}$ Ed. 1995) at pp. 196 and 1456-1457.

The term "polymerization" refers to methods for chemically reacting monomer compounds to form polymer chains. The polymer chain may be alternating, blocked, or random. The type of polymerization method may be selected from a wide variety of methods. Such methods include, but are not limited to, free radical polymerization methods, such as classical radical polymerization and controlled radical polymerization, Nitroxide Mediation Polymerization (NMP), Atom Transfer Radical Polymerization (ATRP), and Reversible Addition Fragmentation Chain-Transfer (RAFT).

The term "respectively" is a term that denotes that the items in a list correspond to each other in the order they are given. With reference to two or more items, the term refers in a parallel or sequential manner.

The invention provides lactamic polymers comprising an acetoacetate moiety having the following structure:

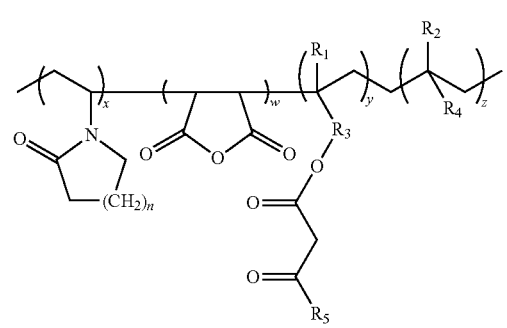

wherein each $R_1$ and $R_2$ are independently selected from the group consisting of hydrogen and $C_1$-$C_{30}$ functionalized and unfunctionalized alkyl groups, wherein any of the before mentioned groups may be with or without heteroatoms, and mixtures thereof; each $R_3$ is independently selected from the group consisting of hydrogen and $C_1$-$C_6$ functionalized and unfunctionalized alkyl, amide, carbonyl, and carboxyl groups, wherein any of the before mentioned groups may be with or without heteroatoms, and mixtures thereof; each $R_4$ is independently selected from the group consisting of functionalized and unfunctionalized alkenyl, alkoxy, alkyl, amide, aryl, carbonyl, carboxyl, cycloalkyl groups, and moieties derived from trialkoxyvinyl silanes, wherein any of the before mentioned groups may be with or without heteroatoms, and mixtures thereof; each $R_5$ is independently selected from the group consisting of $C_1$-$C_{12}$ functionalized and unfunctionalized alkyl and alkenyl groups, wherein any of the before mentioned groups may be with or without heteroatoms, and mixtures thereof; w, x, y, and z are mole percent, the sum of which=100%, with the proviso that z may be 0% mole percent; and each n is an integer independently ranging from 1-4.

In one aspect, each $R_1$ and $R_2$ are independently hydrogen or methyl; $R_3$ is —C(O)OCH$_2$CH$_2$—; each $R_4$ is independently selected from the group consisting of functionalized and unfunctionalized alkoxy, amide, aryl, carbonyl, carboxyl, cycloalkyl groups, and moieties derived from triethoxyvinyl silane, wherein any of the before mentioned groups may be with or without heteroatoms, and mixtures thereof; each $R_5$ is independently selected from the group consisting of $C_1$-$C_8$ functionalized and unfunctionalized alkyl and alkenyl groups, wherein any of the before mentioned groups may be with or without heteroatoms, and mixtures thereof. w may range from 1-97%, x may range from 1-97%, y may range from 1-97%, and z may range from 0-96%; more particularly, w may range from 1-60%, x may range from 1-60%, y may range from 1-60%, and z may range from 0-80%; most particularly, w may range from 1-50%, x may range from 1-50%, y may range from 1-50%, and z may range from 0-80%; and n may range from 1-3.

In one aspect, the polymer has a structure selected from the group consisting of:

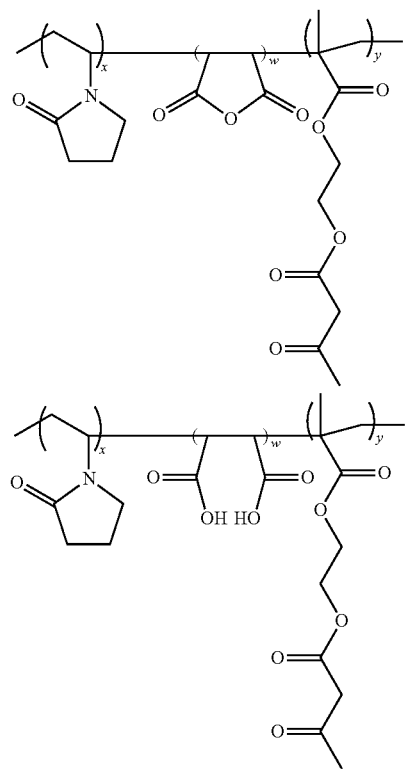

-continued

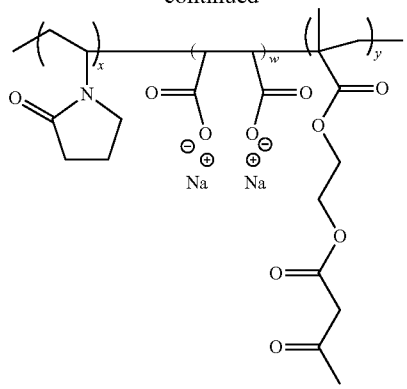

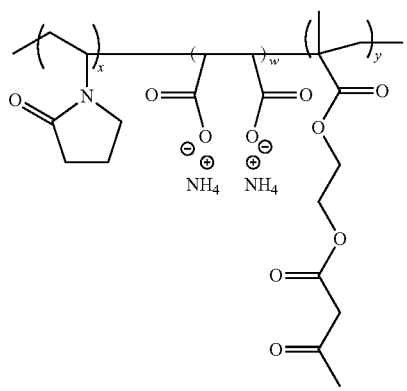

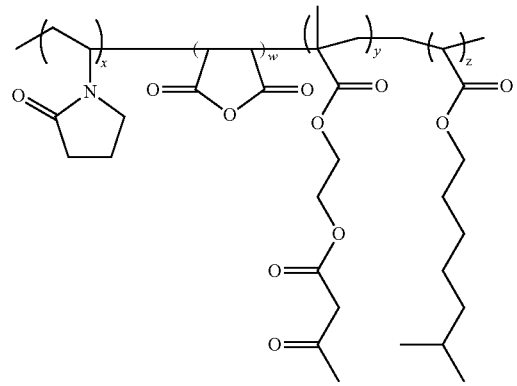

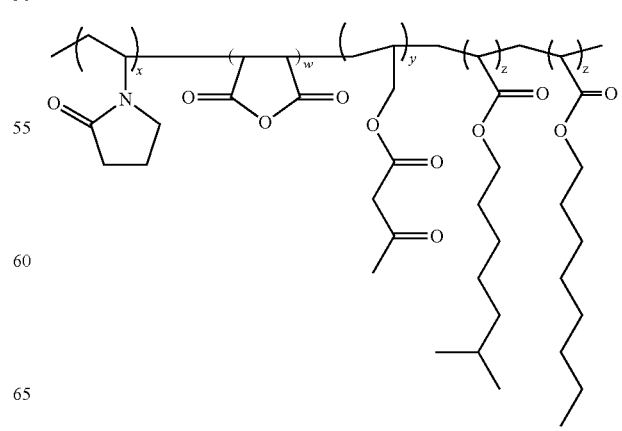

-continued
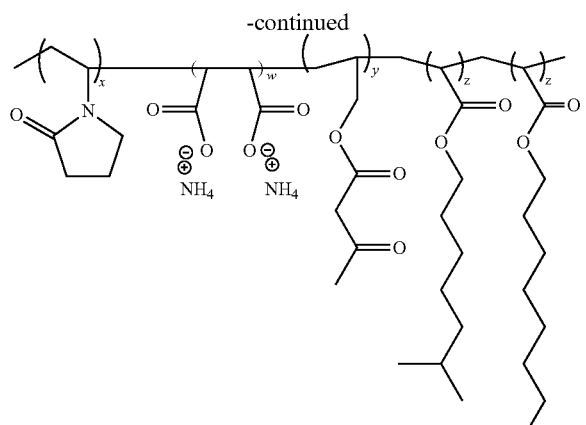
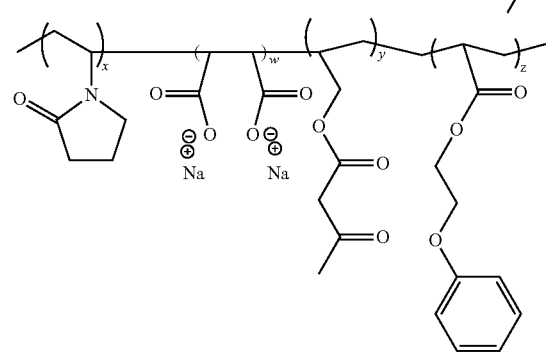
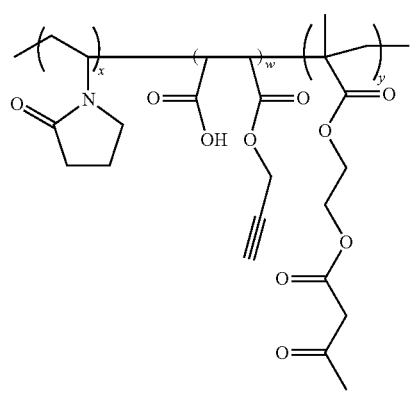
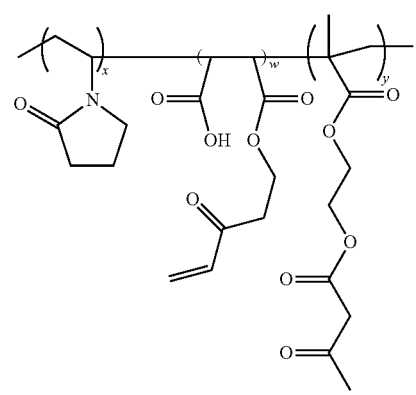
-continued
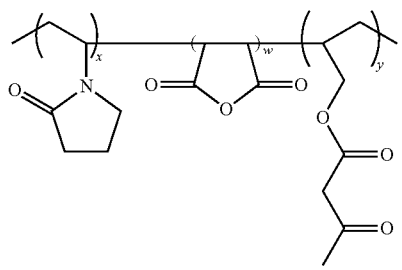
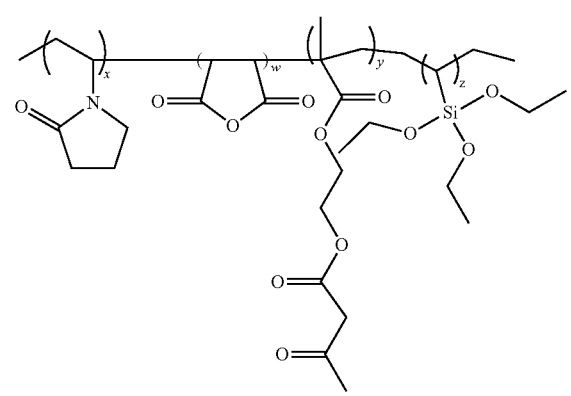
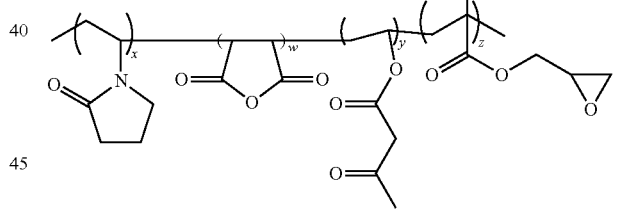
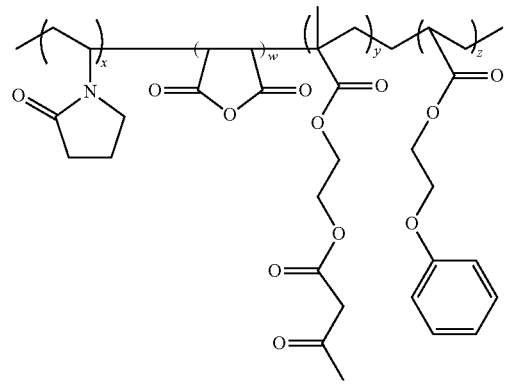
and

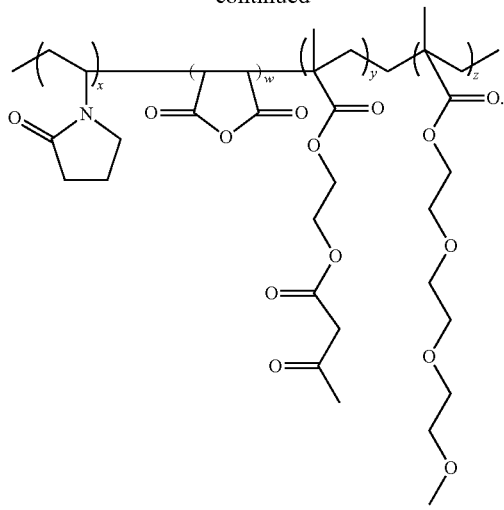

The invention further provides lactamic polymers comprising an acetoacetate moiety having the following structure:

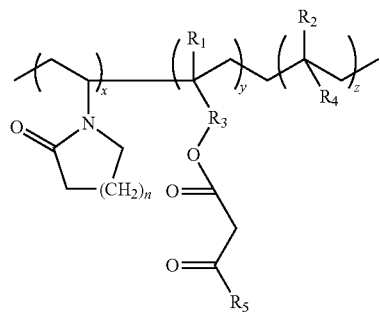

wherein each $R_1$ and $R_2$ are independently selected from the group consisting of hydrogen and $C_1$-$C_{30}$ functionalized and unfunctionalized alkyl groups, wherein any of the before mentioned groups may be with or without heteroatoms, and mixtures thereof; each $R_3$ is independently selected from the group consisting of hydrogen and $C_1$-$C_6$ functionalized and unfunctionalized alkyl, amide, carbonyl, and carboxyl groups, wherein any of the before mentioned groups may be with or without heteroatoms, and mixtures thereof; each $R_4$ is independently selected from the group consisting of functionalized and unfunctionalized alkenyl, alkoxy, alkyl, amide, aryl, carbonyl, carboxyl, cycloalkyl groups, and moieties derived from trialkoxyvinyl silanes, wherein any of the before mentioned groups may be with or without heteroatoms, and mixtures thereof; each $R_5$ is independently selected from the group consisting of $C_1$-$C_{12}$ functionalized and unfunctionalized alkyl and alkenyl groups, wherein any of the before mentioned groups may be with or without heteroatoms, and mixtures thereof; x, y, and z are mole percent, the sum of which=100%, with the proviso that z may be 0% mole percent; and each n is an integer independently ranging from 1-4.

In one aspect, each $R_1$ and $R_2$ are independently hydrogen or methyl; $R_3$ is —C(O)OCH$_2$CH$_2$—; each $R_4$ is independently selected from the group consisting of functionalized and unfunctionalized alkoxy, amide, aryl, carbonyl, carboxyl, cycloalkyl groups, and moieties derived from trialkoxyvinyl silane, wherein any of the before mentioned groups may be with or without heteroatoms, and mixtures thereof; each $R_5$ is independently selected from the group consisting of $C_1$-$C_8$ functionalized and unfunctionalized alkyl and alkenyl groups, wherein any of the before mentioned groups may be with or without heteroatoms, and mixtures thereof. x may range from 1-98%, y may range from 1-98%, and z may range from 0-97%; more particularly, x may range from 1-95%, y may range from 1-40%, and z may range from 0-80%; most particularly, x may range from 1-70%, y may range from 1-30%, and z may range from 0-50%; and n may range from 1-3.

In one aspect, the polymer has a structure selected from the group consisting of:

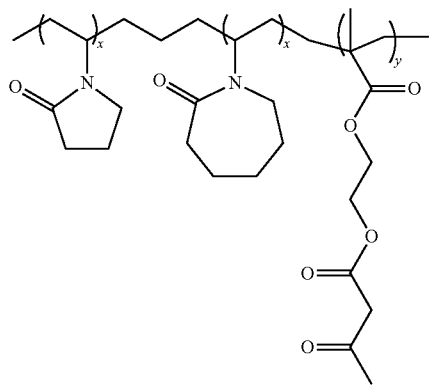

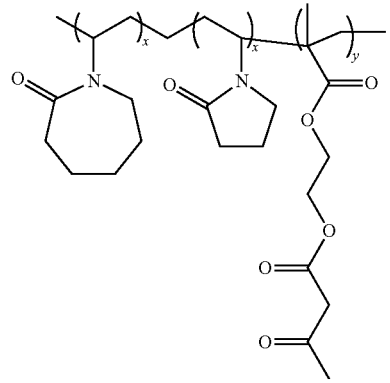

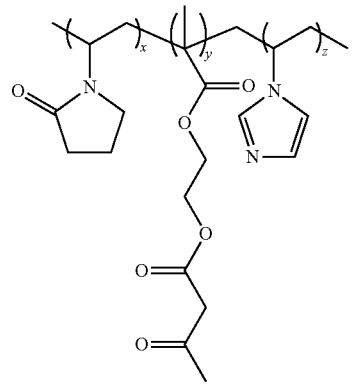

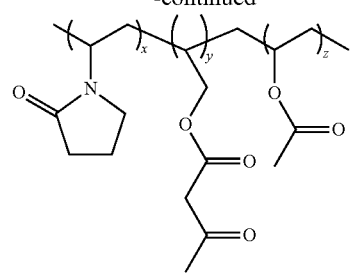
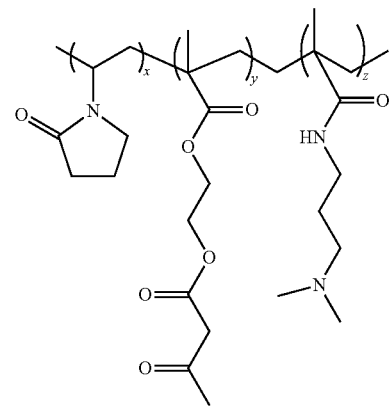
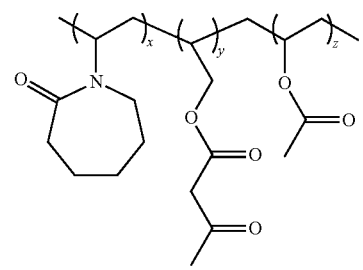
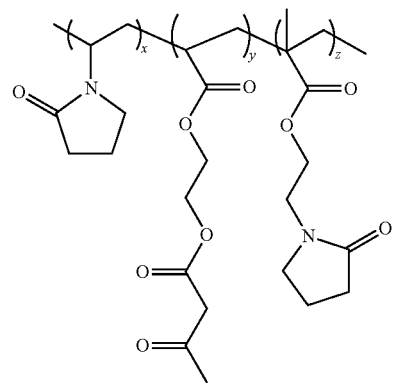
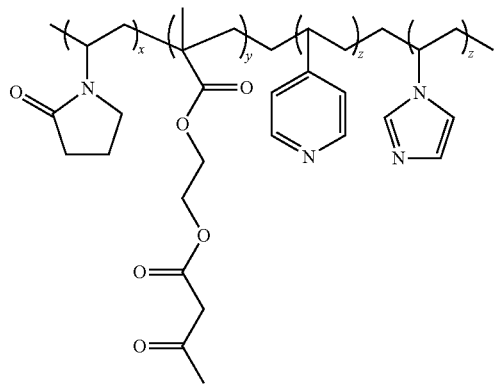
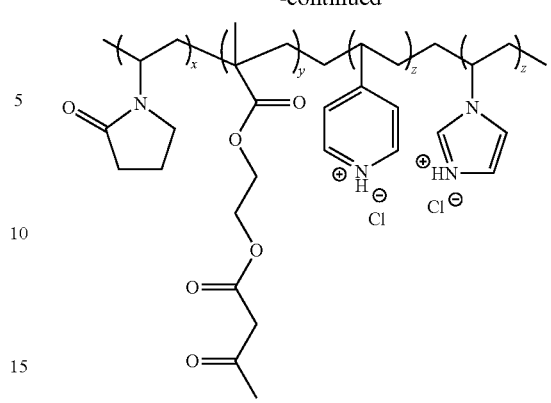
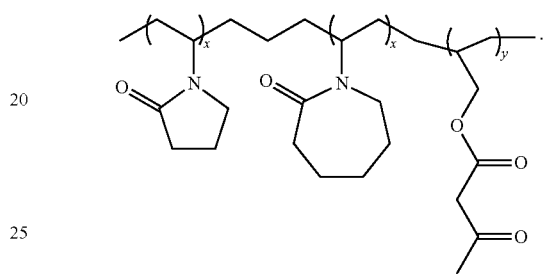
The invention further provides functionalized lactamic polymers having a structure selected from the group consisting of:
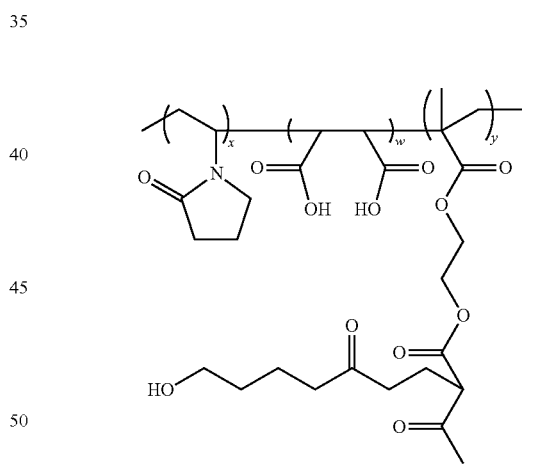
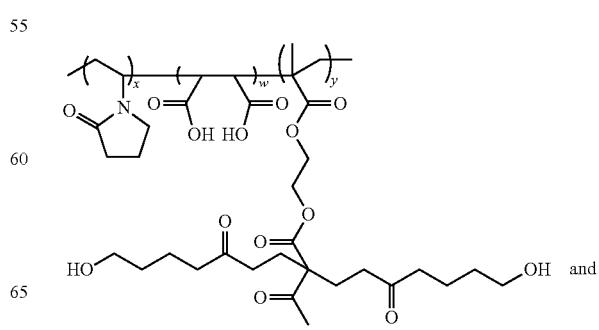
and

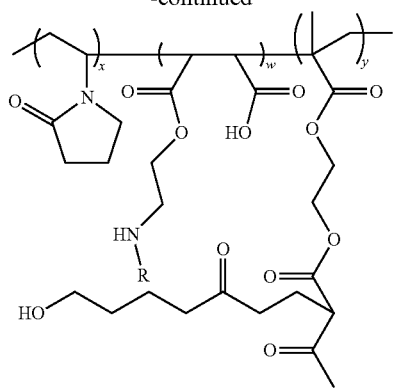
wherein w, x, and y are mole percent, the sum of which=100%.
The invention further provides lactamic polymers having a structure selected from the group consisting of:
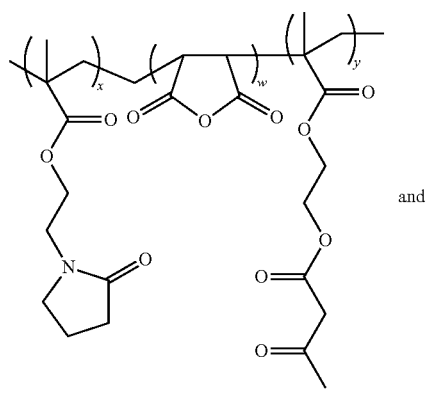
and
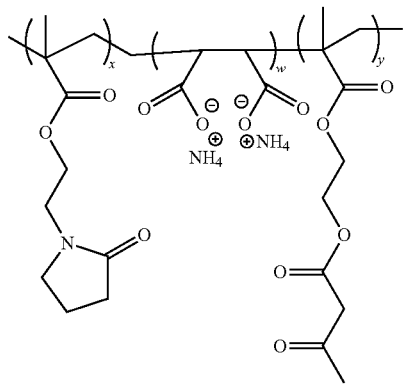
wherein w, x, and y are mole percent, the sum of which=100%.
The invention further provides a functionalized lactamic polymer having a structure selected from the group consisting of:
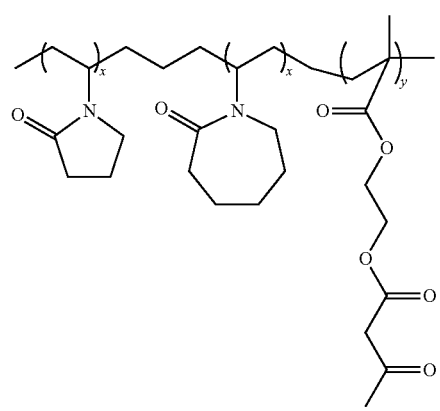
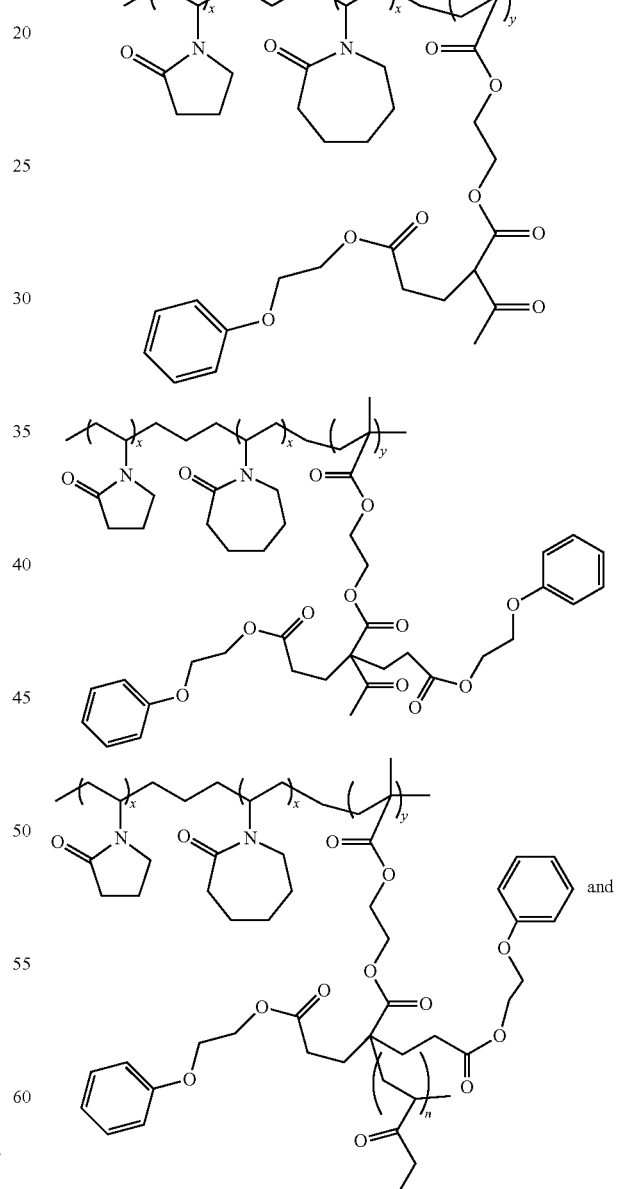

-continued

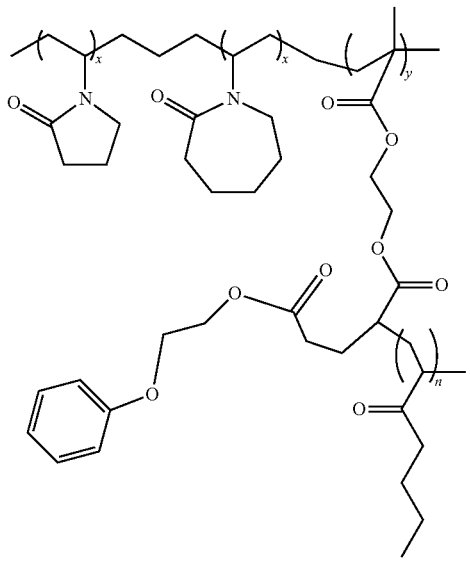

wherein x and y are mole percent, the sum of which=100%; and n is an integer independently ranging from 1-4.

The acetyl group ($CH_3CO$—) present in the monomer containing an acetoacetate moiety is thermally and photically labile. Upon heating or exposure to light, this group can decompose, resulting in the formation of a radical that can form "macro-initiator" or "self-initiator" polymers. The resulting polymers may require no or very little photic or heat initiators, depending upon the particular lactamic polymer. The "macro-initiator" lactamic polymers may then be reacted via a polymerization reaction with a variety of monomer moieties comprising a functional group capable of "addition polymerization" as a result of exposure to a free radical. Examples of suitable "addition polymerizable" monomers include styrenics, vinylics, acrylates, maleics, maleimides, dienes, etc. Insight to addition polymerization processes and techniques can be found in "*Principles of Polymer Chemistry*" by Paul J. Flory (Cornell University Press, Ithica, N.Y., 1953), which disclosure is incorporated by reference herein. Further insight can also be found in "*Principles of Polymerization, $4^{th}$ Ed.*" by George Odian (J. Wiley and Sons, Hoboken, N.J., 2004), which disclosure is incorporated by reference herein. Properties of many useful monomers can be found in the "*Polymer Handbook, $4^{th}$ Ed.*," edited by J. Brandrup et. al. (J. Wiley and Sons, New York, 1999), which disclosure is incorporated by reference herein.

The acetoacetate function is also suitable for reaction numerous other chemical moieties. These include aldehydes, including formaldehyde and glyoxal, diazonium salts, isocyanates including hexylene diisocyanate, and the like. Further moieties suitable for derivatization include those disclosed in Eastman brochure Publication N-319C, December 1999 entitled "Acetoacetoxyethyl Methacrylate (AAEM) Acetoacetyl Chemistry, which disclosure is incorporated by reference herein.

In addition to acetoacetoxyethyl methacrylates, other suitable approaches to forming the requisite acetoacetate functionality include may be employed including diketene, t-butylacetoacetate (ester exchange), acetoacetamides, and the like.

The invention also provides methods for preparing the macro-initiator lactamic polymers containing an acetoacetate moiety. The macro-initiator lactamic polymers can be prepared by Michael Addition of an acetoacetate to an acrylate. For example, when a "Michael Addition" is carried out on the following acetoacetate and acrylate, the following lactamic polymers containing an acetoacetate moiety may be prepared.

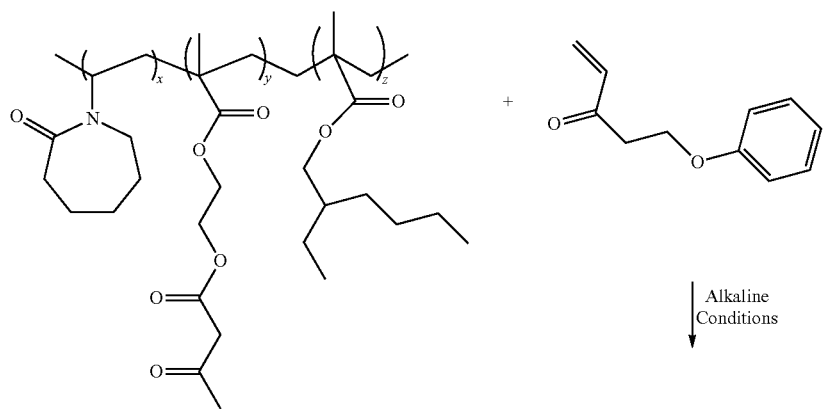

Alkaline Conditions

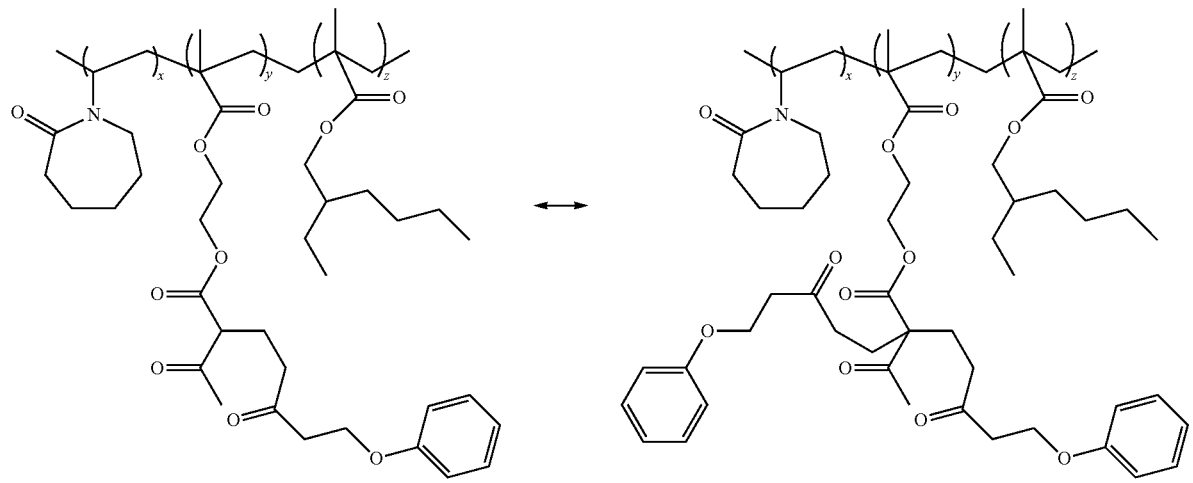

In this example, a strong base is employed to deprotonate the acetoacetate methylene group. The resulting carbon anion nucleophile attacks the acrylate, resulting in the formation of a new carbon-carbon bond. The integers x, y, and z correspond to the number of units of each monomer in the original polymer. The resulting acetoacetate moiety is thermally and photically labile and, upon heating or exposure to light his acetoacetate moiety can decompose resulting in the loss of the acetyl group (CH$_3$CO—) and formation of a lactamic polymeric radical. The lactamic polymeric radical is a "macro-initiator" capable of initiating polymerization with a free radical polymerizable monomer. This reaction can quantitatively utilize the acetoacetate or can yield excess acetoacetate.

For example, when butyl acrylate is treated with the "macro-initiator" product(s) above, the resulting polymer(s) formed may be a block copolymer comprising a lactamic macro-initiator "block" and a butyl (meth)acrylate "block."

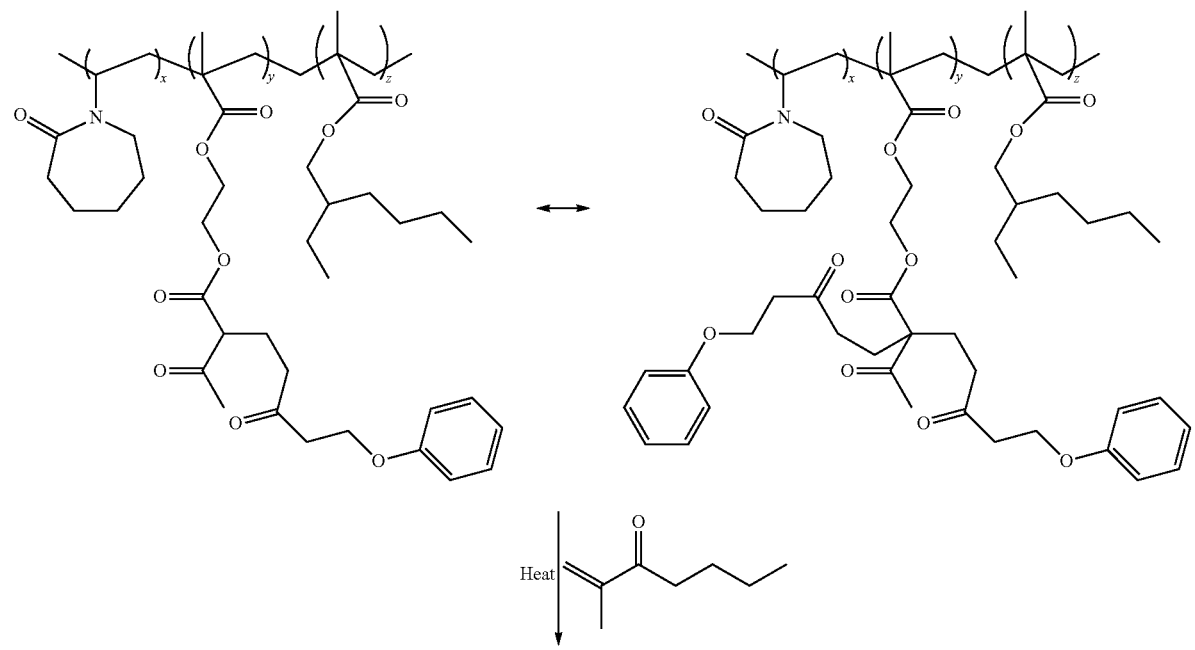

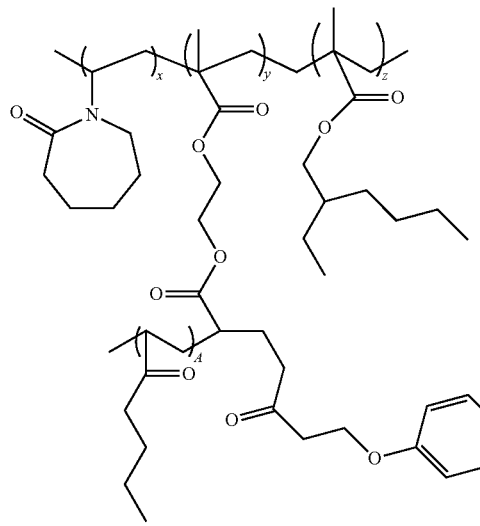
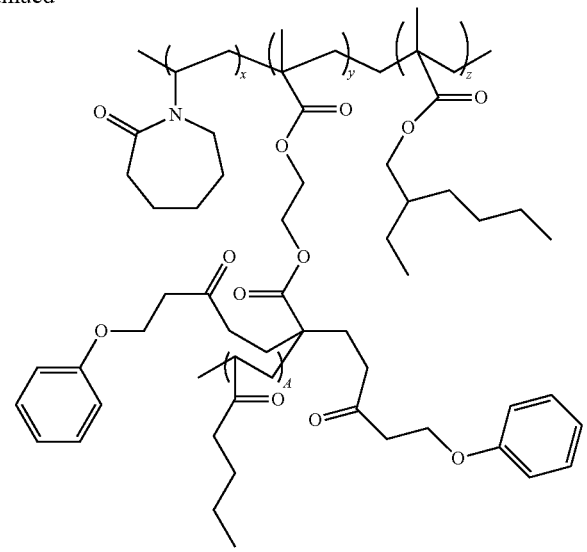

The integer A corresponds to the number of units of each free radical polymerizable monomer in the polymer formed from reaction with the macro-initiator. The reverse reaction is also possible, where an acetoacetate functional polymer can also be "block" functionalized with a lactamic monomer as well. Where an acrylate based acetoacetate functional polymer is made "lactamic" by macro-initiation of a lactamic monomer.

The optional monomer can include hydroxyethyl acrylate (HEA), hydroxyethyl methacrylate (HEMA), hydroxybutyl acrylate (HBA), ethyl hexyl methacrylate (EHMA), phenoxy ethyl acrylate (PEA), vinylene carbonate, hydroxyethyl pyrrolidone methacrylate, vinyl acetate (VA), ethyl acrylate, methyl acrylate, isobutyl (meth)acrylates, methylmethacrylate, dimethylaminoethyl methacrylate (DMAEMA), dimethylaminopropyl methacrylamide (DMAPMA), acrylamide, methacrylamide, acrylonitrile, isobornyl acrylate, cyanoacrylates, C8-C10 acrylate (ODA), ethylene, styrene, $C_8$-$C_{10}$ acrylate, highly branched vinyl ester, maleic anhydride (MAN), acrylic acid (AA), sodium vinylsulfonate, diacetone acrylamide, vinyl carbonate, mono-acrylated glycols and glycol ethers, vinyl ethylene carbonate, vinyl chloride, 4-vinyl aniline, vinylpyridine, trimethylvinylsilane, glycidyl acrylate, vinyl propionate, vinyl ethers, crotonic acid, polyfunctional acrylates, polyfunctional allyl ethers, N-vinyl imidazole, glycidyl methacrylate (GMA) and allyl acetate and allyl alcohol.

The invention discloses reactive co-solvents. These materials consist of (meth)acryl monomers or pre-polymers, a (meth)acryl ester of an epoxy type monomer or pre-polymer, and a urethane type monomers or pre-polymers.

Examples of reactive co-solvents include but are not limited to 2-hydroxy methyl methacrylate (HEMA), 2-hydroxy ethyl acrylate (HEA), 2-phenoxy ethyl acrylate (PEA), 2-ethylhexyl-diglycol acrylate, 2-(2-ethoxyethoxy) ethyl acrylate (EOEOEA), lauryl acrylate (LA), Stearyl acrylate (SA), isobornyl acrylate (IBOA), acrylic acid-2-ethylhexyl ester, isodecyl acrylate, diacetone acrylamide, acryloyl morpholine (ACMO), cyclic trimethylolpropane formal acrylate (CTFA), 3-(Methacryloylamino)propyl] trimethylammonium chloride (MAPTAC), 4-hydroxybutyl acrylate, (3-Acrylamidopropyl)trimethylammonium chloride (APTAC), C8-C10 acrylate (ODA), isodecyl acrylate (ISODA), lauryl methacrylate (LM), stearyl methacrylate (SM), 2,2,2-Trifluoroethyl methacrylate, 2-Acrylamido-2-methyl-1-propanesulfonic acid, 2-Acrylamido-2-methyl-1-propanesulfonic acid sodium salt, [2-(Methacryloyloxy) ethyl]dimethyl-(3-sulfopropyl)ammonium hydroxide, [3-(Methacryloylamino)propyl]dimethyl(3-sulfopropyl) ammonium hydroxide inner salt, 1,6-hexanediol diacrylate (HDDA), dipropylene glycol diacrylate (DPGDA), tripropylene glycol diacrylate (TPGDA), water, alcohol, hydroalcohol mixtures, 1,4-butanediol diacrylate (BDDA), Tripropylene glycol diacrylate (TPGDA), dipropyleneglycol diacrylate (DPGDA), Tripropylene glycol diacrylate (TRPGDA), 1,9-nonanediol diacrylate (NNDA), neopentyl glycol diacrylate (NPGDA), propoxylated neopentyl glycol diacrylate (NPG2PODA), polyethylene glycol (200) diacrylate (PEG(200)DA), polyethylene glycol (400) diacrylate (PEG(400)DA), polyethylene glycol (600) diacrylate (PEG (600)DA), ethoxylated bisphenol-A diacrylate (BPA2EODA), triethylene glycol diacrylate (TEGDA), triethylene glycol dimethacrylate (TEGDMA), glycerol propoxylated triacrylate (GPTA), diethylene glycol dimethacrylate (DEGDMA), ethoxylated bisphenol-A dimethacrylate (BPA10EODMA), trimethylolpropane triacrylate (TMPTA), pentaerythritol triacrylate (PET3A), ethoxylated trimethylolpropane triacrylate (TMP3EOTA), propoxylated tri-methylolpropane triacrylate (TMP3POTA), propoxylated glyceryl triacrylate (GPTA), trimethylolpropane trimethylacrylate (TMPTMA), ethoxylated trimethylolpropane trimethacrylate (TMP3EOTMA), 2,2-dionol diacrylate, pentaerythritol tetraacrylate (PETA), neopentylglycol diacrylate hydroxypivalate, 2-acryloyloxyethylphthalic acid, 2-acryloyloxyethyl-2-hydroxyethylphthalic acid, dimethyloltricyclodecane diacrylate, 2-acryloyloxyethylsuccinic acid, nonylphenol ethylene oxide adduct acrylate, phenol acrylates, methoxy-polyethylene glycol acrylate, tetramethylolmethane triacrylate, dipentaerythritol hexaacrylate (DPHA), isocyanate-functional unsaturated acrylic ester resin, urethane diacrylates oligomers, urethane acrylates, modified urethane acrylates, polyester acrylates, modified bisphenol A diacrylate, phenoxy-polyethylene glycol acrylate, bisphenol A propylene oxide modified diacrylate, bisphenol A ethylene oxide adduct diacrylate, pentaerythritol triacrylate hexamethylenediisocyanate, urethane prepolymer, isoamyl acrylate, isomyristyl acrylate, isostearyl acrylate, carbitol acrylate, cyclohexyl acrylate, tetrahydrofurfuryl acrylate, glycidyl acrylates, acrylamides, polyfunctional acrylamides, polyfunctional (polyethylene glycol) acrylates, polyfunctional vinyl amides, 1,4-butane-diol-monoacrylate and/or diglycidyl ether of 1,4-butanediol, and the like. Mixtures of monomers are also envisioned in the invention.

Additional examples include methyl vinylether, ethyl vinylether, propyl vinylether, n-butyl vinylether, t-butyl vinylether, 2-ethylhexyl vinylether, n-nonyl vinylether, lauryl vinylether, cyclohexyl vinylether, cyclohexylmethyl vinylether, 4-methylcyclohexylmethyl vinylether, benzyl vinylether, dicyclopentenyl vinylether, 2-dicyclopentenoxyethyl vinyl ether, methoxyethyl vinylether, ethoxyethyl vinylether, butoxyethyl vinyl ether, methoxyethoxy vinylether, ethoxyethoxyethyl vinylether, methoxypolyethylene glycol vinylether, tetrahydrofurfuryl vinylether, dodecyl vinylether, diethylene glycol monovinylether, 2-hydroxyethyl vinylether, 2-hydroxypropyl vinylether, 4-hydroxybutyl vinylether, 4-hydroxymethylcyclohexylmethyl vinylether, polyethylene glycol vinylether, chloroethyl vinylether, chlorobutyl vinylether, phenylethyl vinylether, phenoxypolyethylene glycol vinylether, ethylene glycol divinylether, butylenes glycol divinylether, hexanediol divinylether, bisphenol A alkyleneoxide divinylethers, bisphenol F alkyleneoxide divinylethers, propyleneoxide adducts of trimethylolpropane trivinylether, triethylene glycol divinylether, cyclohexane dimethanol divinylether, N-vinyl-2-pyrrolidone (VP), N-vinyl caprolactam (VCap), N-vinyl imidazole (VI), n-vinyl amides, 4-vinyl pyridine, 2-vinyl pyridine, styrene, 5-vinyl-2-norbornene and the like.

The non-limiting examples of monofunctional epoxy compounds include phenyl glycidylether, p-tert-butylphenyl glycidylether, butyl glycidylether, 2-ethylhexyl glycidylether, allyl glycidylether, 1,2-butyleneoxide, 1,3-butadienemonooxide, 1,2-epoxydodecane, epichlorohydrin, 1,2-epoxydecane, styreneoxide, cyclohexeneoxide, 3-methacryloyloxymethylcylcohexeneoxide, 3-acryloyloxymethylcylcohexeneoxide, 3-vinylcylcohexeneoxide, and the like.

The non-limiting examples of multifunctional epoxy compounds include 3,4-Epoxycyclohexylmethyl-3,4-epoxycyclohexane carboxylate, 3-ethyl-3-((ethyloxetane-3-yl)methoxy) methyl)oxetane, bisphenol A diglycidylether, bisphenol F diglycidylether, bisphenol S diglycidylether, brominated bisphenol A diglycidylether, brominated bisphenol F diglycidylethers, brominated bisphenol S diglycidylether, epoxy novolak resins, hydrogenated bisphenol A diglycidylethers, hydrogenated bisphenol F diglycidylethers, hydrogenated bisphenol S diglycidylethers, 3,4-epoxycyclohexylmethyl-3',4'-epoxycyclohexanecarboxylate, 2-(3,4-epoxycyclohexyl-5,5-spiro-3,4-epoxy) cyclohexane-meta-dioxane, bis(3,4-epoxycyclohexylmethyl) adipate, vinylcylcohexeneoxide, 4-vinylepoxycyclohexane, bis(3,4-epoxy-6-methylcyclohexylmethyl) adipate, 3,4-epoxy-6-methylcyclohexyl-3',4'-epoxy-6'-methylcyclohexane carboxylate, methylene-bis(3,4-epoxycyclohexane), dicyclopentadiene diepoxide, ethylene glycol di(3,4-epoxycyclohexylmethyl)ether, ethylene bis(3,4-epoxycyclohexanecarboxylate), epoxyhexahydrodioctyl phthalate, epoxyhexahydrodi-2-ethylhexyl phthalate, 1,4-butanediol diglycidylether, 1,6-hexanediol diglycidylether, glycerol triglycidylether, trimethylolpropane triglycidylether, polyethylene glycol diglycidylether, polypropylene glycol diglycidylether, 1,1,3-tetradecadienedioxide, limonenedioxide, 1,2,7,8-diepoxyoctane, 1,2,5,6-diepoxycyclooctane, and the like.

The invention relates to curing or cross-linking or polymerizing a polymerizable material is carried out by any appropriate method known or explored in the prior-arts by a person skilled in the art. Insight to curing and cross-linking technology is further disclosed in "*Thermosetting Polymers*," J. P. Pascault et. al. (Marcel Dekker, New York, 2002) and is referred and disclosed herein in its entirety. Particularly, the polymerization of reactive solution comprising polymerizable polymer is carried out by employing any one of the method disclosed in "*Principles of Polymerization 4$^{th}$ edition*," by George Odian (J. Wiley and Sons, Hoboken, N.J., 2004) and is referred and disclosed herein in its entirety. The preferable techniques or methods employed by The invention to polymerize the polymers would include UV-radiation, UV-LED, laser beam, electron beam, gamma irradiation, free-radical, cationic, anionic, thermal, exposure to e-beam and/or by employing a high-energy source in presence of suitable photo initiator for the initiation of polymerization. Suitable source of radiation including but not limited to mercury, xenon, halogen, carbon arc lamps, sunlight, and radioactive sources.

The invention relates to material suitable for decorating (functionalizing or surface modification) the surface of a pigment. A pigment is defined as an insoluble substance, in solvent or water that is a particle. Often it is desirable to decorate the pigment surface in order to impart new and useful properties. For example, K. Holmberg et. al. describes technology related to surface modifications of aluminium (inorganic) pigments in *Adv. Colloidal and Interface Sci.* 128-130 (2006) 121-134, and is referred and disclosed herein in its entirety. Additionally, organic pigments, such as polyvinyl polypyrrolidone (PVPP), are not easily functionalized. Incorporation of acetoacetate functionality provides for many decoration approaches to functionalizing the surface of such particles, with either new organic and/or inorganic features.

In order to induce polymerization via irradiation, often an appropriate photoinitiator(s), which has high storage stability after being added, are incorporated to initiate the polymerization reaction system. Preferable photoinitiators are selected from the following non-limiting group or class of compounds such as 2-hydroxy-2-methyl-1-phenylpropane-1-one, 1-hydroxycyclohexyl phenyl ketone, and 2-methyl-1-[4-(methylthio)phenyl]-2-morphorinopropane-1-on; benzoins e.g. benzyl dimethyl ketal; benzophenones such as benzophenone, 4-phenylbenzophenone, and hydroxybenzophenone; thioxanthones such as isopropylthioxanthone and 2,4-diethylthioxanthone; acylphosphine oxides; and other special initiators such as methyl phenyl glyoxylate; bis[4-(di(4-(2-hydroxyethyl)phenyl)sulfonio)phenyl sulfide], a mixture of bis[4-diphenylsulfonio]phenyl)sulfide bis (hexafluoroantimonate and diphenyl-4-thiophenoxyphenyl-sulfonium hexafluoroantimonate, bis[4-(di(4-(2-hydroxyethyl)phenyl)sulfonio)phenyl sulfide], 5-2,4-cyclopentadiene-1-yl-[(1,2,3,4,5,6-.eta.)-(1-methylethyl-)benzene]-iron (1+)-hexafluorophosphate(1−)), 4-(2-hydroxytetradecanyloxy) diphenyliodonium hexafluoroantimonate, (4-hydroxynaphthyl) dimethylsulfonium hexafluoroantimonate), photo latent bases such as photo latent diazabicyclo nonene, triphenylsulfonium hexafluorophosphate, triphenylsulfonium hexafluoroantimonate, 4-methoxyphenyldiphenylsulfonium hexafluoroantimonate, 4-methoxyphenyliodonium hexafluoroantimonate, bis(4-tert-butylphenyl)iodonium tetrafluoroborate, (bis(4-tert-butylphenyl)iodonium hexafluorophosphate), (bis(4-tert-phenyl)iodonium hexafluoroantimonate), (bis[4-(diphenylsulfonio)phenyl]sulfide bis(hexafluorophosphate)), Aryldiazonium salts, diaryliodonium salts, triaylsulfonium salts, triarylselenonium salts, dialkylphenacylsulfonium salts, triarylsulfoxonium salts, triethanol amine, aryloxydiarylsulfonium salts, and the like for example, triphenylsulfonium hexafluorophosphate, methyidiphenylsulfonium hexafluorophosphate, dimethylphenylsulfonium hexaflurophosphate, diphenyinapththylsulfonium hexaflurophosphate, di(methoxynapththyl)methylsulfonium hexaflurophosphate, (4-octyloxyphenyl) phenyl iodonium hexafluoro antimonate, (4-octyloxyphenyl) diphenyl sulfonium hexafluoro antimonate, (4-decyloxyphenyl) phenyl iodonium hexafluoro antimonate, (4-dodecyloxyphenyl)diphenyl sulfonium hexafluoroantimonate. Particularly, employed photoinitiators include 10-biphenyl-4-yl-2-isopropyl-9H-thioxanthen-10-ium hexafluorophosphate, 4,4'-dimethyl iodonium hexaflurophosphate, mixed triarylsulfonium hexaflurophosphate salts and reaction products of polyol and 10-(2-carboxymethoxy)-biphenyl-4yl-2-isopropyl-9-oxo-9H-thioxanthen-10-ium hexafluorophosphate. Further, these photoinitiators are used alone or in combination thereof. Alternatively, if essential, the photoinitiator may be used by mixing it with one or more photopolymerization accelerator, such as a benzoic acid (e.g., 4-dimethylaminobenzoic acid) or a tertiary amine (e.g., diazabicyclo nonene (DBN)), in any appropriate ratio. The photoinitiator is preferably added to the photopolymerizable composition in the range of about 0.1% to about 20% by weight.

In order to induce the Michael Addition, often an appropriate base is required. Preferable bases include diazabicyclo nonene (DBN), diazabicyclo undecene (DBU), tetramethylguanidine (TMG), sodium hydroxide (NaOH), potassium hydroxide (KOH) and the like. Additional insight to suitable bases can be found in "Super Bases for Organic Synthesis" edited by T Ishikawa (J. Wiley and Sons, West Sussex, U K, 2009.

In one aspect, the polymerizable material may be reacted through free-radical polymerization in the presence of a free-radical initiator. A free-radical initiator refers to a chemical moiety, which, upon exposure to an appropriate energy source (e.g. light or heat) decomposes in to two independent uncharged fragments left with highly reactive one unpaired electron. The contemplated free radical initiator for polymerization would include but are not limited to various derivatives of peroxides, peresters and/or azo compounds. More particularly, selected from the group consisting of dicumyl peroxide, dibenzoyl peroxide, 2-butanone peroxide, tert-butyl perbenzoate, di-tert-butyl peroxide, 2,5-bis(tert-butylperoxy)-2,5-dimethylhexane, bis(tert-butyl peroxyisopropyl)benzene, and tert-butyl hydroperoxide), diacyl peroxides, cumene hydroperoxide, dialkyl peroxides, hydroperoxides, ketone peroxides, monoperoxycarbonates, peroxydicarbonates, peroxyesters, and peroxyketals, including tertiary butyl perbenzoate, tertiary butyl peroctoate in diallyl phthalate, diacetyl peroxide in dimethyl phthalate, dibenzoyl peroxide, 1-hydroxy cyclohexyl-1-phenyl ketone, bis(2,4,6-trimethyl benzoyl)phenyl phosphine, benzoin ethyl ether, 2,2-dimethoxy-2-phenyl acetophenone, di(p-chlorobenzoyl) peroxide in dibutyl phthalate, di(2,4-dichlorobenzoyl) peroxide with dibutyl phthalate, dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumyl hydroperoxide, diacetyl peroxide, t-butyl hydroperoxide, ditertiary butyl peroxide, 3,5-dihydroxy-3, 5-dimethyl-1,2-oxacyclopentane, and 1,1-bis(t-butyl peroxy)-3,3,5-trimethyl cyclohexane and di-(4-t-butyl cyclohexyl) peroxydicarbonate, azo compounds such as azobisisobutyronitrile and azobiscyclohexanenitrile (e.g., 2,2'-azobis(2-methyl-propanenitrile), 2,2'-azobis(2-methylbutanenitrile), and 1,1'-azobis(cyclohexanecarbonitrile)) and the like mixtures and combinations thereof. Alternatively, all of the above revealed free radical initiator can be used for thermal based polymerization alone or appropriate mixture thereof and wherein, the polymerization reaction is initiated through heat energy. Particular thermal initiator employed for the polymerization of polymer would comprise 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile).

The structure of polymerizable polymer present in the reactive solution is confirmed from appropriate spectral techniques that are known in the art and preferably employed spectral techniques would include $^1$H-NMR, $^{13}$C-NMR, and FT-IR spectra.

In one aspect, a colorant may be added. The colorant can be in the form of a pigments or dye. Combinations of pigments and dyes are also envisioned. Suitable pigment materials are described in Hunger's "Industrial Organic Pigments," Itoh's "Dictionary of Pigments," and Leach and Pierce's "Printing Ink Manual."

In one aspect of the invention, a solvent may be added. Suitable solvents are described in the "Industrial Solvents Handbook, 4$^{th}$ Edition" edited by E. W. Flick (Noyes Data Corporation, Park Ridge, N.J., 1991), which disclosure is incorporated by reference herein. For additional consideration of solvents, useful information is described in "Polymer Handbook, 4$^{th}$ Edition," edited by J. Brandrup et. al. (J. Wiley and Sons, New York, 1999), which disclosure is incorporated by reference herein.

In one process for preparing a reactive solution comprising acetoacetate polymer is (a) producing polymerizable polymer in a low boiling solvent, (b) eliminating the low boiling solvent at atmospheric or reduced pressure; and (c) replenishing with at least one higher boiling reactive solvent. Wherein, the solvent is selected from polar and non-polar category. The typical non-limiting example of the solvents employed in the process would include toluene, xylene, cyclohexanone, chlorobenzene, methyl ethyl ketone, dichloroethane, chloroform, chloromethane, dichloromethane, carbon tetrachloride, ethylene chloride, trichloroethane, ethyl acetate, n-propyl acetate, iso-propyl acetate, 2-nitropropane, any form of water (distilled, deionized or tap) and water miscible solvents such as tetrahydrofuran, acetone, dioxane, dimethyl formamide, dimethyl sulfoxide, ethanol, methanol, propanol, isopropanol, butanol, isobutanol, ethylene glycol, ethylene glycol monomethyl ether, and propylene glycol. The solvent is eliminated from the reaction mixture employing suitable techniques that are known in the art to concentrate the reaction mixture, however, the preferable method of elimination is boiling, distilling, evaporating with or without vacuum.

In another aspect, application of a wide variety of compositions comprising the modified polymers are provided, including adhesives, aerosols, agricultural compositions, anti-soil redeposition agents, batteries, beverages, biocides, block copolymers, branch copolymers, cementing compositions, cleaning compositions, comb copolymers, coating compositions, conductive materials, cosmetic compositions, cross-linkers, decorated pigment surfaces, dental compositions, detergents, dispersants, drugs, electronics, encapsulations, foods, graft copolymers, hair sprays, household-industrial-institutional (HI&I), inks and coatings (suitable for use as a moisture resistant inkjet recording medium), interlaminate adhesives, lithographic solutions, membrane additive compositions, metal working fluids, oilfield compositions, paints, paper, personal care compositions, pharmaceuticals, pigment additives, plasters, plastics, printing, reactive biocides, refractive index modifiers, sequestrants, soil release compositions, static control agents, and wood-care compositions.

Compositions belonging to the personal care/cosmetic and pharmaceutical arts find utility in altering, delivering an active, enhancing, improving, modifying the appearance, condition, color, health, style of the skin (including face, scalp, and lips), hair, nails, and oral cavity. Many examples and product forms of these compositions are known. These compositions can impart benefits that include, but are not limited to, hair style flexibility, hair style durability, humidity resistance for hair, color and/or color protection, moisturization, wrinkle reduction, protection from ultraviolet radiation, water proofness, water resistance, wear resistance, thermal protection, adhesion, active ingredient delivery, anti-cavity, and/or anti-gingivitis protection. As such, these compositions are sometimes categorized in the following areas: skin care, hair care (both styling and non-styling), sun care, cosmetics (including color cosmetics), antiperspirants, deodorants, oral hygiene, and men's and women's personal hygiene/grooming. In some cases these benefits and care areas overlap with another.

Skin care compositions include those materials used on the body, face, hands, lips, and/or scalp, and are beneficial for many reasons, such as firming, anti-cellulite, moisturizing, nourishing, cleaning, reducing or eliminating the appearance of wrinkles or lentigo, toning, and/or purifying. They also can be used to sanitize.

Consumers can identify many of the compositions that serve the sun care area, for example after-fun, children's, beach, self-tan, sports (i.e., being sweatproof, waterproof, resistant to running, or having added UV absorbers and/or antioxidants), sensitive skin products (i.e., having low irritation to the eyes and/or skin, and/or being free of fragrances and/or dyes), daily wear, leave-on hair creams, lotions, styling products, and hair sprays. Typically, sun care products also comprise one or more UV actives, which are those organic and inorganic materials that scatter, absorb, and/or reflect radiation having a wavelength from about 100 nm to about 400 nm. In one aspect, the sun care product protects against UV-A and/or UV-B radiation. UV-A radiation, from about 320 nm to about 400 nm, has the longest wavelength within the UV spectrum, and consequently is the least energetic. While UV-A rays can induce skin tanning, they are liable to induce adverse changes as well, especially in the case of sensitive skin or of skin, which is continually exposed to solar radiation. In particular UV-A rays cause a loss of skin elasticity and the appearance of wrinkles, leading to premature skin aging. UV-B rays have shorter wavelengths, from about 290 nm to about 320 nm, and their higher energy can cause erythema and skin burns, which may be harmful. Alternatively, sun care products may omit UV actives, and may be regarded as a tanning oil or a tan promoter. Some sun care compositions may promote soothe skin after sun exposure, and/or be formulated for application to the lips, hair, or the area around the eyes. Self-tan compositions, which are products that color skin without requiring full sun exposure, also fit under the sun care umbrella. The many different sun care product formats include may assume a consistency ranging from liquid to semiliquid forms (e.g., milks, creams), to thicker forms like gels, creams, pastes, and even solid- and wax-like forms. Sun care products also may take the form of an aerosol, spray, mist, roll-on, or wipe.

Hair care compositions include shampoos, leave-on and rinse-out conditioners used for conditioning, moisturizing, repairing, hair colors, hair relaxers, and deep conditioners and treatments such as hot oils and waxes, 2-in-1 shampoo/conditioner combination products, 3-in-1 shampoo/conditioner/styling agent. The many types of hair care products can be delivered in an array of formats, including aerosol sprays, pump sprays, gel sprays, mousses, gels, waxes, creams, pomades, spritzes, putties, lacquers, de-frizzing serums, perms, relaxants and colorants.

Color cosmetic compositions include facial make-up, eye makeup, mascaras, lip and nail products. Facial make-up compositions include foundation (liquid, solid, and semi-solid) —skin tinted creams, liquid, sticks, mousses used as a base under make-up, rouge, face powder, blusher, highlighters, face bronzers, concealers, and 2-way cake products.

Personal care/cosmetics also include eye make-up, mascaras, eyeliners, eye shadows, eyebrow pencils and eye pencils. Lip products include lipsticks, lip pencils, lip gloss, transparent bases and tinted lip moisturizers as well as multi-function color sticks that can also be used for cheeks and eyes. Nail products include nail varnishes/enamels, nail varnish removers, treatments, home-manicure products such as cuticle softeners and nail strengtheners.

In addition to the skin, hair, and sun care compositions summarized above, the polymers related herein also find application in oral care compositions. Non-limiting examples or oral care compositions include toothpastes (including toothpaste gels), denture adhesives, whiteners, anesthetics, and dental floss and related products. These compositions may take any product format, such as pastes, gels, creams, solutions, dispersions, rinses, flosses, aerosols, powders, and lozenges.

Grooming products for men and women include shaving products and toiletries, which may find use in preparing the skin and/or hair for dry or wet shaving. In addition, these compositions may help to moisturize, cool, and/or soothe skin. A variety of product forms are known, a few of which are foams, gels, creams, sticks, oils, solutions, tonics, balms, aerosols, mists, sprays, and wipes.

The polymer can also be used in other personal care/cosmetic applications, such as an absorbent material in appropriate applications such as diapers, incontinence products, feminine products, and other related products.

The polymers described herein also find application in bath and shower compositions, such as foams, gels, salts, oils, balls, liquids, powders and pearls. Also included are bar soaps, body washes, shower gels, cleansers, gels, oils, foams, scrubs and creams. As a natural extension of this category, these compositions also include liquid soaps and hand sanitizers used for cleaning hands.

The polymer of the invention can be used in combination with one or more additional personal care/cosmetically acceptable additives chosen from, for example, conditioning agents, protecting agents, such as, for example, hydro-soluble, liposoluble and water-insoluble UV filters, antiradical agents, antioxidants, vitamins and pro-vitamins, fixing agents, oxidizing agents, reducing agents, dyes, cleansing agents, anionic, cationic, nonionic and amphoteric surfactants, thickeners, perfumes, pearlizing agents, stabilizers, pH adjusters, filters, preservatives, hydroxy acids, various cationic, anionic and nonionic polymers, cationic and nonionic polyether associative polyurethanes, vegetable oils, mineral oils, synthetic oils, polyols such as glycols and glycerol, silicones, aliphatic alcohols, colorants, bleaching agents, highlighting agents and sequestrants.

For some embodiments, it may be preferred to add one or more preservatives and/or antimicrobial agents, such as, but not limited to, benzoic acid, sorbic acid, dehydroacetic acid, piroctone olamine, DMDM hydantoin, IPBC, triclosan, bronopol, formaldehyde, isothiazolinones, nitrates/nitrites, parabens, phenoxyethanol, potassium sorbate, sodium benzoate, sulphites, and sulphur dioxide. Combinations of preservatives may be used.

In other embodiments it may be desirable to incorporate preservative boosters/solvents, select examples of which include caprylyl glycol, hexylene glycol, pentylene glycol, ethylhexylglycerin, caprylhydroxamic acid, and glyceryl caprylate. Humectants, which include glycerin, butylene glycol, propylene glycol, sorbitol, mannitol, and xylitol may be added. Polysaccharides, such as gum Arabic, may be included as well. It may be desirable to include one or more other ingredients, such as those described in U.S. patent publication 2010/0183532 and WO 2010/105050, which disclosures are incorporated herein by reference.

These additives may be present in the composition according to the invention in proportions that may range from about 0% to about 20% by weight in relation to the total weight of the composition. The precise amount of each additive may be easily determined by an expert in the field according to its nature and its function.

Examples of these co-ingredients and many others can be found in the following references, each of which is herein incorporated in its entirety by reference: "Inventory and common nomenclature of ingredients employed in cosmetic products," *Official Journal of the European Union*, 5.4.2006, pages L 97/1 through L 97/528; and *International Cosmetic Ingredient Dictionary and Handbook*, 13$^{th}$ edition, ISBN: 1882621476, published by The Personal Care Products Council in January 2010.

Any known conditioning agent is useful in the personal care/cosmetic compositions of this invention. Conditioning agents function to improve the cosmetic properties of the hair, particularly softness, thickening, untangling, feel, and static electricity and may be in liquid, semi-solid, or solid form such as oils, waxes, or gums. Similarly, any known skin-altering agent is useful in the compositions of this invention. A few examples of conditioning agents include cationic polymers, cationic surfactants and cationic silicones. Conditioning agents may be chosen from synthesis oils, mineral oils, vegetable oils, fluorinated or perfluorinated oils, natural or synthetic waxes, silicones, cationic polymers, proteins and hydrolyzed proteins, ceramide type compounds, cationic surfactants, fatty amines, fatty acids and their derivatives, as well as mixtures of these different compounds.

The synthesis oils include polyolefins, e.g., poly-α-olefins such as polybutenes, polyisobutenes and polydecenes. The polyolefins can be hydrogenated. The mineral oils suitable for use in the compositions of the invention include hexadecane and oil of paraffin. Suitable animal and vegetable oils include sunflower, corn, soy, avocado, jojoba, squash, raisin seed, sesame seed, walnut oils, fish oils, glycerol tricaprocaprylate, Purcellin oil or liquid jojoba. Suitable natural or synthetic oils include eucalyptus, lavender, vetiver, litsea cubeba, lemon, sandalwood, rosemary, chamomile, savory, nutmeg, cinnamon, hyssop, caraway, orange, geranium, cade, and bergamot. Suitable natural and synthetic waxes include carnauba wax, candelila wax, alfa wax, paraffin wax, ozokerite wax, vegetable waxes such as olive wax, rice wax, hydrogenated jojoba wax, absolute flower waxes such as black currant flower wax, animal waxes such as bees wax, modified bees wax (cerabellina), marine waxes and polyolefin waxes such as polyethylene wax.

The cationic polymers that may be used as a conditioning agent according to the invention are those known to improve the cosmetic properties of hair treated by detergent compositions. The expression "cationic polymer" as used herein, indicates any polymer containing cationic groups and/or ionizable groups in cationic groups. The cationic polymers used generally have a molecular weight the average number of which falls between about 500 and 5,000,000, for example between 1000 and 3,000,000. Cationic polymers may be chosen from among those containing units including primary, secondary, tertiary, and/or quaternary amine groups that may either form part of the main polymer chain or a side chain. Useful cationic polymers include known polyamine, polyaminoamide, and quaternary polyammonium types of polymers, such as:

homopolymers and copolymers derived from acrylic or methacrylic esters or amides. The copolymers can contain one or more units derived from acrylamides, methacrylamides, diacetone acrylamides, acrylamides and methacrylamides, acrylic or methacrylic acids or their esters, vinyllactams such as vinyl pyrrolidone or vinyl caprolactam, and vinyl esters. Specific examples include: copolymers of acrylamide and dimethyl amino ethyl methacrylate quaternized with dimethyl sulfate or with an alkyl halide; copolymers of acrylamide and methacryloyl oxyethyl trimethyl ammonium chloride; the copolymer of acrylamide and methacryloyl oxyethyl trimethyl ammonium methosulfate; copolymers of vinyl pyrrolidone/dialkylaminoalkyl acrylate or methacrylate, optionally quaternized, such as the products sold under the name Gafquat® by International Specialty Products; the dimethyl amino ethyl methacrylate/vinyl caprolactam/vinyl pyrrolidone terpolymers, such as the product sold under the name Gaffix® VC 713 by International Specialty Products; the vinyl pyrrolidone/methacrylamidopropyl dimethylamine copolymer, marketed under the name Styleze® CC-10 by International Specialty Products; the vinyl pyrrolidone/quaternized dimethyl amino propyl methacrylamide copolymers such as the product sold under the name Gafquat® HS-100 by International Specialty Products; and the vinyl pyrrolidone/dimethylaminopropyl methacrylamide/$C_9$-$C_{24}$ alkyldimethylaminopropyl methacrylic acid quaternized terpolymers described in U.S. Pat. No. 6,207,778 and marketed under the name Styleze® W-20 by International Specialty Products.

derivatives of cellulose ethers containing quaternary ammonium groups, such as hydroxy ethyl cellulose quaternary ammonium that has reacted with an epoxide substituted by a trimethyl ammonium group.

derivatives of cationic cellulose such as cellulose copolymers or derivatives of cellulose grafted with a hydrosoluble quaternary ammonium monomer, as described in U.S. Pat. No. 4,131,576, such as the hydroxy alkyl cellulose, and the hydroxymethyl-, hydroxyethyl- or hydroxypropyl-cellulose grafted with a salt of methacryloyl ethyl trimethyl ammonium, methacrylamidopropyl trimethyl ammonium, or dimethyl diallyl ammonium.

cationic polysaccharides such as described in U.S. Pat. Nos. 3,589,578 and 4,031,307, guar gums containing cationic trialkyl ammonium groups and guar gums modified by a salt, e.g., chloride of 2,3-epoxy propyl trimethyl ammonium.

polymers composed of piperazinyl units and alkylene or hydroxy alkylene divalent radicals with straight or branched chains, possibly interrupted by atoms of oxygen, sulfur, nitrogen, or by aromatic or heterocyclic cycles, as well as the products of the oxidation and/or quaternization of such polymers.

water-soluble polyamino amides prepared by polycondensation of an acid compound with a polyamine. These polyamino amides may be reticulated.

derivatives of polyamino amides resulting from the condensation of polyalkylene polyamines with polycarboxylic acids followed by alkylation by bi-functional agents.

polymers obtained by reaction of a polyalkylene polyamine containing two primary amine groups and at least one secondary amine group with a dioxycarboxylic acid chosen from among diglycolic acid and saturated dicarboxylic aliphatic acids having 3 to 8 atoms of carbon. Such polymers are described in U.S. Pat. Nos. 3,227,615 and 2,961,347.

the cyclopolymers of alkyl dialyl amine or dialkyl diallyl ammonium such as the homopolymer of dimethyl diallyl ammonium chloride and copolymers of diallyl dimethyl ammonium chloride and acrylamide.

quaternary diammonium polymers such as hexadimethrine chloride. Polymers of this type are described particularly in U.S. Pat. Nos. 2,273,780, 2,375,853, 2,388,614, 2,454,547, 3,206,462, 2,261,002, 2,271,378, 3,874,870, 4,001,432, 3,929,990, 3,966,904, 4,005,193, 4,025,617, 4,025,627, 4,025,653, 4,026,945, and 4,027,020.

quaternary polyammonium polymers, including, for example, Mirapol® A 15, Mirapol® AD1, Mirapol® AZ1, and Mirapol® 175 products sold by Miranol.

the quaternary polymers of vinyl pyrrolidone and vinyl imidazole such as the products sold under the names Luviquat® FC 905, FC 550, and FC 370 by BASF.

quaternary polyamines.

reticulated polymers known in the art.

Other cationic polymers that may be used within the context of the invention are cationic proteins or hydrolyzed cationic proteins, polyalkyleneimines such as polyethyleneimines, polymers containing vinyl pyridine or vinyl pyridinium units, condensates of polyamines and epichlorhydrins, quaternary polyurethanes, and derivatives of chitin. In one aspect, the cationic polymers may be derivatives of quaternary cellulose ethers, the homopolymers and copolymers of dimethyl diallyl ammonium chloride, quaternary polymers of vinyl pyrrolidone and vinyl imidazole, and mixtures thereof.

The conditioning agent can be any silicone known by those skilled in the art to be useful as a conditioning agent. The silicones suitable for use according to the invention include polyorganosiloxanes that are insoluble in the composition. The silicones may be present in the form of oils, waxes, polymers, or gums. They may be volatile or nonvolatile. The silicones can be selected from polyalkyl siloxanes, polyaryl siloxanes, polyalkyl aryl siloxanes, silicone gums and polymers, and polyorgano siloxanes modified by organofunctional groups, and mixtures thereof. Suitable polyalkyl siloxanes include polydimethyl siloxanes with terminal trimethyl silyl groups or terminal dimethyl silanol groups (dimethiconol) and polyalkyl ($C_1$-$C_{20}$) siloxanes. Suitable polyalkyl aryl siloxanes include polydimethyl methyl phenyl siloxanes and polydimethyl diphenyl siloxanes, linear or branched. The silicone gums suitable for use herein include polydiorganosiloxanes including those having a number-average molecular weight between 200,000 and 1,000,000, used alone or mixed with a solvent. Examples include polymethyl siloxane, polydimethyl siloxane/methyl vinyl siloxane gums, polydimethyl siloxane/diphenyl siloxane, polydimethyl siloxane/phenyl methyl siloxane and polydimethyl siloxane/diphenyl siloxane/methyl vinyl siloxane. Suitable silicone polymers include silicones with a dimethyl/trimethyl siloxane structure and polymers of the trimethyl siloxysilicate type. The organomodified silicones suitable for use in the invention include silicones such as those previously defined and containing one or more organofunctional groups attached by means of a hydrocarbon radical and grafted siliconated polymers. In one embodiment the silicones are amino functional silicones. The silicones may be used in the form of emulsions, nano-emulsions, or micro-emulsions.

The conditioning agent can be a protein or hydrolyzed cationic or non-cationic protein. Examples of these compounds include hydrolyzed collagens having triethyl ammonium groups, hydrolyzed collagens having trimethyl ammonium and trimethyl stearyl ammonium chloride groups, hydrolyzed animal proteins having trimethyl benzyl ammonium groups (benzyltrimonium hydrolyzed animal protein), hydrolyzed proteins having groups of quaternary ammonium on the polypeptide chain, including at least one $C_1$-$C_{18}$ alkyl. Hydrolyzed proteins include Croquat™ L, in which the quaternary ammonium groups include a $C_{12}$ alkyl group, Croquat™ M, in which the quaternary ammonium groups include $C_{10}$-$C_{18}$ alkyl groups, Croquat™ S in which the quaternary ammonium groups include a $C_{18}$ alkyl group and Crotein Q in which the quaternary ammonium groups include at least one $C_1$-$C_{18}$ alkyl group. These products are sold by Croda. The conditioning agent can comprise quaternized vegetable proteins such as wheat, corn, or soy proteins such as cocodimonium hydrolyzed wheat protein, laurdimonium hydrolyzed wheat protein and steardimonium hydrolyzed wheat protein.

The conditioning agent can be a ceramide type of compound such as a ceramide, a glycoceramide, a pseudoceramide, or a neoceramide. These compounds can be natural or synthetic. Compounds of the ceramide type are, for example, described in Patents pending DE4424530, DE4424533, DE4402929, DE4420736, WO95/23807, WO94/07844, EP-A-0646572, WO95/16665, FR-2 673 179, EP-A-0227994, WO 94/07844, WO 94/24097, and WO 94/10131. Ceramide type compounds useful herein include 2-N-linoleoyl amino-octadecane-1,3-diol, 2-N-oleoyl amino-octadecane-1, 3-diol, 2-N-palmitoyl amino-octadecane-1,3-diol, 2-N-stearoyl amino-octadecane-1,3-diol, 2-N-behenoyl amino-octadecane-1,3-diol, 2-N-[2-hydroxypalmitoyl]-amino-octadecane-1,3-diol, 2-N-stearoyl aminooctadecane-1,3,4-triol, N-stearoyl phytosphingosine, 2-N-palmitoyl amino-hexadecane-1,3-diol, bis-(N-hydroxy ethyl N-cetyl) malonamide, N(2-hydroxy ethyl)-N-(3-cetoxyl-2-hydroxy propyl) amide of cetylic acid, N-docosanoyl N-methyl-D-glucamine and mixtures of such compounds.

The conditioning agent can be a cationic surfactant such as a salt of a primary, secondary, or tertiary fatty amine, optionally polyoxyalkylenated, a quaternary ammonium salt, a derivative of imidazoline, or an amine oxide. Suitable examples include mono-, di-, or tri-alkyl quaternary ammonium compounds with a counter-ion such as a chloride, methosulfate, tosylate, etc. including, but not limited to, cetrimonium chloride, dicetyldimonium chloride, behentrimonium methosulfate, and the like. The presence of a quaternary ammonium compound in conjunction with the polymer described above reduces static and enhances combing of hair in the dry state. The polymer also enhances the deposition of the quaternary ammonium compound onto the hair substrate thus enhancing the conditioning effect of hair.

The conditioning agent can be any fatty amine known to be useful as a conditioning agent; e.g. dodecyl, cetyl or stearyl amines, such as stearamidopropyl dimethylamine. The conditioning agent can be a fatty acid or derivatives thereof known to be useful as conditioning agents. Suitable fatty acids include myristic acid, palmitic acid, stearic acid, behenic acid, oleic acid, linoleic acid, and isostearic acid. The derivatives of fatty acids include carboxylic ester acids including mono-, di-, tri- and tetra-carboxylic acids.

The conditioning agent can be a fluorinated or perfluorinated oil. Fluorinated oils include perfluoropolyethers described in EP-A-486135 and the fluorohydrocarbon compounds described in WO 93/11103. The fluoridated oils may also be fluorocarbons such as fluoramines, e.g., perfluorotributylamine, fluoridated hydrocarbons, such as perfluorodecahydronaphthalene, fluoroesters, and fluoroethers. Of course, mixtures of two or more conditioning agents can be used.

The conditioning agent or agents can be present in an amount from about 0.001% to about 20%, particularly from about 0.01% to about 10%, and even more particularly from about 0.1% to about 3% by weight based on the total weight of the final composition. The personal care/cosmetic compositions of the invention can contain one or more protecting agents in combination with the above-described polymer to prevent or limit the degrading effects of natural physical and/or chemical assaults on the keratinous materials.

The protecting agent can be chosen from hydrosoluble, liposoluble and water-insoluble UV filters, antiradical agents, antioxidants, vitamins and pro-vitamins. The above-described cationic polymer enhances the deposition of these materials onto the hair or skin substrate enhancing protection of hair to UV damage. Organic UV filters (systems that filter out UV rays) can be chosen from among hydrosoluble or liposoluble filters, whether siliconated or nonsiliconated, and mineral oxide particles, the surface of which may be treated. Hydrosoluble organic UV filters may be chosen from para-amino benzoic acid and its salts, anthranilic acid and its salts, salicylic acid and its salts, hydroxy cinnamic acid and its salts, sulfonic derivatives of benzothiazoles, benzimidizoles, benzoxazoles and their salts, sulfonic derivatives of benzophenone and their salts, sulfonic derivatives of benzylidene camphor and their salts, derivatives of benzylidene camphor substituted by a quaternary amine and their salts, derivatives of phthalydene-camphosulfonic acids and their salts, sulfonic derivatives of benzotriazole, and mixtures thereof. Hydrophilic polymers, which have light-protective qualities against UV rays, can be used. These include polymers containing benzylidene camphor and/or benzotriazole groups.

Suitable liposoluble organic UV filters include derivatives of para-aminobenzoic acid, such as the esters or amides of para-aminobenzoic acid; derivatives of salicylic acid; derivatives of benzophenone; derivatives of dibenzoyl methane; derivatives of diphenyl acrylates; derivatives of benzofurans; UV filter polymers containing one or more silico-organic residues; esters of cinnamic acid; derivatives of camphor; derivatives of trianilino-s-triazine; the ethylic ester urocanic acid; benzotriazoles; derivatives of hydroxy phenyl triazine; bis-resorcinol-dialkyl amino triazine; and mixtures thereof. The liposoluble (or lipophilic) organic UV filter can be chosen from octyl salicylate; 4-tert-butyl-4'-methoxy dibenzoyl methane; octocrylene; 4-methoxy cinnamate; 2-ethylhexyl [2-ethylhexyl 4-methoxycinnamate]; and 2-(2H-benzotriazol-2-yl)-4-methyl-6-[2-methyl-3-[1,3, 3,3-tetramethyl-1-[(trimethyl silyl)oxy] disiloxanyl]propynyl] phenol. Other UV filters that may be useful are derivatives of benzophenones such as 2-hydroxy-4-methoxy benzophenone-5-sulfonic acid, 2-hydroxy-4-methoxy benzophenone, derivatives of benzalmalonates such as poly dimethyl/methyl (3(4-(2,2-bis-ethoxy carbonyl vinyl)-phenoxy)-propenyl) siloxane, derivatives of benzylidene camphor such as b-b' camphosulfonic [1-4 divinylbenzene] acid and derivatives of benzimidazole such as 2-phenyl-benzimidazol-5-sulfonic acid. Water-insoluble UV filters include various mineral oxides. The mineral oxides may be selected from among titanium oxides, zinc oxides, and cerium oxides. The mineral oxides can be used in the form of ultrafine nanoparticles. For example, the UV filters can include Escalol® HP-610 (dimethylpabamido propyl laurdimonium tosylate and propylene glycol stearate) or Crodasorb HP (polyquarternium 59).

The antioxidants or antiradical agents can be selected from phenols such as BHA (tert-butyl-4-hydroxy anisole), BHT (2,6-di-tert-butyl-p-cresol), TBHQ (tert-butyl hydroquinone), polyphenols such as proanthocyanodic oligomers, flavonoids, hindered amines such as tetra amino piperidine, erythorbic acid, polyamines such as spermine, cysteine, glutathione, superoxide dismutase, and lactoferrin.

The vitamins can be selected from ascorbic acid (vitamin C), vitamin E, vitamin E acetate, vitamin E phosphate, B vitamins such as B3 and B5, vitamin PP, vitamin A, and derivatives thereof. The provitamins can be selected from panthenol and retinol.

The protecting agent can be present in an amount from about 0.001% to about 20% by weight, particularly from about 0.01% to about 10% by weight, and more particularly from 0.1% to about 5% by weight of the total weight of the final composition.

The composition of the invention can contain a fixing agent in combination with the above-described polymer. The fixing agent can be an anionic polymer chosen from polymers containing carboxylic units derived from unsaturated carboxylic mono- or polyacids of the formula:

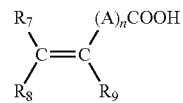

in which n is a whole number from 0 to 10, $A_1$ denotes a methylene group, optionally bonded to the carbon atom of the unsaturated group or to a neighboring methylene group when n is greater than 1 by means of a heteroatom like oxygen or sulfur, $R_7$ denotes a hydrogen atom, a phenyl or benzyl group, $R_8$ denotes a hydrogen atom, a lower alkyl or carboxyl group, $R_9$ denotes a hydrogen atom, a lower alkyl group, a —$CH_2$—COOH, phenyl or benzyl group and polymers containing units derived from sulfonic acid like vinylsulfonic, styrenesulfonic, acrylamidoalkylsulfonic units.

The fixing agent can be an amphoteric polymer chosen from the polymer containing recurring units derived from:

at least one monomer chosen from acrylamides or methacrylamides substituted on the nitrogen with an alkyl radical, at least one acid copolymer containing one or more reactive carboxyl groups, and at least one basic comonomer, such as esters with primary, secondary, tertiary, and quaternary amino substituents of acrylic and methacrylic acids and the product of quaternization of dimethylaminoethyl methacrylate with dimethyl or diethyl sulfate.

The fixing agent can be a nonionic polymer chosen from polyalkyloxazolines; vinyl acetate homopolymers; vinyl acetate and acrylic ester copolymers; vinyl acetate and ethylene copolymers; vinyl acetate and maleic ester copolymers; polyethylene and maleic anhydride copolymers; homopolymers of alkyl acrylates; homopolymers of alkyl methacrylates; copolymers of acrylic esters; copolymers of alkyl acrylates and alkyl methacrylates; copolymers of acrylonitrile and a nonionic monomer chosen from among butadiene and alkyl (meth)acrylates; copolymers of alkyl acrylate and urethane; and polyamides. The fixing agent can be a functionalized or unfunctionalized, silicone or nonsilicone polyurethane. The fixing polymer can be a polymer of the grafted silicone type containing a polysiloxane portion and a portion consisting of a nonsilicone organic chain, with one of the two portions forming the main chain of the polymer, and with the other being grafted onto the main chain.

The fixing agent can be present in the composition in a relative weight concentration between about 0.1% to about 10%, for example, from about 0.5% to about 5%.

The personal care/cosmetic composition of the invention can contain an oxidizing agent in combination with the above-described polymer. The oxidizing agent can be chosen from the group of hydrogen peroxide, urea peroxide, alkali metal bromates, ferricyanides, persalts, and redox enzymes, optionally with their respective donor or cofactor. For example, the oxidizing agent can be hydrogen peroxide. The oxidizing agent can be a solution of oxygenated water whose titer varies from 1 to 40 volumes.

The personal care/cosmetic composition of the invention can contain at least one reducing agent in combination with the above-described polymer in amounts from about 0.01% to about 30%, particularly from about 0.05% to about 20% of the total weight of the composition. The reducing agents can be selected from thiols, like cysteine, thioglycolic acid, thiolactic acid, their salts and esters, cysteamine, and its salts or sulfites. In the case of compositions intended for bleaching, ascorbic acid, its salts and its esters, erythorbic acid, its salts and its esters, and sulfinates, like sodium hydroxymethanesulfinate can be used.

The personal care/cosmetic composition of the invention can contain a dye in combination with the above-described polymer. The dye can be selected from the group consisting of neutral acid or cationic nitrobenzene dyes, neutral acid or cationic azo dyes, quinone dyes, neutral, acid or cationic anthraquinone dyes, azine dyes, triarylmethane dyes, indoamine dyes and natural dyes. The dye or dyes can be present in a concentration from about 0.001% to about 20%, and particularly from about 0.005% to about 10% based on the total weight of the composition.

The personal care/cosmetic composition of the invention can contain at least one amphoteric polymer or a cationic polymer in combination with the above-described polymer. Suitable cationic polymers include a poly(quaternary ammonium) consisting of recurrent units corresponding to the following formulae (W) and (U):

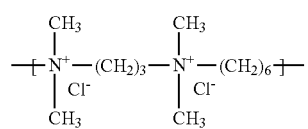
(W)

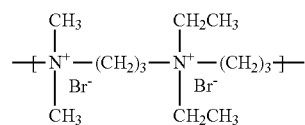
(U)

Suitable amphoteric polymers include a copolymer containing at least one acrylic acid and a dimethyldiallyammonium salt as a monomer. The cationic or amphoteric polymer or polymers can be present in an amount from about 0.01% to about 10%, particularly from about 0.05% to about 5%, and more particularly from about 0.1% to about 3% by weight of the total weight of the composition.

In addition, the personal care/cosmetic compositions can include at least one surfactant in combination with the above-described polymer. The surfactant can be present in an amount from about 0.1% to about 60%, particularly from about 1% to about 40%, and more particularly from about 5% to about 30% by weight based on the total weight of the composition. The surfactant may be chosen from among anionic, amphoteric, or non-ionic surfactants, or mixtures of them known to be useful in personal care/cosmetic compositions.

One or more suitable thickeners or viscosity increasing agents may be included in combination with the above-described polymer in the personal care/cosmetic compositions of the invention. Suitable thickeners and/or viscosity increasing agents include: Acetamide MEA; Acrylamide/Ethalkonium Chloride Acrylate Copolymer; Acrylamide/Ethyltrimonium Chloride Acrylate/Ethalkonium Chloride Acrylate Copolymer; Acrylamides Copolymer; Acrylamide/Sodium Acrylate Copolymer; Acrylamide/Sodium Acryloyldimethyltaurate Copolymer; Acrylates/Acetoacetoxyethyl Methacrylate Copolymer; Acrylates/Beheneth-25 Methacrylate Copolymer; Acrylates/C10-30 Alkyl Acrylate Crosspolymer; Acrylates/Ceteth-20 Itaconate Copolymer; Acrylates/Ceteth-20 Methacrylate Copolymer; Acrylates/Laureth-25 Methacrylate Copolymer; Acrylates/Palmeth-25 Acrylate Copolymer; Acrylates/Palmeth-25 Itaconate Copolymer; Acrylates/Steareth-50 Acrylate Copolymer; Acrylates/Steareth-20 Itaconate Copolymer; Acrylates/Steareth-20 Methacrylate Copolymer; Acrylates/Stearyl Methacrylate Copolymer; Acrylates/Vinyl Isodecanoate Crosspolymer; Acrylic Acid/Acrylonitrogens Copolymer; Adipic Acid/Methyl DEA Crosspolymer; Agar; Agarose; Alcaligenes Polysaccharides; Algin; Alginic Acid; Almondamide DEA; Almondamidopropyl Betaine; Aluminum/Magnesium Hydroxide Stearate; Ammonium Acrylates/Acrylonitrogens Copolymer; Ammonium Acrylates Copolymer; Ammonium Acryloyldimethyltaurate/Vinyl Formamide Copolymer; Ammonium Acryloyldimethyltaurate/VP Copolymer; Ammonium Alginate, Ammonium Chloride; Ammonium Polyacryloyldimethyl Taurate; Ammonium Sulfate; Amylopectin; Apricotamide DEA; Apricotamidopropyl Betaine; Arachidyl Alcohol; Arachidyl Glycol; *Arachis Hypogaea* (Peanut) Flour; Ascorbyl Methylsilanol Pectinate; *Astragalus Gummifer* Gum; Attapulgite; *Avena Sativa* (Oat) Kernel Flour; Avocadamide DEA; Avocadamidopropyl Betaine, Azelamide MEA; Babassuamide DEA; Babassuamide MEA; Babassuamidopropyl Betaine; Behenamide DEA; Behenamide MEA, Behenamidopropyl Betaine; Behenyl Betaine; Bentonite; Butoxy Chitosan, *Caesalpinia Spinosa* Gum; Calcium Alginate; Calcium Carboxymethyl Cellulose; Calcium Carrageenan; Calcium Chloride; Calcium Potassium Carbomer; Calcium Starch Octenylsuccinate; C20-40 Alkyl Stearate; Canolamidopropyl Betaine; Capramide DEA; Capryl/Capramidopropyl Betaine; Carbomer; Carboxybutyl Chitosan; Carboxymethyl Cellulose Acetate Butyrate; Carboxymethyl Chitin; Carboxymethyl Chitosan; Carboxymethyl Dextran; Carboxymethyl Hydroxyethylcellulose; Carboxymethyl Hydroxypropyl Guar; Carnitine; Cellulose Acetate Propionate Carboxylate; Cellulose Gum; *Ceratonia Siliqua* Gum; Cetearyl Alcohol; Cetyl Alcohol; Cetyl Babassuate; Cetyl Betaine; Cetyl Glycol; Cetyl Hydroxyethylcellulose; Chimyl Alcohol; Cholesterol/HDI/Pullulan Copolymer; Cholesteryl Hexyl Dicarbamate Pullulan; *Citrus Aurantium Dulcis* (Orange) Peel Extract; Cocamide DEA; Cocamide MEA; Cocamide MIPA; Cocamidoethyl Betaine; Cocamidopropyl Betaine; Cocamidopropyl Hydroxysultaine; Coco-Betaine; Coco-Hydroxysultaine; Coconut Alcohol; Coco/Oleamidopropyl Betaine; Coco-Sultaine; Cocoyl Sarcosinamide DEA; Cornamide/Cocamide DEA; Cornamide DEA; Croscarmellose; Crosslinked *Bacillus*/Glucose/Sodium Glutamate Ferment; *Cyamopsis Tetragonoloba* (Guar) Gum; Decyl Alcohol; Decyl Betaine; Dehydroxanthan Gum; Dextrin; Dibenzylidene Sorbitol; Diethanolaminooleamide DEA; Diglycol/CHDM/Isophthalates/SIP Copolymer; Dihydroabietyl Behenate; Dihydrogenated Tallow Benzylmonium Hectorite; Dihydroxyaluminum Aminoacetate; Dimethicone/PEG-10 Crosspolymer; Dimethicone/PEG-15 Crosspolymer; Dimethicone Propyl PG-Betaine; Dimethylacrylamide/Acrylic Acid/Polystyrene Ethyl Methacrylate Copolymer; Dimethylacrylamide/Sodium Acryloyldimethyltaurate Crosspolymer; Disteareth-100 IPDI; DMAPA Acrylates/Acrylic Acid/Acrylonitrogens Copolymer; Erucamidopropyl Hydroxysultaine; Ethylene/Sodium Acrylate Copolymer; Gelatin; Gellan Gum; Glyceryl Alginate; *Glycine Soja* (Soybean) Flour; Guar Hydroxypropyltrimonium Chloride; Hectorite; Hyaluronic Acid; Hydrated Silica; Hydrogenated Potato Starch; Hydrogenated Tallow; Hydrogenated Tallowamide DEA; Hydrogenated Tallow Betaine; Hydroxybutyl Methylcellulose; Hydroxyethyl Acrylate/Sodium Acryloyldimethyl Taurate Copolymer; Hydroxyethylcellulose; Hydroxyethyl Chitosan; Hydroxyethyl Ethylcellulose; Hydroxyethyl Stearamide-MIPA; Hydroxylauryl/Hydroxymyristyl Betaine; Hydroxypropylcellulose; Hydroxypropyl Chitosan; Hydroxypropyl Ethylenediamine Carbomer; Hydroxypropyl Guar; Hydroxypropyl Methylcellulose; Hydroxypropyl Methylcellulose Stearoxy Ether; Hydroxypropyl Starch; Hydroxypropyl Starch Phosphate; Hydroxypropyl Xanthan Gum; Hydroxystearamide MEA; Isobutylene/Sodium Maleate Copolymer; Isostearamide DEA; Isostearamide MEA; Isostearamide MIPA; Isostearamidopropyl Betaine; Lactamide MEA; Lanolinamide DEA; Lauramide DEA; Lauramide MEA; Lauramide MIPA; Lauramide/Myristamide DEA; Lauramidopropyl Betaine; Lauramidopropyl Hydroxysultaine; Laurimino Bispropanediol; Lauryl Alcohol; Lauryl Betaine; Lauryl Hydroxysultaine; Lauryl/Myristyl Glycol Hydroxypropyl Ether; Lauryl Sultaine; Lecithinamide DEA; Linoleamide DEA; Linoleamide MEA; Linoleamide MIPA; Lithium Magnesium Silicate; Lithium Magnesium Sodium Silicate; *Macrocystis Pyrifera* (Kelp); Magnesium Alginate; Magnesium/Aluminum/Hydroxide/Carbonate; Magnesium Aluminum Silicate; Magnesium Silicate; Magnesium Trisilicate; Methoxy PEG-22/Dodecyl Glycol Copolymer; Methylcellulose; Methyl Ethylcellulose; Methyl Hydroxyethylcellulose; Microcrystalline Cellulose; Milkamidopropyl Betaine; Minkamide DEA; Minkamidopropyl Betaine; MIPA-Myristate; Montmorillonite; Moroccan Lava Clay; Myristamide DEA; Myristamide MEA; Myristamide MIPA; Myristamidopropyl Betaine; Myristamidopropyl Hydroxysultaine; Myristyl Alcohol; Myristyl Betaine; Natto Gum; Nonoxynyl Hydroxyethylcellulose; Oatamide MEA; Oatamidopropyl Betaine; Octacosanyl Glycol Isostearate; Octadecene/MA Copolymer; Oleamide DEA; Oleamide MEA; Oleamide MIPA; Oleamidopropyl Betaine; Oleamidopropyl Hydroxysultaine; Oleyl Betaine; Olivamide DEA; Olivamidopropyl Betaine; Oliveamide MEA; Palmamide DEA; Palmamide MEA; Palmamide MIPA; Palmamidopropyl Betaine; Palmitamide DEA; Palmitamide MEA; Palmitamidopropyl Betaine; Palm Kernel Alcohol; Palm Kernelamide DEA; Palm Kernelamide MEA; Palm Kernelamide MIPA; Palm Kernelamidopropyl Betaine; Peanutamide MEA; Peanutamide MIPA; Pectin; PEG-800; PEG-Crosspolymer; PEG-150/Decyl Alcohol/SMDI Copolymer; PEG-175 Diisostearate; PEG-190 Distearate; PEG-15 Glyceryl Tristearate; PEG-140 Glyceryl Tristearate; PEG-240/HDI Copolymer Bis-Decyltetradeceth-20 Ether; PEG-100/IPDI Copolymer; PEG-180/Laureth-50/TMMG Copolymer; PEG-10/Lauryl Dimethicone Crosspolymer; PEG-15/Lauryl Dimethicone Crosspolymer; PEG-2M; PEG-5M; PEG-7M; PEG-9M; PEG-14M; PEG-20M; PEG-23M; PEG-25M; PEG-45M; PEG-65M; PEG-90M; PEG-115M; PEG-160M; PEG-180M; PEG-120 Methyl Glucose Trioleate; PEG-180/Octoxynol-40/TMMG Copolymer; PEG-150 Pentaerythrityl Tetrastearate; PEG-4 Rapeseedamide; PEG-150/Stearyl Alcohol/SMDI Copolymer; *Phaseolus Angularis* Seed Powder; *Polianthes Tuberosa* Extract; Polyacrylate-3; Polyacrylic Acid; Polycyclopentadiene; Polyether-1; Polyethylene/Isopropyl Maleate/MA Copolyol; Polyglyceryl-3 Disiloxane Dimethicone; Polyglyceryl-3 Polydimethylsiloxyethyl Dimethicone; Polymethacrylic Acid; Polyquaternium-52; Polyvinyl Alcohol; Potassium Alginate; Potassium Aluminum Polyacrylate; Potassium Carbomer; Potassium Carrageenan; Potassium Chloride; Potassium Palmate; Potassium Polyacrylate; Potassium Sulfate; Potato Starch Modified; PPG-2 Cocamide; PPG-1 Hydroxyethyl Caprylamide; PPG-2 Hydroxyethyl Cocamide; PPG-2 Hydroxyethyl Coco/Isostearamide; PPG-3 Hydroxyethyl Soyamide; PPG-14 Laureth-60 Hexyl Dicarbamate; PPG-14 Laureth-60 Isophoryl Dicarbamate; PPG-14 Palmeth-60 Hexyl Dicarbamate; Propylene Glycol Alginate; PVP/Decene Copolymer; PVP Montmorillonite; *Pyrus Cydonia* Seed; *Pyrus Malus* (Apple) Fiber; Rhizobian Gum; Ricebranamide DEA; Ricinoleamide DEA; Ricinoleamide MEA; Ricinoleamide MIPA; Ricinoleamidopropyl Betaine; Ricinoleic Acid/Adipic Acid/AEEA Copolymer; *Rosa Multiflora* Flower Wax; *Sclerotium* Gum; Sesamide DEA; Sesamidopropyl Betaine; Sodium Acrylate/Acryloyldimethyl Taurate Copolymer; Sodium Acrylates/Acrolein Copolymer; Sodium Acrylates/Acrylonitrogens Copolymer; Sodium Acrylates Copolymer; Sodium Acrylates Crosspolymer; Sodium Acrylate/Sodium Acrylamidomethylpropane Sulfonate Copolymer; Sodium Acrylates/Vinyl Isodecanoate Crosspolymer; Sodium Acrylate/Vinyl Alcohol Copolymer; Sodium Carbomer; Sodium Carboxymethyl Chitin; Sodium Carboxymethyl Dextran; Sodium Carboxymethyl Beta-Glucan; Sodium Carboxymethyl Starch; Sodium Carrageenan; Sodium Cellulose Sulfate; Sodium Chloride; Sodium Cyclodextrin Sulfate; Sodium Hydroxypropyl Starch Phosphate; Sodium Isooctylene/MA Copolymer; Sodium Magnesium Fluorosilicate; Sodium Oleate; Sodium Palmitate; Sodium Palm Kernelate; Sodium Polyacrylate; Sodium Polyacrylate Starch; Sodium Polyacryloyldimethyl Taurate; Sodium Polygamma-Glutamate; Sodium Polymethacrylate; Sodium Polystyrene Sulfonate; Sodium Silicoaluminate; Sodium Starch Octenylsuccinate; Sodium Stearate; Sodium Stearoxy PG-Hydroxyethylcellulose Sulfonate; Sodium Styrene/Acrylates Copolymer; Sodium Sulfate; Sodium Tallowate; Sodium Tauride Acrylates/Acrylic Acid/Acrylonitrogens Copolymer; Sodium Tocopheryl Phosphate; *Solanum Tuberosum* (Potato) Starch; Soyamide DEA; Soyamidopropyl Betaine; Starch/Acrylates/Acrylamide Copolymer; Starch Hydroxypropyltrimonium Chloride; Stearamide AMP; Stearamide DEA; Stearamide DEA-Distearate; Stearamide DIBA-Stearate; Stearamide MEA; Stearamide MEA-Stearate; Stearamide MIPA; Stearamidopropyl Betaine; Steareth-60 Cetyl Ether; Steareth-100/PEG-136/HDI Copolymer; Stearyl Alcohol; Stearyl Betaine; *Sterculia Urens* Gum; Synthetic Fluorphlogopite; Tallamide DEA; Tallow Alcohol; Tallowamide DEA; Tallowamide MEA; Tallowamidopropyl Betaine; Tallowamidopropyl Hydroxysultaine; Tallowamine Oxide; Tallow Betaine; Tallow Dihydroxyethyl Betaine; Tamarindus Indica Seed Gum; Tapioca Starch; TEA-Alginate; TEA-Carbomer; TEA-Hydrochloride; Trideceth-2 Carboxamide MEA; Tridecyl Alcohol; Triethylene Glycol Dibenzoate; Trimethyl Pentanol Hydroxyethyl Ether; *Triticum Vulgare* (Wheat) Germ Powder; *Triticum Vulgare* (Wheat) Kernel Flour; *Triticum Vulgare* (Wheat) Starch; Tromethamine Acrylates/Acrylonitrogens Copolymer; Tromethamine Magnesium Aluminum Silicate; Undecyl Alcohol; Undecylenamide DEA; Undecylenamide MEA; Undecylenamidopropyl Betaine; Welan Gum; Wheat Germamide DEA; Wheat Germamidopropyl Betaine; Xanthan Gum; Yeast Beta-Glucan; Yeast Polysaccharides and *Zea Mays* (Corn) Starch.

In one such embodiment, the thickeners or viscosity increasing agents include carbomers, Aculyn™ and Stabileze®, e.g., crosslinked acrylic acid, crosslinked poly(methylvinyl ether/maleic anhydride) copolymer, acrylamides, carboxymethyl cellulose, and the like.

The personal care/cosmetic compositions may be used to wash and treat keratinous material such as hair, skin, eyelashes, eyebrows, fingernails, lips, and hairy skin.

The personal care/cosmetic compositions can be detergent compositions such as shampoos, bath gels, and bubble baths. In this mode, the compositions will comprise a generally aqueous washing base. The surfactant or surfactants that form the washing base may be chosen alone or in blends, from known anionic, amphoteric, or non-ionic surfactants. The quantity and quality of the washing base must be sufficient to impart a satisfactory foaming and/or detergent value to the final composition. The washing base can be from about 4% to about 50% by weight, particularly from about 6% to about 35% by weight, and even more particularly from about 8% to about 25% by weight of the total weight of the final composition.

The pH of the composition applied to the keratinous material is generally between 2 and 12. In one embodiment, the pH is from about 3 to about 8, and may be adjusted to the desired value by means of acidifying or alkalinizing agents that are well known in the state of the art. Thus, the composition of the invention can contain at least one alkalizing or acidifying agent in amounts from about 0.01% to about 30% based on the total weight of the composition.

The alkalizing agent can be chosen from ammonia, alkali carbonates, alkanolamines, like mono-, di- and triethanolamines, as well as their derivatives, hydroxyalkylamines and ethoxylated and/or propoxylated ethylenediamines, sodium or potassium hydroxides and compounds of the following formula:

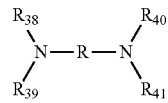

in which R is a propylene residue optionally substituted with an hydroxyl group or a $C_1$-$C_4$ alkyl radical; $R_{38}$, $R_{39}$, $R_{40}$ and $R_{41}$, identical or different, represent a hydrogen atom, a $C_1$-$C_4$ alkyl radical or $C_1$-$C_4$ hydroxyalkyl radical.

The acidifying agent can be chosen from mineral or organic acids, like hydrochloric acid, orthophosphoric acid, carboxylic acids like tartaric acid, citric acid, or lactic acid, or sulfonic acids, and the like.

The personal care/cosmetic compositions of the invention may include a physiological and cosmetically acceptable medium. Such medium may consist exclusively of water, a cosmetically acceptable solvent, or a blend of water and a cosmetically acceptable solvent, such as a lower alcohol composed of $C_1$ to $C_4$, such as ethanol, isopropanol, t-butanol, n-butanol, alkylene glycols such as propylene glycol, and glycol ethers. Alternatively, the personal care/cosmetic compositions can be anhydrous.

Generally, personal care/cosmetic compositions can be prepared by simple mixing procedures well known in the art. The invention provides a method for treating keratinous material including the skin or hair, by applying to skin or keratinous materials a personal care/cosmetic composition as described above, and then eventually rinsing it with water. Accordingly, the method makes it possible to maintain the hairstyle, treatment, care, washing, or make-up removal of the skin, the hair, and any other keratinous material. The personal care/cosmetic compositions may also take the form of after-shampoo compositions, to be rinsed off or not, for permanents, straightening, waving, dyeing, or bleaching, or the form of rinse compositions to be applied before or after dyeing, bleaching, permanents, straightening, relaxing, waving or even between the two stages of a permanent or straightening process. The personal care/cosmetic compositions may also take the form of skin-washing compositions, and particularly in the form of solutions or gels for the bath or shower, or of make-up removal products. The personal care/cosmetic compositions may also be in the form of aqueous or hydro-alcoholic solutions for skin and/or hair care. The personal care/cosmetic compositions described herein are useful in personal care/cosmetic products, including, but not limited to, gels, lotions, glazes, glues, mousses, sprays, fixatives, polymer based dyes (ref. WO2011/113249A1), shampoos, conditioners, 2-in-1 shampoos, temporary hair dyes, semi-permanent hair dyes, permanent hair dyes, straighteners, permanent waves, relaxers, creams, putties, waxes, pomades, moisturizers, mascaras, lip balms and foam enhancers.

The modified polymers can be prepared according to the examples set out below. The examples are presented for purposes of demonstrating, but not limiting, the preparation of the compounds and compositions of this invention.

EXAMPLES

The following non-limiting examples are provided to illustrate a few of the methods for preparing lactamic polymers containing an acetoacetate moiety and functionalized lactamic polymers. The examples are presented for purposes of demonstrating, but not limiting, the preparation of the compounds and compositions of this invention.

General Experimental

The terpolymer of poly(vinyl pyrrolidone-co-maleic anhydride-co-acetoacetoxyethyl methacrylate) (PVP/MAN/AAEM) based materials were prepared as described in Hood, D. K.; Visscher, K. B.; Kamin, S., PCT/US2011/55701. Hydroxyethyl Cellulose (HEC) and polyvinyl pyrrolidone (PVP) K-30 are available from Ashland Specialty Ingredients. Polyvinyl alcohol (PVOH) (88% hydrolyzed, Mw 13K to 23K) is available from Aldrich, Milwaukee, Wis. Polyfunctional aziridine (PZ-33) is available from Polyaziridine, LLC. Glyoxal is available from TCI America, Portland, Oreg. Dispal 11N7-80 ($Al_2O_3$) is available from Sasol North America Inc, Houston, Tex. Hydroxyethyl acrylate (HEA), triethyl amine (TEA), and 1,5-diazabicyclo[4.3.0]non-5-ene (DBN) are available from Aldrich Chemicals. De-ionized water and ethanol were used.

A 10% by weight solution of PVP/MAN/AAEM was prepared by mixing 10 grams of the polymer with 90 grams of 50:50 blend of de-ionized water and ethanol (by weight). These mixtures were left to mix overnight on a rotating wheel yielding clear solutions. A quantity of 10% by weight solutions of HEC, PVOH, and PVP K30 were similarly prepared. Mixtures of these solutions were made to evaluate cross-linking potential. Coatings were drawn on to 4 mil white Melinex®[13] film with a #80 rod. Films were cured in an oven set at 140° C. for 30 minutes for PVOH containing coatings. Films were cured in an oven set at 120° C. for 20 minutes for HEC containing coatings. Control coating films were dried at 130° C. for 30 minutes.

Coatings of PVP/MAN/AAEM (in 50:50 ethanol:water) with 5 wt % of glyoxal, 5 wt % PZ-33, and 5 wt % of 1:1 glyoxal:PZ-33 were prepared as above in ethanol:water mixture. Coatings were drawn on to 4 mil white Melinex® film with a #80 rod. Films were cured at 130° C. for 30 minutes.

Water resistance of the films was determined by immersing the cured films in de-ionized water with constant stirring. The coatings were evaluated by rubbing the coating by hand to check coating removal.

The resulting wet film was placed into a Fusion UV LC-6B bench-top conveyor equipped with F300S/SQ lamp system. The belt speed was set for 15 ft/min. The approximate dose is ~1500 $mJ/cm^2$ and the intensity is 4.6 $W/cm^2$. The printed film was allowed to stand for a minimum of 24 hours.

Gloss was measured at 60° using a BYK micro-TRI-gloss meter (Model 4430; Geretsried, Germany) when coating was applied to white Melinex® film. Pencils of various degrees of hardness were drawn over coated surface to determine which pencil caused indentation. Harder surfaces require higher pencil numbers. Adhesion of coatings to clear Melinex® was conducted by Cross-Hatch adhesion test with adhesive tape. For Taber abrasion, the coating was placed in a Teledyne 5150 Abraser (N. Tonawanda, N.Y.) equipped with CS-17 wheels and 1000 gram load. Solvent resistance of the films was judged by MEK rub tests where a cheesecloth was wrapped around a 16 oz ball hammer (300 g rub weight). The coated surface was rubbed for a maximum of 200 times while wetting the cheesecloth every 50 rubs. The coating was examined for signs of attack such as blistering, peeling, or discoloration.

Example 1

Synthesis of Vp/MAN/AcAc (33/33/33)

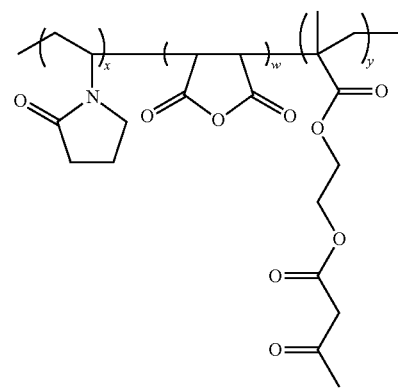

Feed one is prepared with 22.77 g vinyl pyrrolidone (Vp) and 39.41 g methyl ethyl ketone (MEK, 2-butanone), 20.09 g maleic anhydride (MAN) and 43.90 g acetoacetoxyethyl methacrylate (AcAc). Put 189.15 g MEK into the reactor and commence purging of the reaction vessel with nitrogen. Heat the reaction flask containing MEK to reflux at approximately 78° C. In a separate vessel, prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. During the initiator shots, additional MEK was added to replace any that has volatilized. Cool the reaction vessel and leave the material in the reactor. This is the end of day one. On day two, re-heat the vessel to reflux and charge with 2.0 g Triganox 25C 75. Hold for 2 hours. Add an additional 2.0 g Triganox 25C 75. Hold for 5 hours then cool reaction mixture. Structure confirmed by NMR. K-Value=9.3. Tg=96.4° C. (1st Heating)

Example 2

Synthesis of Vp/MAN-Sodium Salt/AcAc (33/33/33)

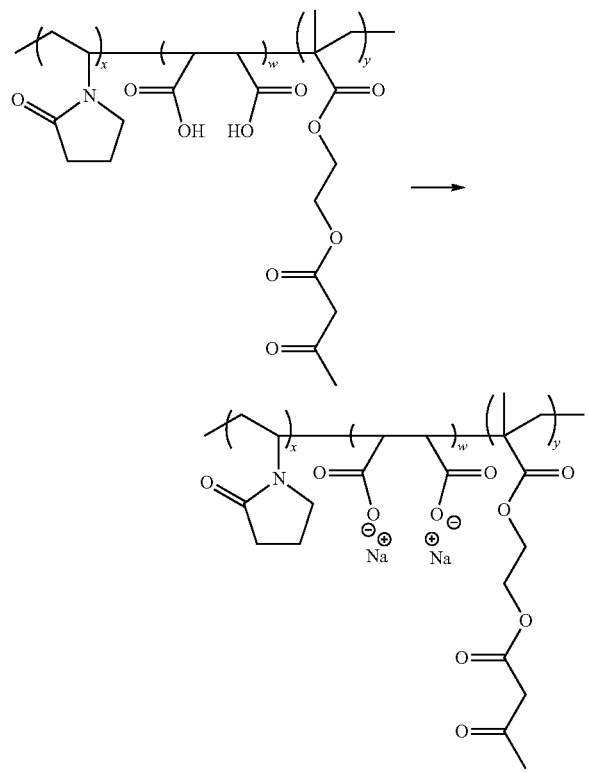

Samples of the polymer generated in Example 1 (Vp/MAN/AcAc (33/33/33)) were precipitated into methyl t-butyl ether and dried to yield a (water-insoluble) white powder. One gram of the powder was suspended in water (approx 50 g) and sodium bicarbonate powder is added to bring the pH of the water solution to pH 8. Additional bicarbonate is added to maintain the pH at 8 as the polymer dissolves.

Example 3

Synthesis of Vp/MAN-Ammonium Hydroxide Salt/AcAc (33/33/33)

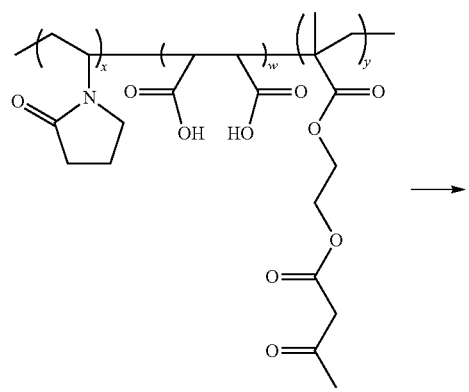

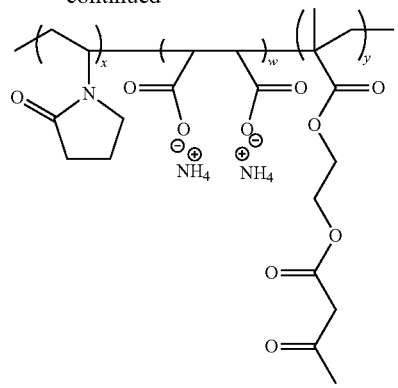

Samples of the polymer generated in Example 1 (Vp/MAN/AcAc (33/33/33)) were precipitated into methyl t-butyl ether and dried to yield a (water insoluble) white powder. One gram of the powder was suspended in water (approx 50 g) and ammonium hydroxide solution is added to bring the pH of the water solution to pH 8. Additional ammonium hydroxide solution is added to maintain the pH at 8 as the polymer dissolves.

Example 4

Synthesis of Vp/MAN/Iso-Octyl Acrylate/AcAc (33/33/31/2)

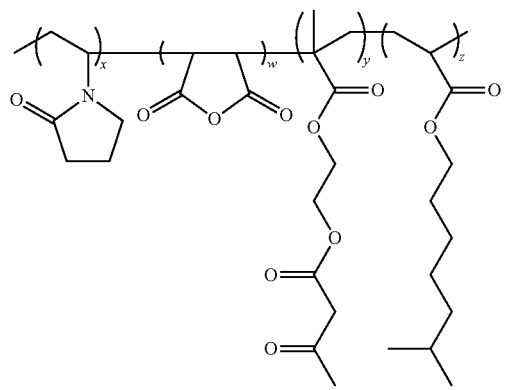

Feed one is prepared with 23.18 g vinyl pyrrolidone (Vp) and 40.11 g MEK, 20.45 g maleic anhydride (MAN); 35.75 g iso-Octyl Acrylate and 2.68 g acetoacetoxyethyl methacrylate (AcAc). Put 192.53 g MEK into the reactor and commence purging of the reaction vessel with nitrogen. Heat the reaction flask containing MEK to reflux, approximately 78° C. In a separate vessel prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. During the initiator shots, additional MEK was added to replace any that has volatilized. Cool the reaction vessel and leave the material in the reactor. This is the end of day one. On day two, re-heat the vessel to reflux and charge with 2.0 g Triganox 25C 75. Hold for 2 hours. Add an additional 2.0 g Triganox 25C 75. Hold for 5 hours then cool reaction mixture. K-Value=9.7.

Example 5

Synthesis of Vp/MAN/Iso-Octyl Acrylate/Octyl Acrylate/Allyl-AcAc (33/33/16.6/14.4/2)

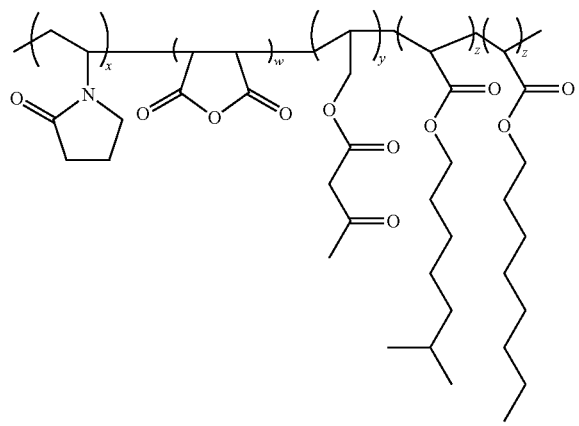

Feed one is prepared with 23.24 g vinyl pyrrolidone (Vp) and 40.21 g MEK, 20.51 g maleic anhydride (MAN); 19.20 g iso-Octyl Acrylate; 16.64 g Octyl Acrylate and 1.78 g Allyl Acetoacetate (Allyl-AcAc). Put 192.53 g MEK into the reactor and commence purging of the reaction vessel with nitrogen. Heat the reaction flask containing MEK to reflux, approximately 78° C. In a separate vessel prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. During the initiator shots, additional MEK was added to replace any that has volatilized. Cool the reaction vessel and leave the material in the reactor. This is the end of day one. On day two, re-heat the vessel to reflux and charge with 2.0 g Triganox 25C 75. Hold for 2 hours. Add an additional 2.0 g Triganox 25C 75. Hold for 5 hours then cool reaction mixture. K-Value=9.0.

Example 6

Synthesis of Vp/MAN/Iso-Octyl Acrylate/Octyl Acrylate/Allyl-AcAc (33/33/16.6/14.4/2) to Sodium and Ammonium Salts

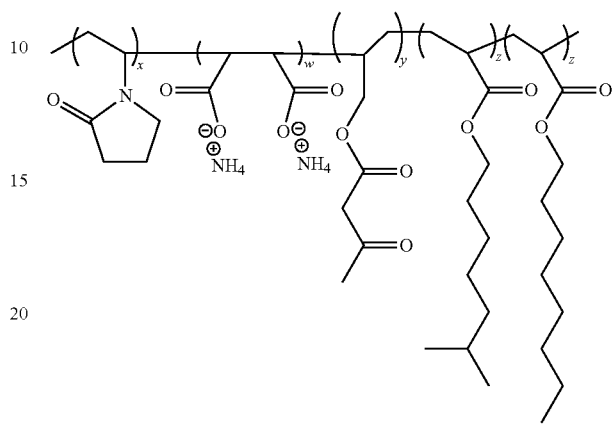

Samples of the polymer generated in Example 5 (VP/MAN/iso OA/OA/allyl acac (33/33/16.6/14.4/2) were precipitated into methyl t-butyl ether and dried to yield a (water insoluble) white powder. One gram of the powder was suspended in water (approx 50 g) and ammonium hydroxide solution is added to bring the pH of the water solution to pH 8. Additional ammonium hydroxide solution is added to maintain the pH at 8 as the polymer dissolves.

Example 7

Synthesis of VpNCap/AcAc (94/3/3)

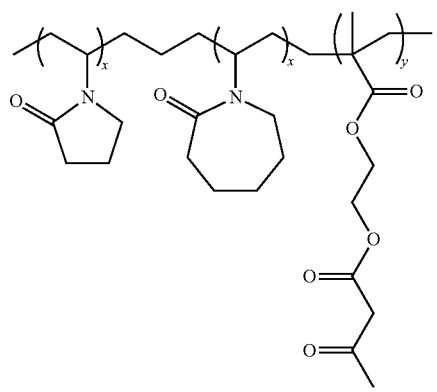

Feed one is prepared with 364.17 g vinyl pyrrolidone (Vp); 14.56 Vinyl caprolactam (VCap); and 22.40 g acetoacetoxyethyl methacrylate (AcAc). Put 748.50 g of water and 320.77 g of isopropanol into the reactor and commence purging of the reaction vessel with nitrogen. Adjust pH to 7 with sodium bicarbonate. Heat the reaction flask containing water/isopropanol mixture to approximately 75° C. Nitrogen is bubbled through the solution throughout the heat-up and the feeding of the monomer. In a separate vessel prepare a mixture of Triganox 121 (8 g) and isopropanol (20.12 g). Label this vessel "Initiator Solution". When the reaction flask has reached 75° C., begin adding Feed 1, drop-wise, in to the reaction vessel over a period of 180 minutes. After 15 minutes of monomer feed, add 6 g of the Triganox Solution into the reactor. Continue the drop-wise addition of Feed 1 over a period of approximately 165 minutes. While the monomers are feeding into the reactor, after 30 minutes charge 6.0 g of the Triganox solution. After 60, and 120 minutes, charge 6.0 g Triganox solution into the reactor. At the completion of the monomer feeds, charge the reaction vessel with the remainder of the Triganox solution. The reaction vessel is allowed to heat at reflux for an additional 180 minutes. Cool the reaction vessel and leave the material in the reactor. This is the end of day one. On day two, re-heat the vessel to 75° C. and charge with 1.5 g Triganox 121/4 g Isopropanol. Hold for 2 hours. Add an additional 1.5 g Triganox 121/4 g Isopropanol. Hold for 5 hours then cool reaction mixture. Structure confirmed by NMR. K-Value=56.7. Tg=162.5° C. (1st Heating)

Example 8

Synthesis of VCap/Vp/AcAc (67.3/30.6/2.1)

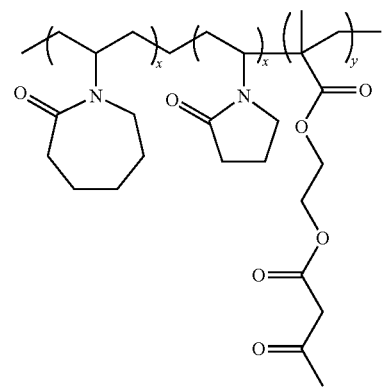

Feed one is prepared with 28.93 g vinyl pyrrolidone (Vp); 34.12 g ethanol; 79.69 g vinyl caprolactam (VCap) and 3.82 g acetoacetoxyethyl methacrylate (AcAc). Put 145.35 g of ethanol into the reactor and commence purging of the reaction vessel with nitrogen. Heat the reaction flask to approximately 70° C. Nitrogen is bubbled through the solution throughout the heat-up and the feeding of the monomer. In a separate vessel prepare a mixture of Triganox 121 (2 g) Label this vessel "Initiator Solution". When the reaction flask has reached 70° C., begin adding Feed 1, drop-wise, in to the reaction vessel over a period of 180 minutes. Add 0.5 g of the initiator solution when the monomer feed begins (this is Time=0). After 60, 120 and 180 minutes of monomer feed, add 0.5 g of the Initiator Solution into the reactor. After the completion of the monomer addition, dilute with 56.12 g ethanol. Heat the reaction to 78° C. and hold for 120 minutes. After the 120 minutes hold, add 0.75 g Triganox 121 initiator. Hold the reaction at 78 for 90 minutes. After the 90 minute hold, cool the reaction vessel and leave the material in the reactor. This is the end of day one. On day two, reheat the vessel to 78° C. and charge with 0.75 g Triganox 121. Hold for 8 hours then cool reaction mixture. Tg=~176° C. (1st Heating)

Example 9

Synthesis of VP/MAN/ACAC Michael Addition with ICEMA to Water

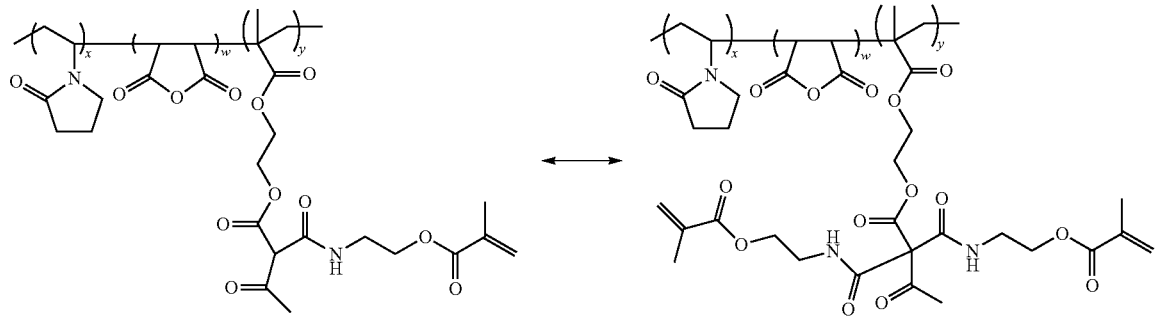

VP/MAN/AcAc (33/33/33) (28.4% solids in MEK) [27.5 g solution] was mixed with isocyanatoethyl methacrylate (ICEMA~98% solids) [0.347 g], as a 50% mole ratio to the number of moles of AcAc in the Vp/MAN/AcAc. The mixture was stirred at 50° C. for 8 hours. The product was precipitated from methyl t-butyl ether. The reaction product was confirmed by NMR spectroscopy.

Example 10

Synthesis of VP/VI/ACAC (48/48/4)

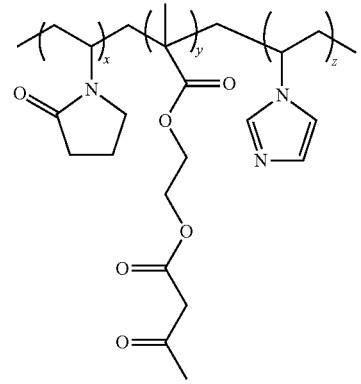

Feed one is prepared with 26.67 g vinyl pyrrolidone (VP); 22.59 g vinyl imidazole; and 4.28 g acetoacetoxyethyl methacrylate (AcAc). Put 50.0 g of ethanol into the reactor and commence purging of the reaction vessel with nitrogen. Heat the reaction flask containing water/ethanol mixture to approximately ~80° C. Nitrogen is bubbled through the solution throughout the heat-up and the feeding of the monomer. In a separate vessel prepare a mixture of Vazo-64 (0.5 g) and Ethanol (30 g). Label this vessel "Initiator Solution". When the reaction flask has reached 80° C., begin adding Feed 1, drop-wise, in to the reaction vessel over a period of 120 minutes. After 15 minutes of monomer feed, add 5 g of the Initiator Solution into the reactor. Continue the drop-wise addition of Feed 1 over a period of approximately 105 minutes. While the monomers are feeding into the reactor, after 30 minutes charge 5.0 g of the Initiator Solution. After 60, and 90 minutes, charge 5.0 g Initiator Solution into the reactor. At the completion of the monomer feeds, charge the reaction vessel with the remainder of the Initiator Solution. The reaction vessel is allowed to heat at reflux for an additional 180 minutes. Cool the reaction vessel and leave the material in the reactor. This is the end of 'day one'. On 'day two', re-heat the vessel to 80° C. and charge with 15.0 g of the Initiator Solution. Hold for 2 hours. Add an additional 15.0 g of the Initiator Solution. Hold for 5 hours then cool reaction mixture. Structure confirmed by NMR. K-Value is 42.3 and Tg is 90.8° C.

Example 11

Synthesis of VP/MAN/PEA/Allyl AcAc to Water

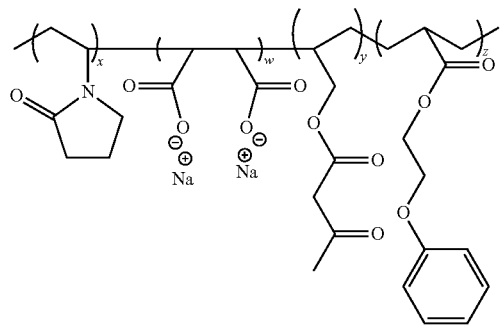

Feed one is prepared with 22.96 g vinyl pyrrolidone (Vp) and 40.12 g MEK, 20.25 g maleic anhydride (MAN); 36.09 g phenoxyethyl acrylate (PEA); 2.67 g allyl acetoacetate (allyl acac). Put 192.59 g MEK into the reactor and commence purging of the reaction vessel with nitrogen. Heat the reaction flask containing MEK to reflux ~78° C. In a separate vessel prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture. After the reaction has been cooled, the reaction mixture is added to methyl t-butyl ether to precipitate the product as a white powder. This material is soluble in aqueous ammonium hydroxide as well as MEK. Tg=46.5° C. (2nd Heating)

Samples of the polymer generated were precipitated into methyl t-butyl ether and dried to yield a (water-insoluble) white powder. One gram of the powder was suspended in water (approx 50 g) and sodium hydroxide solution is added to bring the pH of the water solution to pH 8.

Example 12

Synthesis of VP/VA/Allyl AcAc

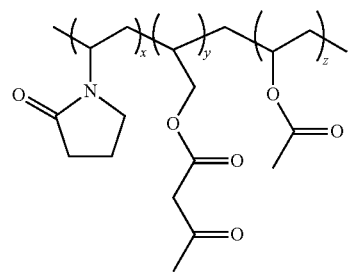

Feed one is prepared with 51.04 g vinyl pyrrolidone (Vp) and 42.05 g MEK, 15.25 g VA (vinyl acetate); 2.80 g allyl acac (allyl acetoacetate). Put 201.85 g MEK into the reactor and commence purging of the reaction vessel with nitrogen. Heat the reaction flask containing MEK to reflux ~78° C. In a separate vessel prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture. K-Value=8.3. Tg=44° C. (2nd Heating)

Example 13

Synthesis of VP/DMAPMA/AcAc (45/50/5)

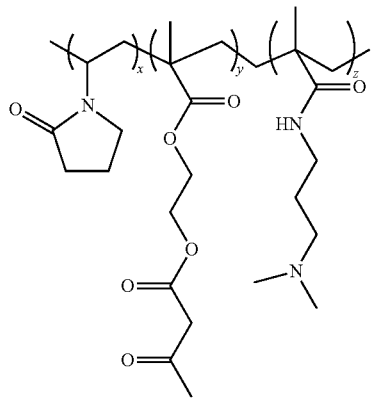

Feed one is prepared with 36.15 g vinyl caprolactam (VCap) and 36.99 g MEK, 4.9 g 3-dimethylaminopropyl methacrylamide (DMAPMA) and 61.81 g acetoacetoxyethyl methacrylate (AcAc). Put 177.57 g MEK into the reactor and commence purging of the reaction vessel with nitrogen. Heat the reaction flask containing MEK to reflux ~78° C. In a separate vessel prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture. Tg=42° C. (2nd Heating)

Example 14

Synthesis of VCap/VA/Allyl AcAc

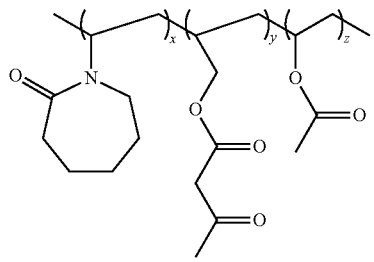

Feed one is prepared with 61.65 g vinyl caprolactam (VCap) and 40.56 g MEK, 14.71 g VA (vinyl acetate); 2.70 g allyl acac (allyl acetoacetate). Put 194.69 g MEK into the reactor and commence purging of the reaction vessel with nitrogen. Heat the reaction flask containing MEK to reflux ~78 C. In a separate vessel prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture.

Example 15

Synthesis of VP/HEP-MA/AcAc (93/5/2)

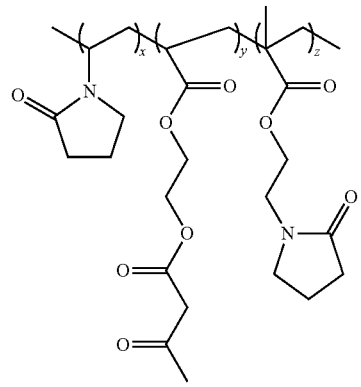

Feed one is prepared with 67.24 g vinyl pyrrolidone (VP); 6.34 g pyrrolidonoethyl methacrylate (HEP-MA); and 2.78 g acetoacetoxyethyl methacrylate (AcAc). Put 198.3 g of water and 49.60 g ethanol into the reactor and commence purging of the reaction vessel with nitrogen. Heat the reaction flask containing water/ethanol mixture to approximately ~75° C. Nitrogen is bubbled through the solution throughout the heat-up and the feeding of the monomer. In a separate vessel prepare a mixture of Vazo-64 (2 g) and VP (5 g). Label this vessel "Initiator Solution". When the reaction flask has reached 75 C, begin adding Feed 1, drop-wise, in to the reaction vessel over a period of 180 minutes. After 15 minutes of monomer feed, add 1 g of the Initiator Solution into the reactor. Continue the drop-wise addition of Feed 1 over a period of approximately 165 minutes. While the monomers are feeding into the reactor, after 30 minutes charge 1.0 g of the Initiator Solution. After 60, and 120 minutes, charge 1.0 g Initiator Solution into the reactor. At the completion of the monomer feeds, charge the reaction vessel with the remainder of the Initiator Solution. The reaction vessel is allowed to heat at reflux for an additional 180 minutes. Cool the reaction vessel and leave the material in the reactor. This is the end of 'day one'. On 'day two', re-heat the vessel to 75° C. and charge with 2.0 g of the Initiator Solution. Hold for 2 hours. Add an additional 2.0 g of the Initiator Solution. Hold for 5 hours then cool reaction mixture. K-Value is 54.4 and Tg is 84.9° C.

Example 16

Synthesis of Vp/MAN/AcAc (33/33/33) Grafted with Propargyl alcohol

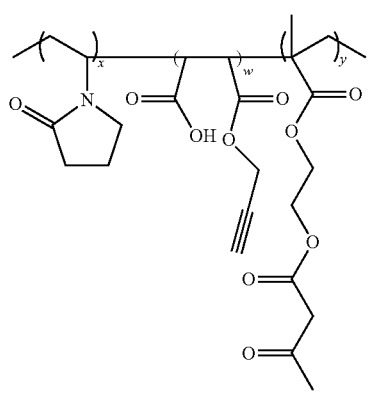

Dissolve 8.0 g of Poly(VP/MAN/AcAc) (PACMAN) in 20 ml NMP and add the solution to the reaction flask. Add 20 ml of Propargyl alcohol to the reaction flask and heat the reaction mixture to 80° C. with continuous stirring. Hold the reaction at 80° C. for 36 hours. At the end of 36 hours cool the reaction to room temperature. After the reaction has been cooled, the reaction mixture is added to methyl t-butyl ether to precipitate the product-yellow solid. This product is soluble in NMP and DMSO. Product structure was confirmed by Carbon and Proton NMR. Glass Transition Temperature ($T_g$) of the product is 49.52° C.

Example 17

Synthesis of Vp/MAN/AcAc (33/33/33) Grafted with Hydroxyl Ethyl Acrylate

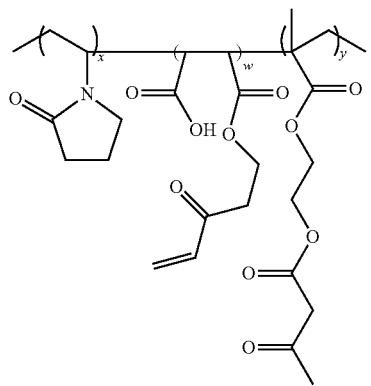

Dissolve 4.0 g of Poly(VP/MAN/AcAc from Example 1) in 20 ml NMP and add the solution to the reaction flask. Add 5 ml of 2-hydroxyethyl acrylate (HEA) to the reaction flask and slowly heat the reaction mixture to 65° C. with continuous stirring. Hold the reaction at 65° C. for 50 hours. At the end of 50 hours cool the reaction to room temperature. After the reaction has been cooled, the reaction mixture is added to methyl t-butyl ether to precipitate the product-white solid. This product is soluble in NMP and DMSO. Product structure was confirmed by Carbon and Proton NMR. Glass Transition Temperature ($T_g$) of the product is 45.36° C.

Example 18

Synthesis of VPy/VI/VP/AcAc (40/40/18/2)

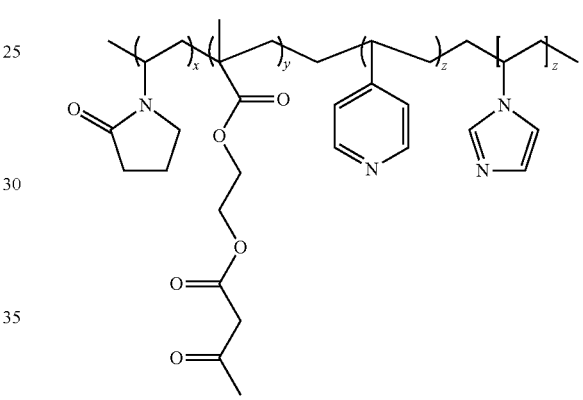

Feed one is prepared with 20.01 g vinyl pyrrolidone (VP); 37.65.59 g vinyl imidazole; 42.06 g 4-vinyl pyridine; and 4.28 g acetoacetoxyethyl methacrylate (AcAc). Put 100.0 g of ethanol into the reactor and commence purging of the reaction vessel with nitrogen. Heat the reaction flask containing water/ethanol mixture to approximately ~80° C. Nitrogen is bubbled through the solution throughout the heat-up and the feeding of the monomer. In a separate vessel prepare a mixture of Vazo-64 (1.0 g) and Ethanol (60 g). Label this vessel "Initiator Solution". When the reaction flask has reached 80° C., begin adding Feed 1, drop-wise, in to the reaction vessel over a period of 120 minutes. After 15 minutes of monomer feed, add 10 g of the Initiator Solution into the reactor. Continue the drop-wise addition of Feed 1 over a period of approximately 105 minutes. While the monomers are feeding into the reactor, after 30 minutes charge 10.0 g of the Initiator Solution. After 60, and 90 minutes, charge 10.0 g Initiator Solution into the reactor. At the completion of the monomer feeds, charge the reaction vessel with the remainder of the Initiator Solution. The reaction vessel is allowed to heat at reflux for an additional 180 minutes. Cool the reaction vessel and leave the material in the reactor. This is the end of 'day one'. On 'day two', re-heat the vessel to 80° C. and charge with 30.0 g of the Initiator Solution. Hold for 2 hours. Add an additional 30.0 g of the Initiator Solution. Hold for 5 hours then cool reaction mixture. K-Value is 30.0 and Tg is 69.8° C.

Example 19

Synthesis of VPy/VI/VP/AcAc (40/40/18/2)

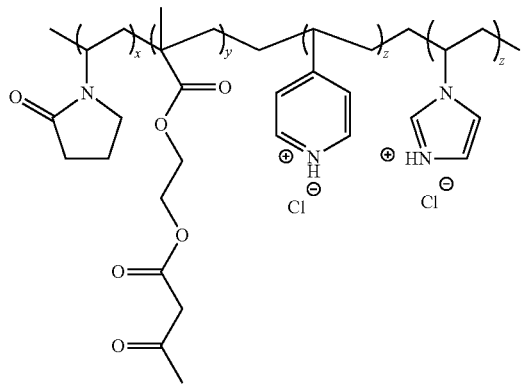

A clear straw colored solution of polymer was obtained by dissolving 10 grams of the previous polymer (Example 20) in 100 grams of DI water adjusted to pH~6 with hydrochloric acid.

Example 20

Synthesis of VP/MAN/Allyl AcAc (33/33/33)

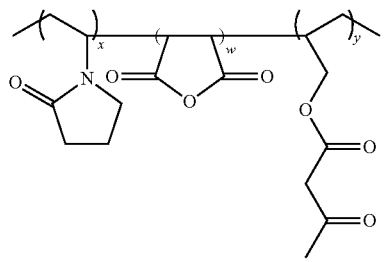

Feed one is prepared with 23.77 g vinyl pyrrolidone (VP) and 41.14 g MEK, 20.98 g MAN (maleic anhydride); 30.41 g allyl acetoacetate (allyl acac). Put 197.48 g MEK into the reactor and commence purging of the reaction vessel with nitrogen. Heat the reaction flask containing MEK to reflux ~78° C. In a separate vessel prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture. After the reaction has been cooled, the reaction mixture is added to methyl t-butyl ether to precipitate the product, a white powder. This material is soluble in aqueous ammonium hydroxide as well as MEK. K-Value=10.4. Tg=42° C. (1st Heating)

Example 21

Synthesis of VP/VCap/Allyl AcAc (94/3/3)

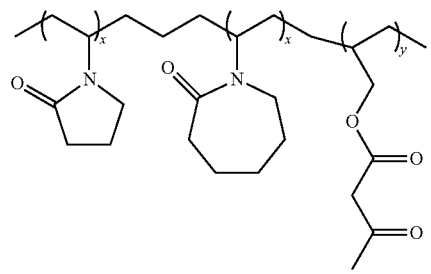

Feed one is prepared with 366.01 g vinyl pyrrolidone (VP) and 14.63 g vinyl caprolactam (VCap). A quantity of 752.28 g of water and 322.39 g isopropanol are placed in the 2 L reaction vessel equipped with a mechanical stirrer, thermocouple, nitrogen line and condenser. The pH of the solvent solution is adjusted with sodium bicarbonate to about pH 7. A quantity of 14.94 g of allyl acetoacetate (Allyl AcAc) is added to the solvent mixture and the solvent/allyl AcAc mixture are heated to 78 C under a nitrogen purge. In a separate vessel prepare a mixture of Triganox 121 (8.02 g) and isopropanol (20.22 g). Label this vessel "Triganox Solution". When the reaction flask has reached reflux temperature, begin adding Feed 1, drop-wise, in to the reaction vessel over a period of 180 minutes. After 15 minutes of monomer feed, add 6 g of the Triganox Solution into the reactor. Continue the drop-wise addition of Feed 1 over a period of approximately 165 minutes. While the monomers are feeding into the reactor, after 30 minutes charge 6.0 g of the Triganox solution. After 60 and 120 minutes, charge 6.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional isopropanol was added to replace any that has volatilized. Cool the reaction vessel and leave the material in the reactor. This is the end of 'day one'. On 'day two', re-heat the vessel to reflux and charge with 1.52 g Triganox 121/4.04 g isopropanol. Hold for 2 hours. Add an additional 21.52 g Triganox 121/4.04 g isopropanol. Hold for 5 hours then cool reaction mixture. K-Value=36.7.

Example 22

Synthesis of Vp/MAN/AcAc/TEVS (25/25/25/25)

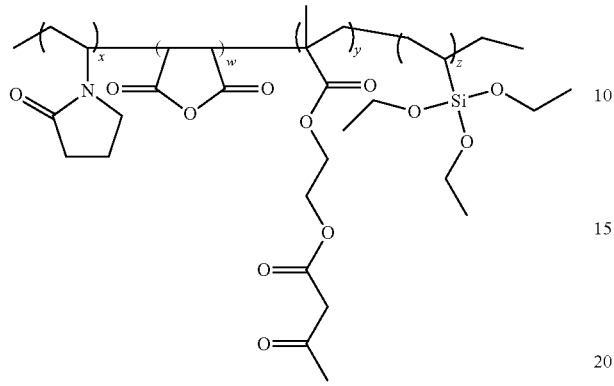

Feed one is prepared with 17.04 g vinyl pyrrolidone (Vp) and 38.31 g MEK, 15.03 g maleic anhydride (MAN); 29.12 g triethoxyvinyl silane (TEVS); 32.83 g Acetoacetoxyethyl methacrylate (acac). Put 183.94 g MEK into the reactor and commence purging of the reaction vessel with nitrogen. Heat the reaction flask containing MEK to reflux 78° C. In a separate vessel prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture. After the reaction has been cooled, the reaction mixture is added to methyl t-butyl ether to precipitate the product, a white powder. This material is soluble in aqueous ammonium hydroxide as well as MEK. Structure confirmed by NMR. K-Value=7.9. Tg=70° C. (1st Heating)

Samples of the polymer generated in Example above (Vp/MAN/AcAc/TEVS (25/25/25/25)) were precipitated into methyl t-butyl ether and dried to yield a (water insoluble) material. One gram of the material was suspended in water (approx 50 g) and ammonium hydroxide solution is added to bring the pH of the water solution to pH 8. Additional ammonium hydroxide solution is added to maintain the pH at 8 as the polymer dissolves.

Example 23

Synthesis of Vp/MAN/GMA/Allyl AcAc (33/33/29/4)

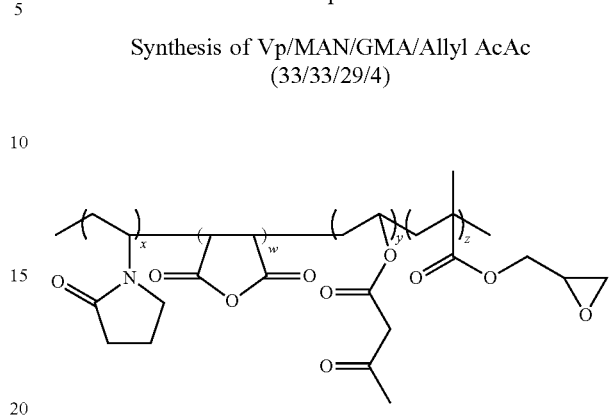

Feed one is prepared with 23.59 g vinyl pyrrolidone (Vp) and 41.23 g MEK, 20.81 g maleic anhydride (MAN); 27.43 g glycidyl methacrylate (GMA); 2.74 g allyl acetoacetate (allyl acac). Put 192.59 g MEK into the reactor and commence purging of the reaction vessel with nitrogen. Heat the reaction flask containing MEK to reflux ~78° C. In a separate vessel prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture. After the reaction has been cooled, the reaction mixture is added to methyl t-butyl ether to precipitate the product—a white powder. This material is partially soluble in aqueous ammonium hydroxide. Tg=48° C. (2nd Heating)

Example 24

Cementing Compound

To a beaker containing 21 grams of DI water, 0.09 grams of Xanthan gum (XG 200, from ISP) was added with high shear mixing followed by 0.3 grams of cellulose gum (Aquapac, from Hercules). 0.45 grams of Tween 80(ICI) and 15.2 grams of Barium sulfate (Berifine BF21 from Cimbar) were mixed into the above composition.

12 grams of VP/MAN/AcAC solution (3 grams polymer in 7 grams of ethanol and 2 grams of water) was then mixed into the above composition. 14.25 grams of 30 wt % Polyethyleneimine (Aldrich) was added with constant mixing and the mixture was let set overnight at room temperature.

Example 25

Preparation of Microcapsules Cross-linked with VP/MAN/AcAc

In an 8 dram vial place 1.0 g VP/VA/GMA dissolved in 3,4-epoxycyclohexylmethyl-3,4-epoxycyclohexanecarbonate; 1.0 g Xtend 226 and a small amount of water insoluble indigo pigment. Add 3 drops of DETA (diethylene tetramine) and stir to incorporate it into the mixture. Add 'one drop' of ViviPrint 300 and stir to incorporate into the mixture.

Prepare a solution containing 150 mL water and 6.0 g VP/MAN/AcAc-NH4OH solution. Add 0.5 g DBN to the VP/MAN/AcAc solution. Add the VP/VA/GMA mixture drop-wise to the aqueous, vigorously stirring VP/MAN/AcAc solution. The blue VP/VA/GMA mixture should break into small beads with stirring. Remove the initial water, add additional water to wash the beads and neutralize the solution. Samples of the blue beads were placed in solutions of pure water and also acetone to check for stability. In both cases, the beads remain intact.

Example 26

Synthesis of HEP-MA/MAN/AcAc

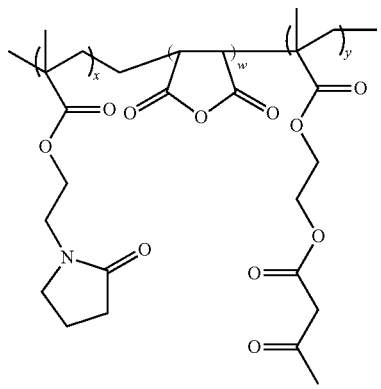

Feed one is prepared with 46.1 g hydroxyethylpyrrolidone methacrylate (HEP-MA) and 45.06 g MEK, 22.97 g maleic anhydride (MAN); 50.19 g Acetoacetoxyethyl methacrylate (acac). Put 146 g MEK into the reactor and commence purging of the reaction vessel with nitrogen. Heat the reaction flask containing MEK to reflux ~78° C. In a separate vessel prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture. This material is soluble in aqueous ammonium hydroxide as well as MEK. The structure was confirmed by NMR. Tg=39° C. (1st Heating)

Example 27

Synthesis of HEP-MA/MAN/AcAc to Ammonium Salts

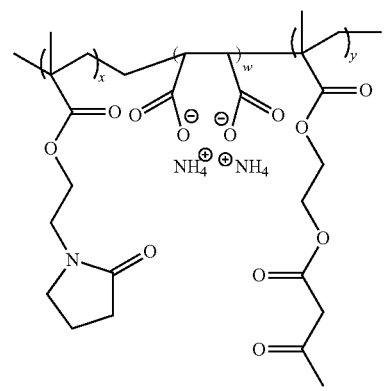

Samples of the polymer generated in Example above (HEP-MA/MAN/AcAc (33/33/33)) were precipitated into methyl t-butyl ether and dried to yield a (water insoluble) material. One gram of the material was suspended in water (approx 50 g) and ammonium hydroxide solution is added to bring the pH of the water solution to pH 8. Additional ammonium hydroxide solution is added to maintain the pH at 8 as the polymer dissolves.

Example 28
Synthesis of Butyl Acrylate Block on VpNCap/AcAc (94/3/3)
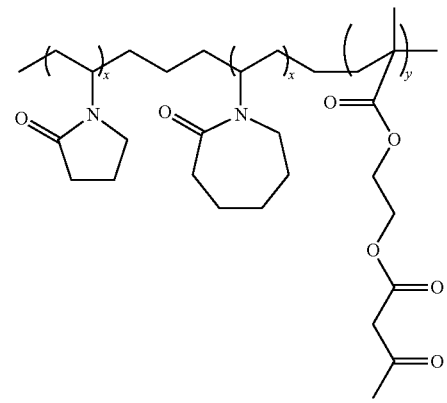
DBN
Phenoxy ethylacrylate
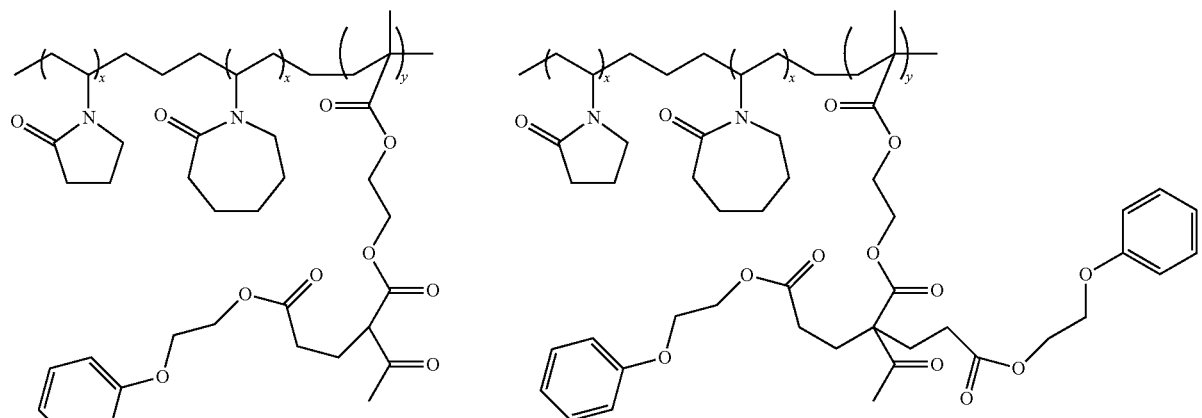
Butyl Acrylate

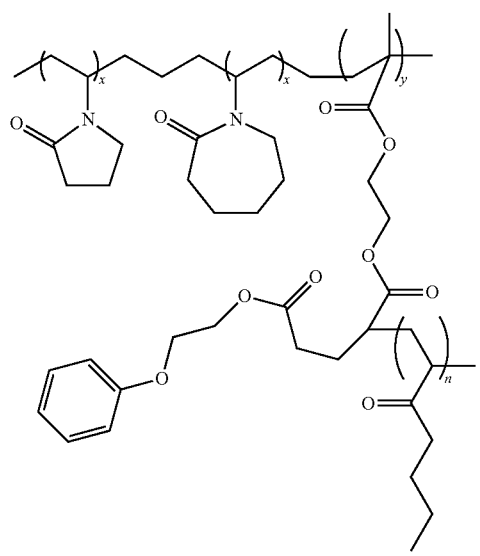
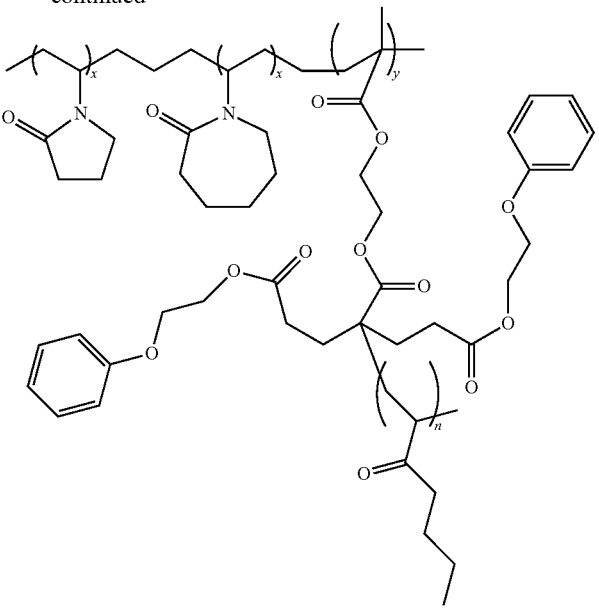

30 g of Vp/VCap/AcAc (94/3/3) (0.0042 moles AcAc is contained in the polymer) was dissolved in approximately 90 g of isopropanol. Phenoxyethyl acrylate (PEA) (0.90 g; 0.0042 moles) and DBN base (0.03 g) are added to the Vp/VCap/AcAc isopropanol mixture and it is stirred at room temperature overnight. A molar excess of n-butyl acrylate (nBA) (4 g; 0.032 moles) is added to the reaction mixture and the reaction is heated to reflux for 8 hours. The mixture is cooled, and precipitated from methyl t-butyl ether to yield a white solid. Structure was confirmed by NMR.

Example 29

Solubility of 5% by Weight Polymer at Room Temperature

| Solvent | Solubility | | |
|---|---|---|---|
| | VP/MAN/ AcAc | PEA/VP/MAN/ AllylAcAc | VP/MAN/AcAc - ICEMA |
| 2-HEA | ✓ | ✓ | ✓ |
| 2-HBA | ✓ | ✓ | X |
| GPTA/SR9020 | X | X | X |
| HDDA/SR238B | X | X | X |
| PEA/SR340 | X | X | X |
| THFA/SR285 | X | ✓ | X |
| EOTMPTA/SR454 | X | X | X |
| Di-TMPTA/SR355 | X | X | X |
| TMPTA/SR351LV | X | X | X |
| EGDMA | X | X | X |
| DEGDMA/SR231 | X | X | X |
| HDBOHPBA | X | X (partially soluble over 2 Wks) | X |
| PETA/aldrich | X | X | X |
| Epoxycyclo hexyl methyl methacrylate | X | X | X |
| Methyl oxetane methanol | ✓ | ✓ | ✓ |
| Heloxy 68 | X | X | X |
| Cyclo epoxy* Cas#2386-87-0 | X | X | X |
| Ethanol | X | X | X |
| IPA | X | X | X |
| Ethanol:Water 50:50 | ✓ | X | X |
| IPA:Water 50:50 | ✓ | X | X |
| Water-pH > 7 | ✓ | ✓ | ✓ |

+1,6-Hexanediylbis[oxy(2-hydroxy-3,1-propanediyl)] bisacrylate
*3,4-epoxy cyclohexyl methyl 3,4-epoxy cyclo hexane carboxylate Example 30

Synthesis of Vp/MAN/PEA/AcAc (33/33/25/8)

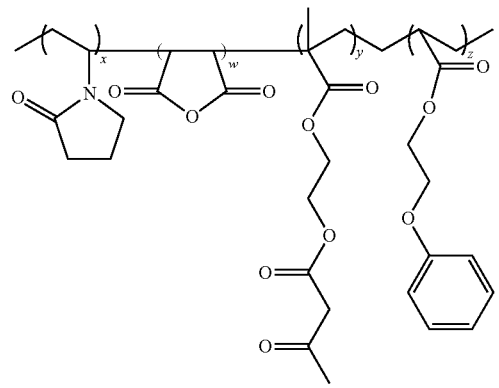

Feed one is prepared with 23.24 g vinyl pyrrolidone (Vp) and 40.62 g MEK, 20.50 g maleic anhydride (MAN); 25.76 g phenoxyethyl acrylate (PEA); 9.19 g allyl Acetoacetoxyethyl methacrylate (AcAc). Put 194.95 g MEK into the reactor and commence purging of the reaction vessel with nitrogen. Heat the reaction flask containing MEK to reflux ~78° C. In a separate vessel prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture. After the reaction has been cooled, the reaction mixture is added to methyl t-butyl ether to precipitate the product, a white powder. This material is soluble in aqueous ammonium hydroxide as well as MEK. K-Value=7.1

Example 31

Synthesis of Vp/MAN/AcAc/TEGMEM (25/25/25/25)

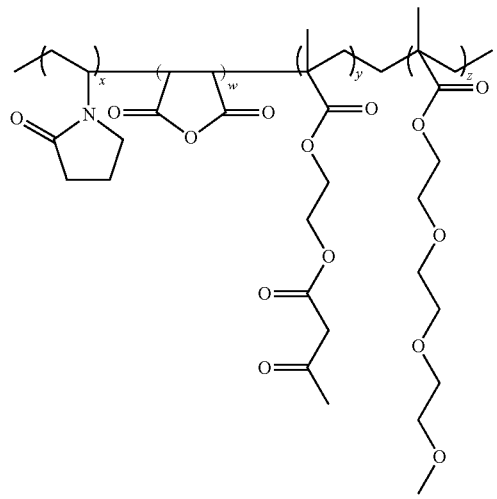

Feed one is prepared with 16.73 g vinyl pyrrolidone (Vp) and 37.62 g MEK, 14.76 g maleic anhydride (MAN); 34.96 g triethyleneglycol methyl ether methacrylate (TEGMEM); 32.24 g Acetoacetoxyethyl methacrylate (acac). Put 183.94 g MEK into the reactor and commence purging of the reaction vessel with nitrogen. Heat the reaction flask containing MEK to reflux—approximately ~78° C. In a separate vessel prepare a mixture of Triganox 25C 75 (15.0 g) and MEK (15 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 3.0 g of the Triganox solution. After 45, 60, 75, 90, 105 and 120 minutes, charge 3.0 g Triganox solution into the reactor. After 150 minutes, charge 3.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.0 g Triganox 25C 75. Hold for 2 hours. Add an additional 2.0 g Triganox 25C 75. Hold for 5 hours then cool reaction mixture. This material is soluble in aqueous ammonium hydroxide as well as MEK. K-Value=8.3.

Example 32

Membrane Premix

To a N-methyl-2-pyrrolidone (NMP) is added VP/VCap/Allyl AcAc (94/3/3) (74:26 parts). Optional ingredients include polysulfones, PVDF, and similar useful high performance thermoplastics as outlined in WO/2010/111607.

The polymers of the invention are suitable for use in industrial, personal care, household, and pharmaceutical applications. Industrial uses include, but are not limited to, formulating inks (U.S. Pat. App. Ser. No. 61/293,834 and 61/263,570, the contents of which are hereby incorporated by reference), flocculation agents, hydrogels, surface modification agents, coatings, microporous print media, shale swell inhibitors, metal coatings, metal working fluids, rheology modifiers, reactive biocides, decorated titanium, diazo functional materials/pigments, interlaminate adhesives, dispersants, batteries, products comprised of iodine, products comprised of silver, products comprised of carbon, products comprised of nano carbons, comb/branch polymer adducts, biocidal films, tackifiers, polymeric dyes, latex weather resistant modifiers, decorated pigments for inks and pastes, decorated cenospheres, decorated barium sulfate, surface decorated PVPP particles, cross-linkers (see U.S. patent application Ser. No. 12/698,583, the contents of which are hereby incorporated by reference), automotive products and protective films, super-absorbers (i.e., diapers) (see U.S. Pat. App. 2009/0043005A1, the contents of which are hereby incorporated by reference), printing plates, macro-initiating materials, products comprised of graphene, hydrophilic enhancement agents for membranes (see U.S. Pat. App. Ser. No. 61/242,900 and PCT/2010/028852, the contents of which are hereby incorporated by reference), anti-fog coatings, polymer blocks, additives to extrudable compounds and films, protective colloidal agents, multi dimensional printing pigments and inks (for example see WO/2008/077850A2, the contents of which are hereby incorporated by reference), refractive index modifiers, cross-linking agents, rheology control agents, grease resistant films, fiber sizing agents, products comprised of alumina, conductive films, cementitious compositions, bioadhesives, tablet coatings, battery binders, resinous photo-initiators (see U.S. patent application Ser. No. 12/698,583, the contents of which are hereby incorporated by reference), resinous UV absorbers (U.S. patent application Ser. No. 12/698,583, the contents of which are hereby incorporated by reference), iodine stabilizers, conductive coatings and gels, reactive rheology modifying agents, macro-initiators, coating flex agents, and non-migratory anti-static agents. Personal care and household applications include, but are not limited to, formulating cosmetics, hair care products, toiletries, hydrogels, laundry products and household cleaning products, dye absorbent non-woven swatches, metal chelators (i.e., Ca, Mg, etc. . . . ) Pharmaceutical applications include, but are not limited to, processing aids, medical stents, catheters and other medical device coatings, active ingredient solubilizers, optical lenses, formulating drug delivery systems, and preparing tablet coatings.

Results and Discussion

The poly(vinyl pyrrolidone-co-maleic anhydride-co-acetoacetoxyethyl methacrylate) (PVP/MAN/AAEM) terpolymer has a number of interesting features. First, the maleic anhydride form of the terpolymer is compatible with ketone based solvents. When introduced to water, the maleic anhydride can hydrolyze to form the vicinal maleic acid terpolymer, which can be suitably neutralized with ammonium hydroxide or other bases, such as sodium hydroxide as set out below (Proposed Structures of PVP/MAN/AAEM and PVP/MAA/AAEM Curable polymers)

pyrrolidonyl carbonyl group coupled to the proton donating group on the maleic group yielding zwitterionic behavior, Subotic, D., Ferguson, J., Warren, B. C. H., *European Polymer Journal*, Vol. 25, Number 12, pp. 1233-1237 (1989). The physical properties of the PVP/MAN/AAEM polymer are presented in the Table below. In general, the polymer is a low viscosity material that exhibits a reasonably high $T_g$. In addition to the previously mentioned properties, the polymer also exhibits high gloss, transparency, film forming, and dye fixation properties.

| Property | PVP/MAN/AAEM Data |
| --- | --- |
| Viscosity (cPs) (50% in HEA) (DV-III, 100 RPM, #4 Spindle) | 1,580 |
| $T_g$ (° C.) | ~95 (1$^{st}$ Heating) |
| K-Value range | ~10 |

HEC+PVP/MAN/AAEM and PVOH+PVP/MAN/AAEM Films

In printing applications, both cellulosics and polyvinyl alcohols are important binders and film forming technologies. Previous work had demonstrated the effectiveness of combining cellulosic and polyvinyl lactam binders to enhance the absorption of applied printing ink, Nadeau, L. N., Waddell, W., Hood, D. K., Johnson, E., Kitchen, J. P.,

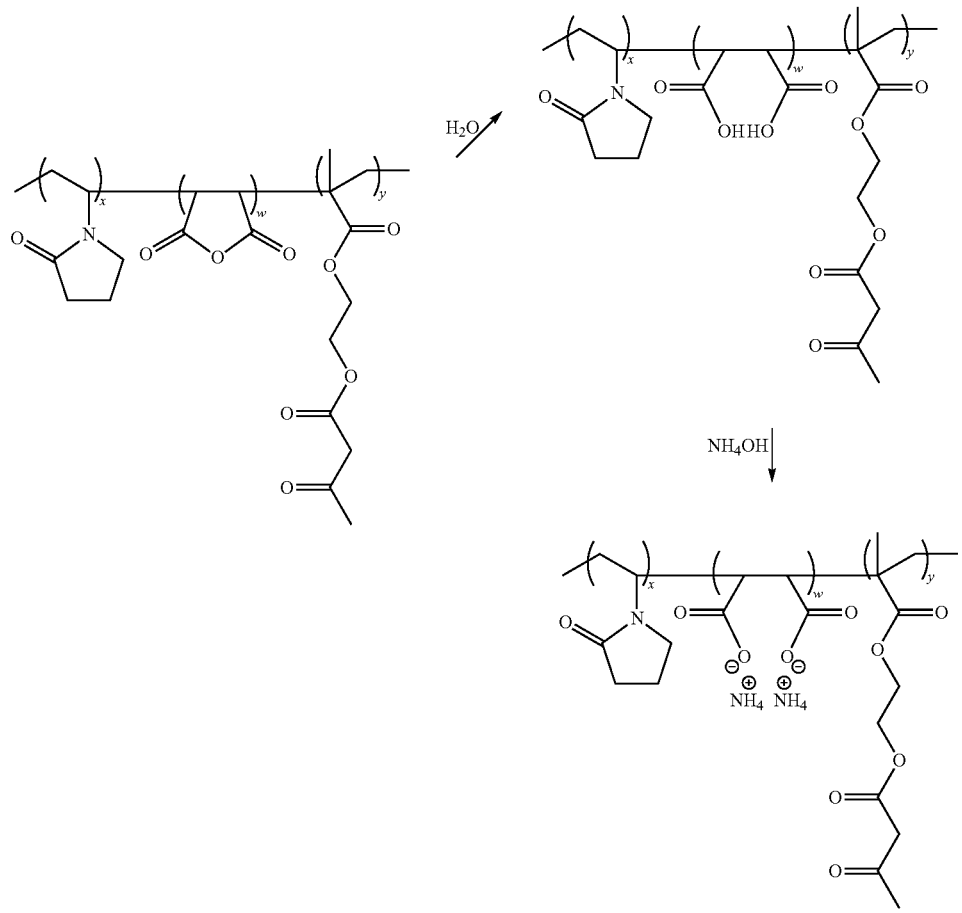

Another interesting facet of the PVP/MAN/AAEM terpolymer is the strong hydrogen bonding capacity of the Sarkar, M. M., Evans, D. L., Gratton, R., US 2006/0134363 A1. A variety of films have been made to elucidate the cross-linking potential of PVP/MAN/AAEM by employing an established thermal esterification between the maleic acid and hydroxyl functionalities. This cross-linking approach is presented schematically below. (Proposed Structure for Cross-linked PVP/MAN/AAEM with Polyvinyl Alcohol)

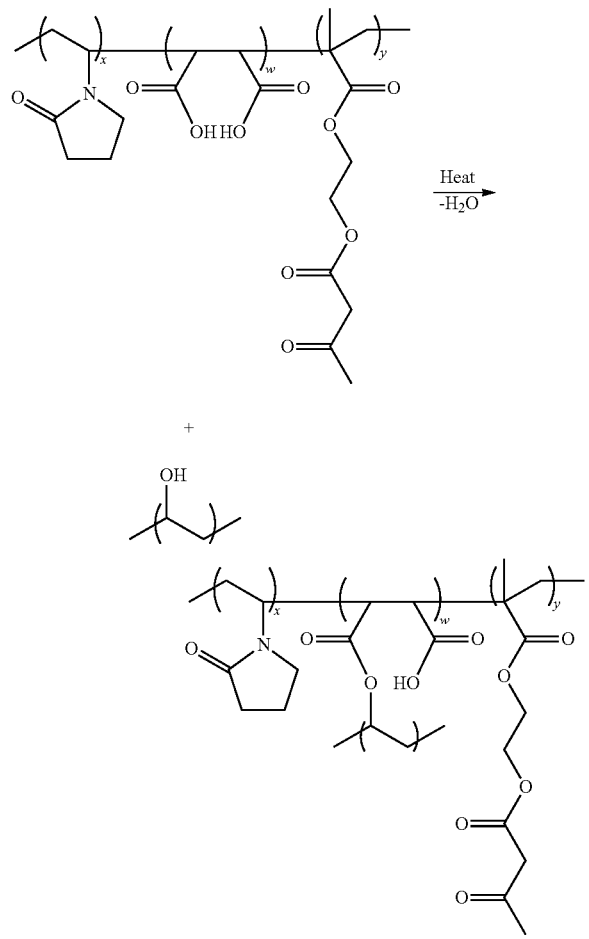

Such approaches are known for similar materials like Gantrez, poly(maleic anhydride-co-methyl vinyl ether), "Gantrez AN Copolymer," ISP Product Brochure 2302-128R, 1995. Coating compositions and observation of film performance are presented in the Table below. (Thermally cured coating compositions and observations)

| Coating Composition | Mix Ratio | PH | Brookfield Viscosity (DVIII+) (cPs, 100 RPM, RT)) | Observation |
|---|---|---|---|---|
| PVP K-30 + HEC | 1:1 | 6 | 260 | Minor water resistance |
| PVP/MAN/AAEM + HEC | 1:1 | 3 | 176 | Excellent water resistance |
| PVP K-30 + PVOH | 1:1 | 7 | 17 | No water resistance |
| PVP/MAN/AAEM + PVOH | 1:1 | 3 | 20 | Excellent water resistance |
| PVP K-30 | 1 | 6 | 17 | No water resistance |
| PVP/MAN/AAEM | 1 | 2 | 8 | No water resistance |
| HEC | 1 | 6 | 2000 | No water resistance |
| PVOH | 1 | 7 | 42 | No water resistance |

Both the cured films of PVP/MAN/AAEM+HEC and PVP/MAN/AAEM+PVOH exhibit excellent water resistance, as compared to their non-reactive PVP counterparts. The PVP/MAN/AAEM+HEC coating also exhibited excellent water resistance. These films were clear and glossy, exhibiting 60° gloss values >85. Pencil hardness was determined to be 8H. Cross-cut adhesion to white Melinex® film for neat polymer films and their blends was excellent. The exception was PVP/MAN/AAEM+HEC, where coating exhibited ~90% removal. All of the polymer coatings exhibited good solvent resistance. There was no blistering, peeling, or discoloration. The noted exception was PVP/MAN/AAEM and PVP/MAN/AAEM+HEC coatings, where discoloration was observed after ~100 rubs.

PVP/MAN/AAEM+$Al_2O_3$ Films

In micro-porous printing applications, alumina pigments are critical components to the print receptive layer, U.S. Pat. No. 4,474,847. A key feature of the micro-porous coating pigment loading is that the dry coating comprises ~90% (by weight) pigment. A common binder employed in these coatings is PVOH, which can cross-link with melamine/formaldehyde, glyoxal, or zirconates. For the PVP/MAN/AAEM terpolymer, AAEM monomer also known as good chelator of metals such as copper and alumina. A variety of films were made to elucidate the cross-linking potential of PVP/MAN/AAEM employing alumina chelation and thermal esterification principle to the coating approach as set out below. (PVP/MAN/AAEM+$Al_2O_3$: film compositions and observations)

| Coating (wt % ratio) | Mix Ratio | PH | Observation |
|---|---|---|---|
| PVP/MAN/AAEM + Dispal 11N7-80 | 3:7 | 2 | Water Resistant |
| PVOH + Dispal 11N7-80 | 3:7 | 2 | Water Resistant |
| PVP/MAN/AAEM + PVOH + Dispal 11N7-80 | 1.5:1.5:7 | 2 | Water Resistant |

PVP/MAN/AAEM+Glyoxal+Aziridine, Thermal Dual Cure

Work on polymers comprising carboxylic acid and aceto acetyl moieties for dual cure coatings demonstrated that using a cross-linker blend of dialdehyde-aziridine enabled improvements to water resistance of non-woven articles, such as paper towels, Goldstein, J. E., Pangrazi, R. J., U.S. Pat. No. 6,117,492. An interesting feature of this curing approach, is the low temperature cure range (20° C.-40° C.). Utilizing this approach, we evaluated the cure response of PVP/MAN/AAEM. Both high temperature and ambient temperature curing were evaluated as set out below. (PVP/MAN/AAEM+Glyoxal+Aziridine: film compositions and observations)

| Coating Composition | Mix Ratio | Cure Temperature | Observation |
|---|---|---|---|
| PVP/MAN/AAEM + Glyoxal + Aziridine | 10:1:3 | 30° C. for 20 hours | Water Resistant |
| PVP/MAN/AAEM + Glyoxal + Aziridine | 10:1:3 | 140° C. for 30 min | Water Resistant |

Excellent water resistance was observed for both high temperature and low temperature curing. Note that for low temperature, the time was extended to enable the coating to dry.

PVP/MAN/AAEM+HEA+DBN+Aziridine, UV-Thermal Dual Cure

To render this oligomer suitable for UV cross-linking, the base oligomer was acrylated by employing "Michael Addition" of the oligomer to the acrylate with the base catalyst DBN. Such approaches have been thoroughly presented in earlier papers, Mathur, B. D.; Viswanathan, K.; Miller, K. M.; Long, T. E., *Prog. Polym. Sci.*, Vol. 31, pp. 487-531 (2006), Gould, M. L.; Narayan-Sarathy, S.; Hammond, T. E.; Fechter, R. B., *RadTech Europe* (2005). Mechanistically, addition of DBN enables the deprotonation of the acetoacetoxy's methylene group to yield an enolate anion. The enolate anion then readily attacks, in the fashion of 1,4-conjugate addition, the olefin of the acrylate. The carbonyl stabilizes the resulting anion until the base is regenerated from proton transfer. This reaction occurs easily at room temperature. The result is an oligomer suitable for further initiating common UV coating monomer and oligomer components. For dual cure, aziridine was also added to enable facile, low temperature reactive cross-linking with the acid groups of maleic anhydride. A schematic of these proposed reactions is presented below. (proposed mechanism of dual cure of PVP/MAN/AAEM via the Michael Addition and aziridine

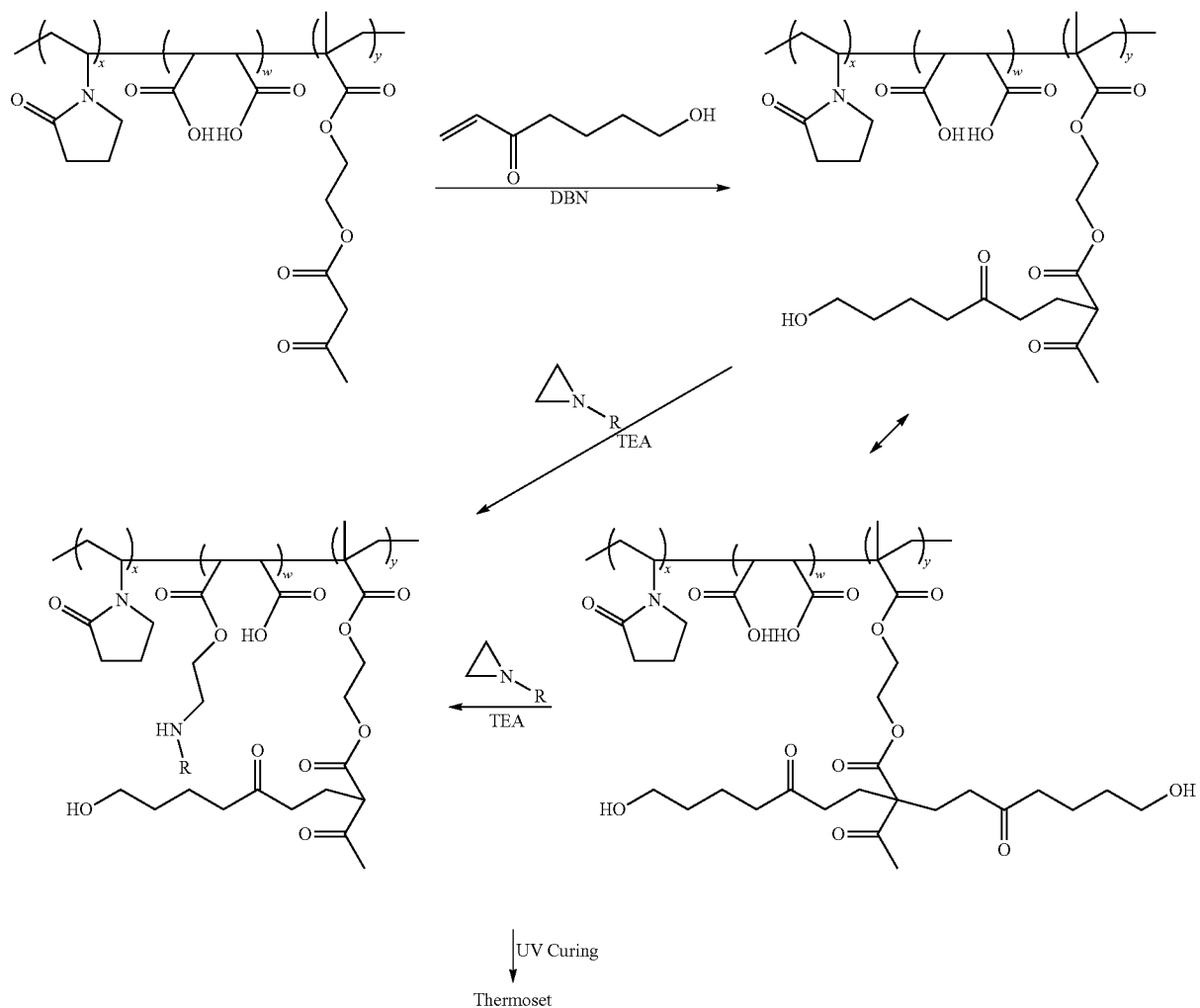

Various non-aqueous coating compositions were made to demonstrate the dual cure functionality of this system. The coatings are presented in the Table below. (Compositions for PVP/MAN/AAEM UV-Thermal dual cure)

| Material | Coating I | Coating II | Coating III | Coating IV |
|---|---|---|---|---|
| PVP/MAN/AAEM | 48.75 | 48.75 | 47.25 | 46 |
| HEA | 48.75 | 48.75 | 47.25 | 46 |
| Darocur 1173 | 2.5 | — | — | — |

-continued

| Material         | Coating I | Coating II | Coating III | Coating IV |
|------------------|-----------|------------|-------------|------------|
| DBN              | —         | 2.5        | 2.5         | 2.4        |
| TEA              | —         | —          | 0.5         | —          |
| PZ-33 (aziridine)| —         | —          | 2.5         | 5.6        |
| Total            | 100       | 100        | 100         | 100        |

The Table below presents the final physical coating properties.

| Property        | Coating I   | Coating II  | Coating III | Coating IV |
|-----------------|-------------|-------------|-------------|------------|
| Appearance      | Transparent | Transparent | Transparent | Hazy       |
| Gloss           | High        | High        | High        | High       |
| Pencil Hardness | 2H          | 2H          | 3H          | 6H         |
| Adhesion        | 100%        | 100%        | 100%        | 100%       |
| MEK Rubs        | 60          | 100         | 180         | >200       |
| Water Resistance| Water Resistant | Water Resistant | Water Resistant | Water Resistant |

PVP/MAN/AAEM in HEA exhibited UV cure in presence of photo initiator. Interestingly, PVP/MAN/AAEM exhibited cure, in the absence of photo-initiator, where only the Michael Addition product formed by DBN was employed. Films were glossy, transparent and exhibited excellent adhesion. PVP/MAN/AAEM exhibited dual cure (UV and thermal) in presence of DBN and aziridine. This is demonstrated by the boost in the performance of the film, comparing DBN to DBN+aziridine. The additional aziridine boosts the MEK rub resistance, which is indicative of a new cure response for the coating system.

While a number of embodiments of this invention have been represented, it was apparent that the basic construction can be altered to provide other embodiments that utilize the invention without departing from the spirit and scope of the invention. All such modifications and variations are intended to be included within the scope of the invention as defined in the appended claims rather than the specific embodiments that have been presented by way of example.

We claim:
1. A lactamic polymer having the following structure:

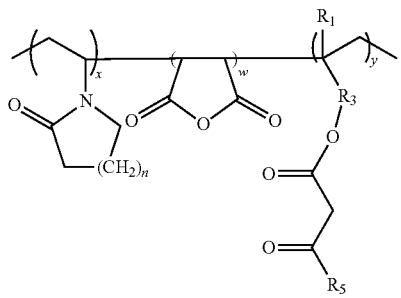

wherein each $R_1$ is independently selected from the group consisting of hydrogen and $C_1$-$C_{30}$ functionalized and unfunctionalized alkyl groups, wherein any of the before mentioned groups may be with or without heteroatoms, and mixtures thereof; each $R_3$ is independently selected from the group consisting of $C_1$-$C_6$ functionalized and unfunctionalized alkyl, amide, carbonyl, and carboxyl groups, wherein any of the before mentioned groups may be with or without heteroatoms, and mixtures thereof; each $R_5$ is independently selected from the group consisting of $C_1$-$C_{12}$ functionalized and unfunctionalized alkyl and alkenyl groups, wherein any of the before mentioned groups may be with or without heteroatoms, and mixtures thereof;

wherein w, a maleic anhydride derived monomer, may be partially or fully ring-opened; w, x, and y are mole percent, the sum of which =100%; and each n is an integer independently ranging from 1-4.

2. The polymer according to claim 1, wherein each $R_1$ is independently hydrogen or methyl.

3. The polymer according to claim 1, wherein each $R_3$ is —C(O)OCH$_2$CH$_2$—.

4. The polymer according to claim 1, wherein each $R_5$ is independently selected from the group consisting of $C_1$-$C_8$ functionalized and unfunctionalized alkyl and alkenyl groups, wherein any of the before mentioned groups may be with or without heteroatoms, and mixtures thereof.

5. The polymer according to claim 1, wherein w ranges from 1-97%, x ranges from 1-97%, and y ranges from 1-97%.

6. The polymer according to claim 1, wherein each n is an integer independently ranging from 1-3.

7. The polymer according to claim 1, wherein the polymer has a structure selected from the group consisting of:

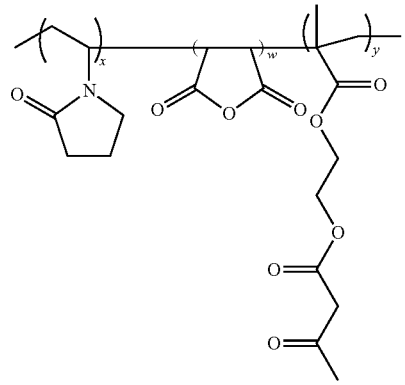

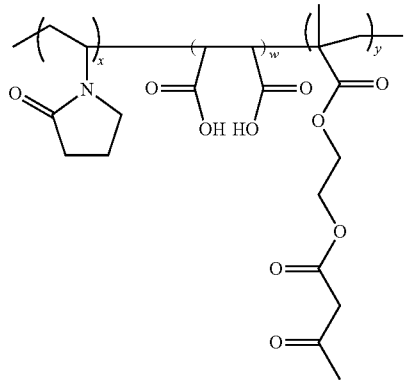

79
-continued

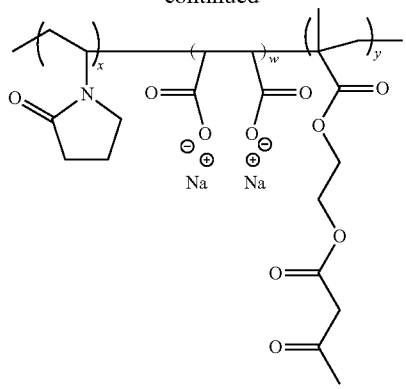

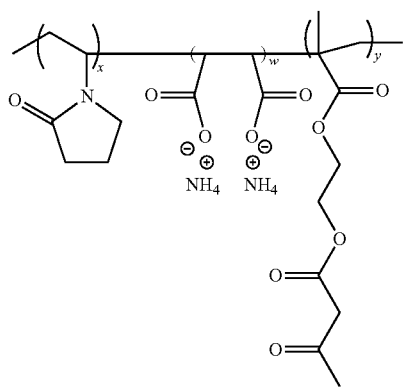

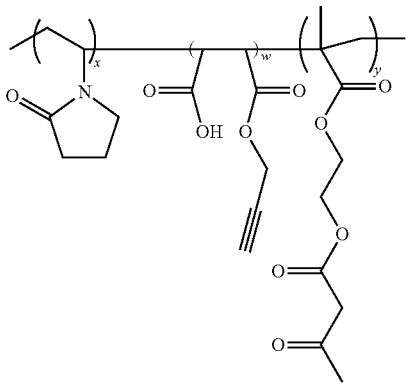

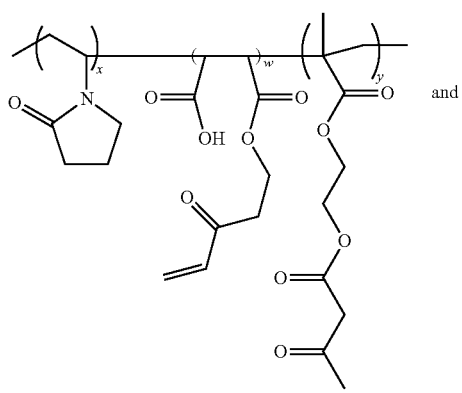

and

80
-continued

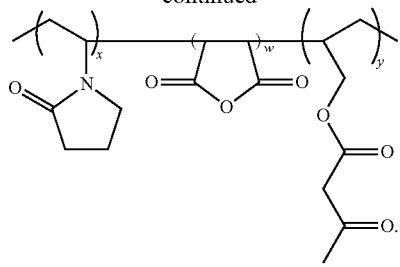

8. A composition comprising a lactamic polymer having the following structure:

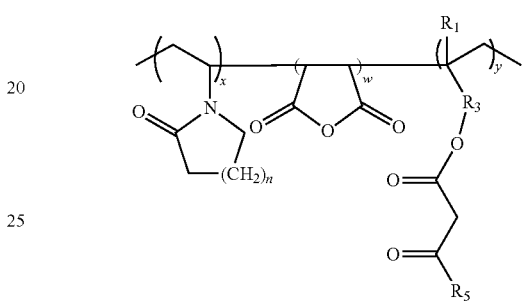

wherein each $R_1$ is independently selected from the group consisting of hydrogen and $C_1$-$C_{30}$ functionalized and unfunctionalized alkyl groups, wherein any of the before mentioned groups may be with or without heteroatoms, and mixtures thereof; each $R_3$ is independently selected from the group consisting of $C_1$-$C_6$ functionalized and unfunctionalized alkyl, amide, carbonyl, and carboxyl groups, wherein any of the before mentioned groups may be with or without heteroatoms, and mixtures thereof; each $R_5$ is independently selected from the group consisting of $C_1$-$C_{12}$ functionalized and unfunctionalized alkyl and alkenyl groups, wherein any of the before mentioned groups may be with or without heteroatoms, and mixtures thereof;

wherein w, a maleic anhydride derived monomer, may be partially or fully ring-opened; w, x, and y are mole percent, the sum of which =100%; and each n is an integer independently ranging from 1-4.

9. The composition according to claim 8, wherein each R1 is independently hydrogen or methyl.

10. The composition according to claim 8, wherein each $R_3$ is —C(O)OCH$_2$CH$_2$—.

11. The composition according to claim 8, wherein each $R_5$ is independently selected from the group consisting of $C_1$-$C_8$ functionalized and unfunctionalized alkyl and alkenyl groups, wherein any of the before mentioned groups may be with or without heteroatoms, and mixtures thereof.

12. The composition according to claim 8, wherein w ranges from 1-97%, x ranges from 1-97%, and y ranges from 1-97%.

13. The composition according to claim 8, wherein each n is an integer independently ranging from 1-3.

14. The composition according to claim 8, wherein the polymer has a structure selected from the group consisting of:

81

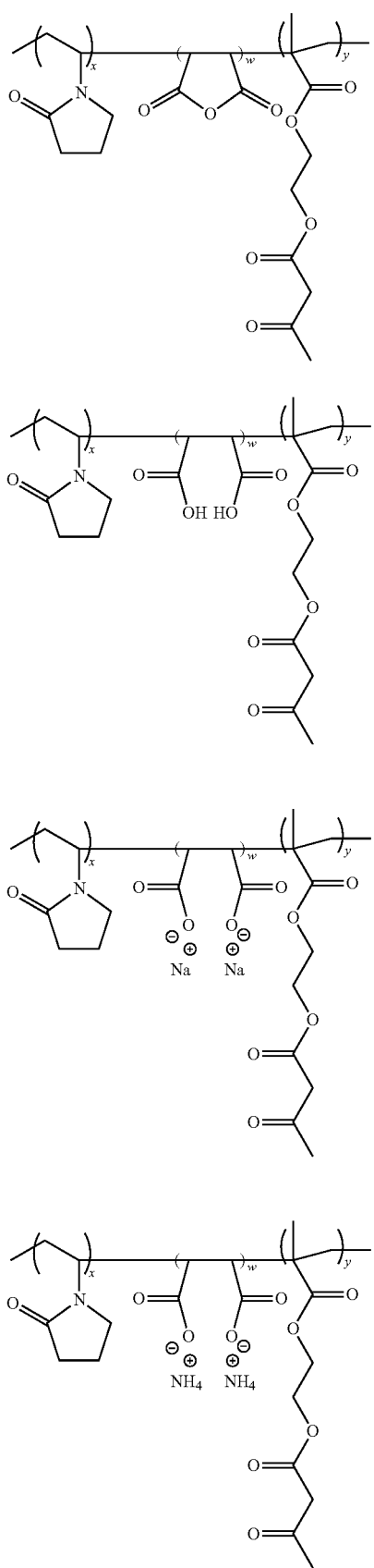

82
-continued

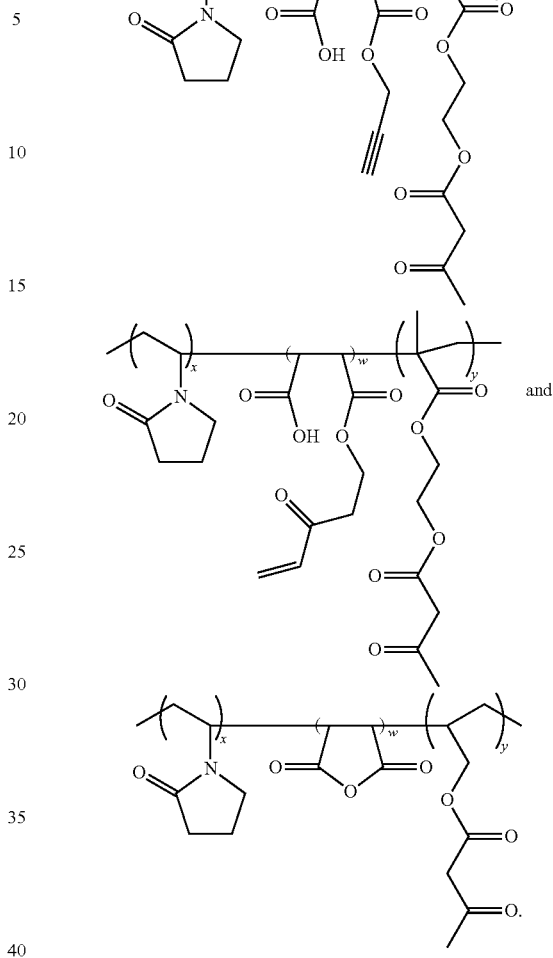

15. The composition according to claim 8, wherein the composition comprises adhesives, aerosols, agricultural compositions, anti-soil redeposition agents, batteries, beverages, biocides, block copolymers, branch/comb copolymers, cementing compositions, cleaning compositions, coating compositions, conductive materials, cosmetic compositions, cross-linkers, dental compositions, polymeric dyes, decorated pigments, detergents, dispersants, drugs, electronics, encapsulations, foods, hair sprays, household-industrial-institutional, inks and coatings, interlaminate adhesives, lithographic solutions, membrane additive compositions, metal working fluids, oilfield compositions, paints, paper, personal care compositions, pharmaceuticals, pigment additives, plasters, plastics, printing, reactive biocides, refractive index modifiers, sequestrants, soil release compositions, static control agents, and wood-care compositions.

16. The composition according to claim 8, the composition further comprising an inert solvent.

17. The composition according to claim 8, the composition further comprising a reactive solvent.

18. The polymer composition according to claim 8, the composition further comprising a cross-linker.

* * * * *